US009806314B2

(12) United States Patent
Elabd et al.

(10) Patent No.: US 9,806,314 B2
(45) Date of Patent: *Oct. 31, 2017

(54) POLYMERIZED IONIC LIQUID BLOCK COPOLYMERS AS BATTERY MEMBRANES

(71) Applicants: DREXEL UNIVERSITY, Philadelphia, PA (US); THE TRUSTEES OF THE UNIVERSITY OF PENNSYLVANIA, Philadelphia, PA (US)

(72) Inventors: Yossef A. Elabd, College Station, TX (US); Karen I. Winey, Philadelphia, PA (US); Yuesheng Ye, Rockville, MD (US); Jae-Hong Choi, Philadelphia, PA (US); Tsen-Shan Sharon Sharick, Philadelphia, PA (US)

(73) Assignees: Drexel University, Philadelphia, PA (US); The Trustees of the University of Pennsylvania, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/145,215

(22) Filed: May 3, 2016

(65) Prior Publication Data

US 2016/0248064 A1  Aug. 25, 2016

Related U.S. Application Data

(63) Continuation of application No. 14/472,487, filed on Aug. 29, 2014, now Pat. No. 9,365,688, which is a continuation of application No. 14/024,734, filed on Sep. 12, 2013, now Pat. No. 8,853,286, which is a continuation of application No. PCT/US2013/058930, filed on Sep. 10, 2013.

(60) Provisional application No. 61/699,940, filed on Sep. 12, 2012.

(51) Int. Cl.

| H01M 2/16 | (2006.01) |
|---|---|
| H01M 8/10 | (2016.01) |
| H01M 10/05 | (2010.01) |
| B01J 41/00 | (2006.01) |
| B82Y 30/00 | (2011.01) |
| C08J 5/22 | (2006.01) |
| H01M 8/1018 | (2016.01) |
| B01J 41/14 | (2006.01) |
| H01M 8/1067 | (2016.01) |
| H01M 8/1027 | (2016.01) |
| H01M 8/103 | (2016.01) |
| H01M 8/1032 | (2016.01) |
| H01M 10/052 | (2010.01) |
| H01M 10/0565 | (2010.01) |
| C08F 293/00 | (2006.01) |
| H01M 10/0525 | (2010.01) |

(52) U.S. Cl.
CPC .......... *H01M 2/1653* (2013.01); *B01J 41/00* (2013.01); *B01J 41/14* (2013.01); *B82Y 30/00* (2013.01); *C08F 293/005* (2013.01); *C08J 5/2231* (2013.01); *H01M 8/103* (2013.01); *H01M 8/1018* (2013.01); *H01M 8/1027* (2013.01); *H01M 8/1032* (2013.01); *H01M 8/1067* (2013.01); *H01M 10/052* (2013.01); *H01M 10/0525* (2013.01); *H01M 10/0565* (2013.01); *C08F 2438/02* (2013.01); *C08J 2353/00* (2013.01); *H01M 2008/1095* (2013.01); *H01M 2300/0082* (2013.01); *Y02E 60/122* (2013.01); *Y02E 60/521* (2013.01); *Y10S 977/70* (2013.01)

(58) Field of Classification Search
CPC ............. H01M 2/1653; H01M 8/1018; H01M 8/1067; H01M 8/1027; H01M 8/103; H01M 8/1032; H01M 10/052; H01M 10/0565; H01M 10/0525; B01J 41/00; B01J 41/14; B82Y 30/00; C08F 293/005; C08J 5/2231
USPC .............................. 521/27, 38; 526/263, 240
See application file for complete search history.

(56) References Cited

U.S. PATENT DOCUMENTS

| 7,998,615 | B2 | 8/2011 | Matsui et al. |
|---|---|---|---|
| 8,216,740 | B2 | 7/2012 | Prevoir et al. |
| 8,268,197 | B2 | 9/2012 | Singh et al. |
| 8,691,928 | B2 | 4/2014 | Hsieh et al. |
| 8,999,008 | B2 | 4/2015 | Hudson et al. |
| 9,017,882 | B2 | 4/2015 | Hudson et al. |
| 9,054,372 | B2 | 6/2015 | Singh et al. |
| 9,133,338 | B2 | 9/2015 | Yang et al. |
| 9,136,562 | B2 | 9/2015 | Singh et al. |
| 2008/0125559 | A1 | 5/2008 | Radosz et al. |
| 2010/0035158 | A1 | 2/2010 | Kato et al. |
| 2010/0227224 | A1 | 9/2010 | Eitouni et al. |
| 2010/0239918 | A1 | 9/2010 | Pratt et al. |
| 2010/0310965 | A1 | 12/2010 | Nakai et al. |
| 2011/0003211 | A1 | 1/2011 | Hudson et al. |
| 2011/0033755 | A1 | 2/2011 | Eitouni et al. |
| 2011/0236295 | A1 | 9/2011 | Anderson et al. |
| 2012/0010334 | A1 | 1/2012 | D'Andola et al. |
| 2012/0141881 | A1 | 6/2012 | Geier et al. |
| 2012/0223052 | A1 | 9/2012 | Regner |
| 2013/0063092 | A1 | 3/2013 | Yang et al. |

(Continued)

OTHER PUBLICATIONS

Weber et al. "Effect of Nanoscale Morphology on the Conductivity of Polymerized Ionic Liquid Block Copolymers", Macromolecules, 2011, 44(14), pp. 5727-5735.*

(Continued)

*Primary Examiner* — Michael M Bernshteyn
(74) *Attorney, Agent, or Firm* — Baker & Hostetler LLP

(57) ABSTRACT

The present invention is directed to compositions useful for use in separators for use in lithium ion batteries, and membranes, separators, and devices derived therefrom.

20 Claims, 30 Drawing Sheets

(56) References Cited

U.S. PATENT DOCUMENTS

| | | |
|---|---|---|
| 2014/0154572 A1 | 6/2014 | Singh et al. |
| 2014/0322614 A1 | 10/2014 | Eitouni et al. |
| 2015/0155592 A1 | 6/2015 | Pratt et al. |

OTHER PUBLICATIONS

Carrasco, et al, "Influence of Anion Exchange in Self-Assembling of Polymeric Ionic Liquid Block Copolymers", Macromolecules, Dec. 2011, 44, 4936-4941.
Chanthad, et al, "Synthesis of Triblock Copolymers Composed of Poly(Vinylidene Fluoride-Cohexafluoropropylene) and Ionic Liquid Segments", 2012, 22, 341-344.
Chen, et al., "Polymerized Ionic Liquids: The Effect of Random Copolymer composition on Ion Conduction", Macromolecules, May 2009, 42: 4809-4816.
Cheng, et al, "Phosphonium-Containing ABA Triblock Copolymers: Controlled Free Radical Polymerization of Phosphonium Ionic Liquids", Macromolecules, Jul. 2011, 44, 6509-6517.
Choi, et al., "Network Structure and Strong Microphase Separation for High Ion Conductivity in Polymerized Ionic Liquid Block Copolymers", Macromolecules, Jun. 2013, 46, 5290-5300.
Elabd, Y. et al., "Ion Transport in Polymerized Ionic Liquid Block and Random Copolymers," American Physical Society, APS March Meeting 2012, Feb. 27-Mar. 2, 2012, abstract #S47.003. downloaded on the internet at URL: http://adsabs.harvard.edu/abs/2012APS..MARW47003E, The Smithsonian/NASA Astrophysics Data System.
Emel'yanenko, et al, "Pyrrolidinim-Based Ionic Liquids. 1-Butyl-1-methyl Pyrrolidinium Dicyanoamide: Thermochemical Measurement, Mass Spectrometry, and ab Initio Calculations", J. Phys. Chem., Aug. 2008, 112(37), 11734-11742.
Ghosh, et al., "Block Copolymer Solid Battery Electrolyte with High Li-Ion Transference Number", Journal of the Electrochemical Society, May 2010, 157(7), A846-A849.
Gu, et al., "Synthesis and Gas Separation Performance of Triblock Copolymer Ion Gels with a Polymerized Ionic Liquid Mid-Block", Macromolecules, Mar. 2011, 44, 1732-1736.
Gwee, Thesis entitled: Ion Transport in Polymer/Ionic Liquid Films, May 2010, 176 pages.
Hoarfrost, abstract: "Ion Transport in Nanostructured Block Copolymer/Ionic Liquid Membranes", AIChE® Thursday, Nov. 1, 2012, 9:40am, Westmoreland West (Westin), downloaded on the Internet at URL: http://aiche.confex.com/aiche/2012/webprogram/Paper282673.html.
Mori, et al, "RAFT Polymerization of N-Vinylimidazolium Salts and Synthesis of Thermoresponsive Ionic Liquid Block Copolymers", Macromolecules, Oct. 2009, 42(21), 8082-8092.
Salas-de la Cruz, et al., "Environmental Chamber for in Situ Dynamic Control of Temperature and Relative Humidity During X-Ray Scattering". Rev Sci Instrum., Feb. 2012, 83(2):025112.
Soo, et al., Rubbery Block Copolymer Electrolytes for Solid-State Rechargeable Lithium Batteries, Journal of the Electrochemical Society, 1999, 146(1): 32-37.
Stancik, et al, "Micelles of Imidazolium-Functionalized Polystyrene Diblock Copolymers Investigated With Neutron and Light Scattering", Langmuir, Dec. 2004, 20(3), 596-605.
Texter, et al, Triblock Copolymer Based on Poly (propylene oxide) and Poly(1-[11-acryloylundecyl]-3-methyl-imidazolium bromide), Macromol. Rapid Commun, Jan. 2012, 33, 69-74.
Wang et al, "Influence of PIL Segment on Solution Properties of Poly(N-Isopropylacrylamide)-B-Poly(Ionic Liquid) Copolymer: Micelles, Thermal Phase Behavior and Microdynamics", Soft Matter, Oct. 8, 2012, 11644-11653.
Wang, et al., "Properties of Lithium bis(oxatlato)borate (LiBOB) as a Lithium Salt and Cycle Performance in LiMn2O4 Half Cell," Int. J. Electochem. Sci., Sep. 2006, 250-257.
Weber, et al. "Effect of Nanoscale Morphology on the Conductivity of Polymerized Ionic Liquid Block Copolymers", Macromoleculas, Jun. 2011, 44(14), pp. 5727-5735.
Wiesenauer, et al, "Synthesis and Ordered Phase Separation of Imidazolium-Based Alkyl-Ionic Diblock Copolymers Made via ROMP", Macromolecules, Jun. 2011, 44, 5075-5078.
Yanxiang, Dissertation entitled: "The Influence of Aromatic Disulfonated Random and Block Copolymers Molecular Weight, Composition, and Microstructure on the Properties of Proton Exchange Membranes for Fuel Cells", Aug. 31, 2007, 253 pages.
Ye et al, "Anion Exchanged Polymerized Ionic Liquids: High Free Volume Single Ion Conductors", Polymer, Jan. 2011, 52, 1309-1317.
Ye et al., "Relative Chemical Stability of Imidazolium-Based Alkaline Anion Exchange Polymerized Ionic Liquids", Macromolecules, Oct. 2011, 44, 8494-8503.
Ye, et al., "Chemical Stability of Anion Exchange Membranes for Alkaline Fuel Cells", ACS Symposium book Series, American Chemical Society: Washington, DC, 2011. Web publication date: May 7, 2012. Downloaded by Drexel University on May 9, 2012 at http://pubs.acs.org.
Ye, et al., "High Hydroxide Conductivity in Polymerized Ionic Liquid Block Copolymers", ACS Macro Lett., Jun. 2013, 2, 575-580.
Ye, et al., "Polymerized Ionic Liquid Block and Random Copolymers: Effect of Weak Microphase Separation on Ion Transport", Macromolecules, Aug. 2012, 45, 7027-7035.
Ye, et al., Abstract: "Hydroxide Conducting Polymerized Ionic Liquid Block Copolymers for Alkaline Fuel Cells," AIChE® 2012, downloaded from the internet at URL: http://aiche.confex.com/aiche/2012/webprogrampreliminary/Paper263941.html.
Yu, et al., "Investigation of the Interactions Between the Hydrophobic Cavities of Cyclodextrins and Pullulanase", Molecules, Apr. 7, 2011, 16(4):3010-7.
Yuan, et al, "Double Hydrophilic Diblock Copolymers Containing a Poly(Ionic Liquid) Segment: Controlled Synthesis, Solution Property, and Application as Carbon Precursor", European Polymer Journal, Apr. 2011, 47(4), 772-781.
Zhang, et al., "Imidazolium Functionalized Polysulfone Anion Exchange Membrane for Fuel Cell Application", J. Mater. Chem., Jul. 27, 2011, 21, 12744-12752.

* cited by examiner

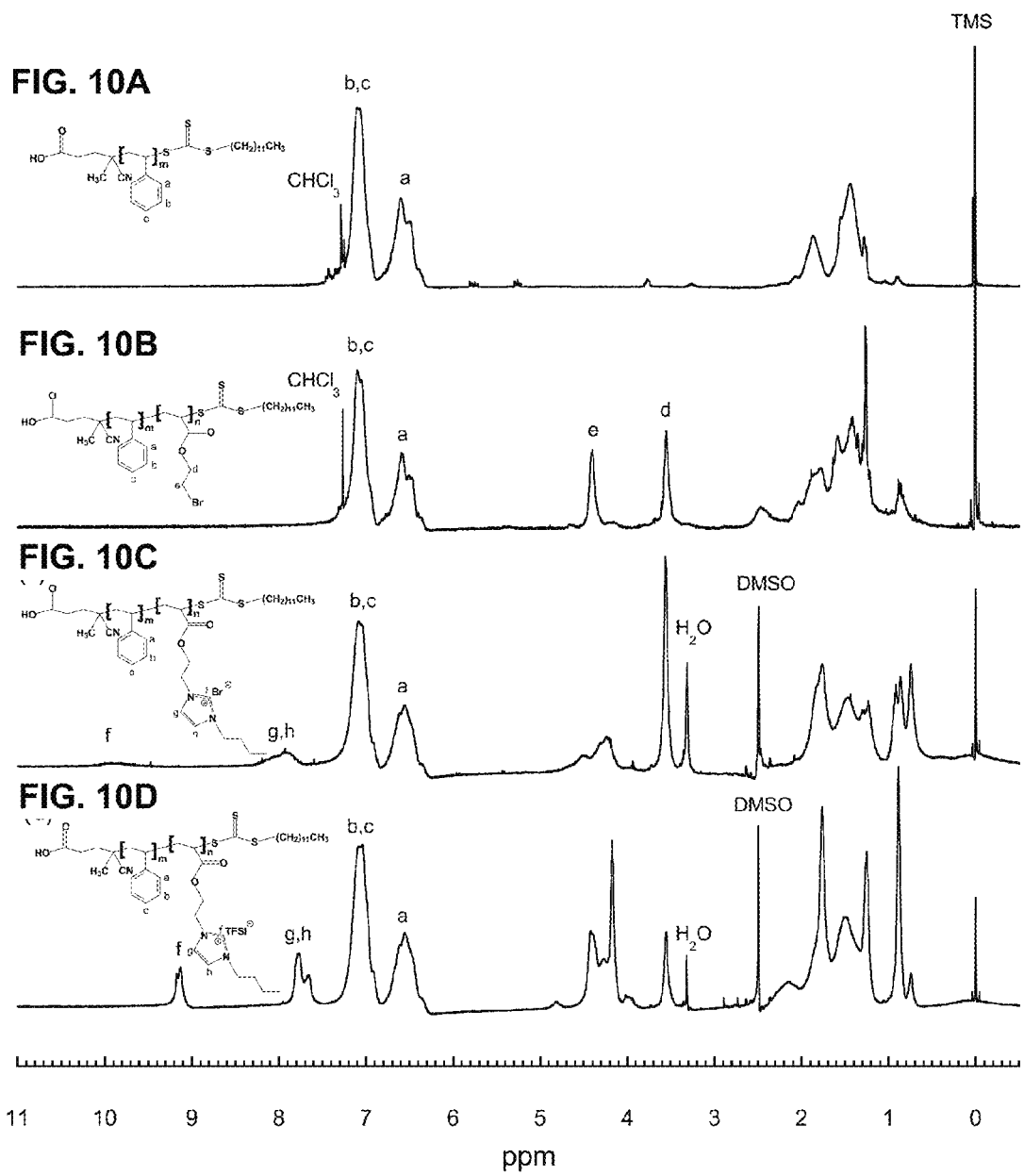

FIG. 11A
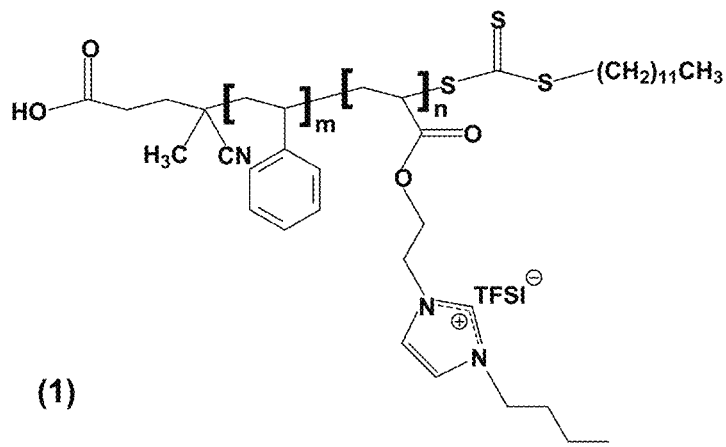
(1)
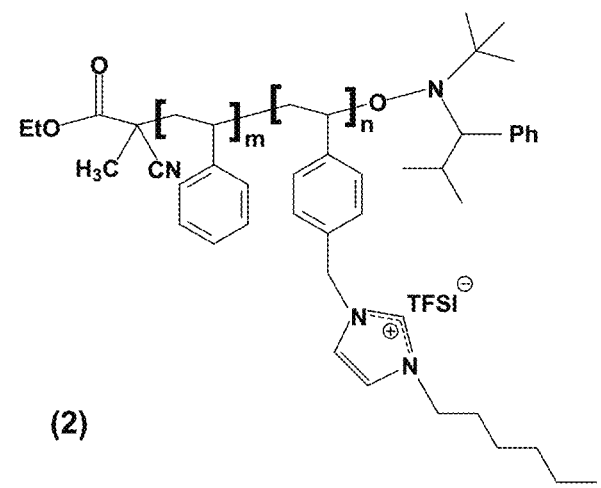
(2)
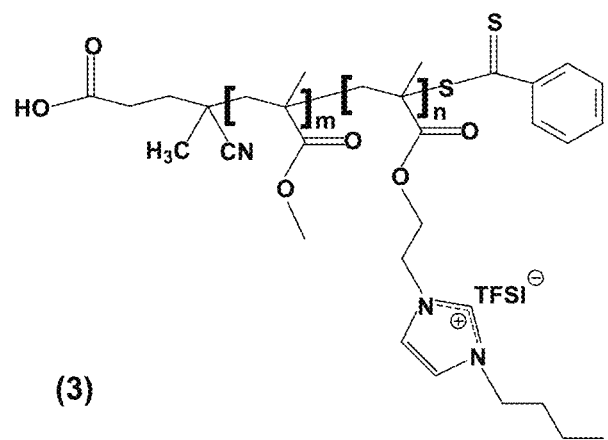
(3)

POLYMERIZED IONIC LIQUID BLOCK COPOLYMERS AS BATTERY MEMBRANES

CROSS REFERENCE TO RELATED APPLICATIONS

This application is a continuation of U.S. patent application Ser. No. 14/472,487, filed Aug. 29, 2014, now U.S. Pat. No. 9,365,688, issued on Jun. 14, 2016, which is a continuation of U.S. patent application Ser. No. 14/024,734, filed Sep. 12, 2013, now U.S. Pat. No. 8,853,286 which issued on Oct. 7, 2014, which is a continuation of PCT/US13/58930, filed Sep. 10, 2013, which claims the benefit of priority to U.S. Patent Application Ser. No. 61/699,940, filed Sep. 12, 2012, the contents of each of which is incorporated by reference in its entirety for any and all purposes.

GOVERNMENT RIGHTS

This invention was made with government support under contract/grant number W911NF-07-1-0452, awarded by the Army Research Office. The Government has certain rights in the invention.

TECHNICAL FIELD

The present invention is directed to compositions useful for use in membranes for sustainable transport of hydroxide (e.g., in fuel cells) and separators for use in lithium ion batteries, and membranes, separators, and devices derived therefrom

SUMMARY

The present invention is directed to compositions useful for use in membranes for sustainable transport of hydroxide (e.g., in fuel cells) and separators for use in lithium ion batteries, and membranes, separators, and devices derived therefrom.

Certain embodiments of the present invention provide compositions, each composition comprising block copolymer comprising at least a first and second block, said second block copolymer comprising (or consisting essentially of) a polymer comprising tethered ionic liquid, said polymer comprising a tethered ionic liquid cation and an associated anion, said second block being stable in the presence of aqueous hydroxide, and wherein said block copolymer composition exhibits at least one region of nanophase separation. In certain of these embodiments, the materials are capable of sustainably transporting hydroxide therethrough. Some of these compositions include polymer electrolytes comprising these block copolymers as an effective component. Other embodiments provide polymer electrolyte membranes comprising a polymer electrolyte as disclosed herein. Still other embodiments provide polymer electrolyte composite membranes each comprising a polymer electrolyte described herein and a porous substrate. Yet other embodiments provide membranes as described herein, adapted for use as a membrane in a fuel cell, including membrane electrode assemblies derived therefrom. Particular embodiments include those wherein these membrane electrode assemblies further comprising a nickel or silver or other non-noble metal catalyst.

Other embodiments further provide a fuel cell or other energy storage device comprising a membrane or membrane assembly or separator comprising the hydroxide stable compositions described here. Other embodiments provide for the storage or discharge of energy using a fuel cell or other energy storage device comprising the membrane or membrane assembly or separator comprising the compositions described herein.

In separate embodiments, the invention provides block copolymers, each comprising a first and second block, said second block comprising (or consisting essentially of) a polymer comprising tethered ionic liquid, said polymer comprising a tethered ionic liquid cation and a mobile anion, and further comprising a lithium ion salt of said anion, wherein said block copolymer exhibits at least one region of nanophase separation. In other embodiments, these lithium ion-containing compositions are adapted for use as a membrane in a lithium ion battery. In further embodiments, these lithium ion membranes may be incorporated into membrane electrode assemblies and/or a secondary lithium ion battery.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings:

FIGS. 10A-D show $^1$H nmr spectra for the of poly(S-b-AEBIm-TFSI) block copolymers and intermediates, as described in Example 2.4.

FIGS. 11A-C provide the (FIG. 11A) chemical structures of PIL block copolymers: BCP 1, poly(S-b-AEBIm-TFSI); BCP 2, poly(MMA-b-MEBIm-TFSI); and BCP 3, poly(S-b-VBHIm-TFSI), (FIG. 11B) ionic conductivity and (FIG. 11C) morphology factors of PIL block copolymers (poly(S-b-AEBIm-TFSI-17.0), circle; poly(S-b-VBHIm-TFSI-17.0), diamond; poly(MMA-b-MEBIm-TFSI-15.7), triangle.

(FIG. 30B) temperature at 90% RH, as described in Example 3.5.

(FIG. 33B) temperature at 90% RH, as described in Example 3.6.

DETAILED DESCRIPTION OF ILLUSTRATIVE EMBODIMENTS

Figure 1:
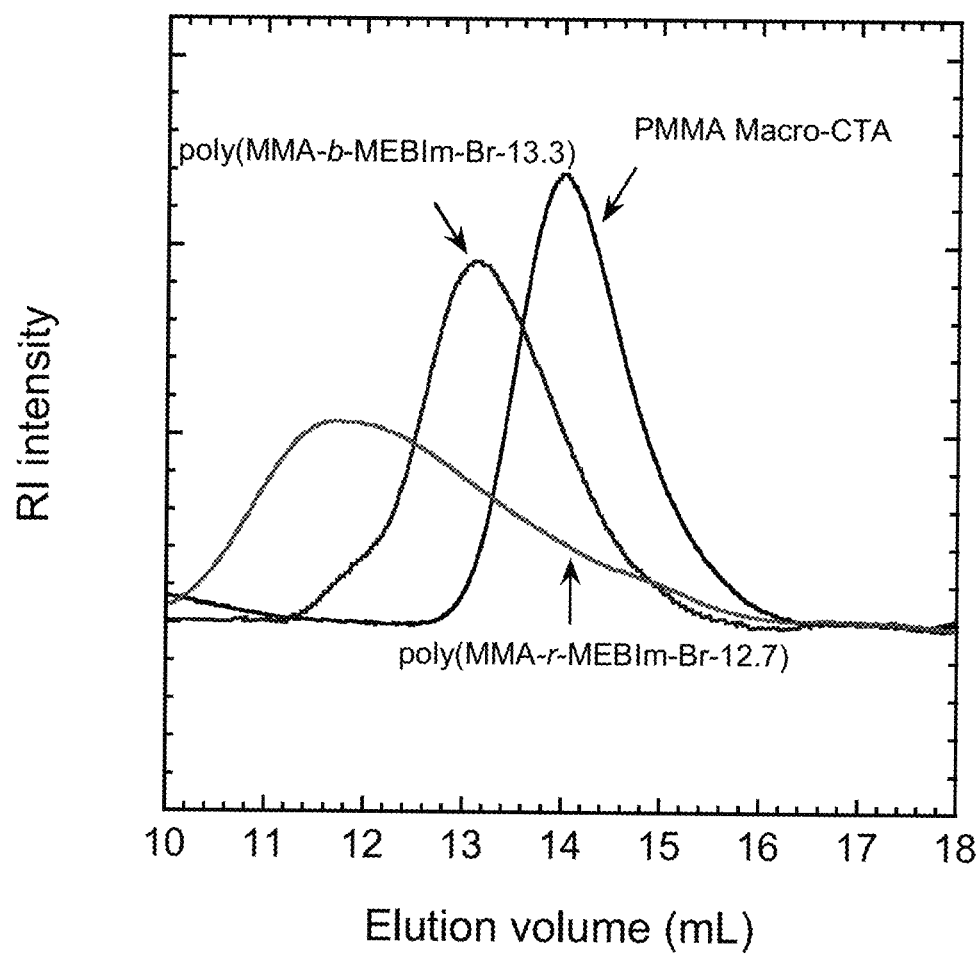
FIG. 1 show SEC chromatograms of PMMA macro-CTA, PIL block copolymer precursor (poly(MMA-b-MEBIm-Br-13.3)), and PIL random copolymer precursor (poly(MMA-r-MEBIm-Br-12.7)), as described in Example 1.4.

The present invention may be understood more readily by reference to the following description taken in connection with the accompanying Figures and Examples, all of which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to the features and methods of making and using superhydrophobic coatings.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Finally, while an embodiment may be described as part of a series of steps or part of a more general structure, each said step may also be considered an independent embodiment in itself.

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially of" For those embodiments provided in terms of "consisting essentially of," the basic and novel characteristic(s) is the operability of the compositions (or the systems using in such compositions or methods of use derived therefrom) as either hydroxide or lithium ion transport media.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are described herein.

Hydroxide Stable Compositions, Including Hydroxide Conducting Energy Devices

Certain embodiments of the present invention provide compositions, each composition comprising block copolymer comprising at least a first and second block, said second block copolymer comprising a polymerized ionic liquid, said polymerized ionic liquid being stable in the presence of aqueous hydroxide, and wherein said block copolymer composition exhibits at least one region of nanophase separation. In other embodiments, these hydroxide-stable compositions comprise a second block consisting essentially of polymerized monomers comprising at least one type of ionic liquid, wherein the basic and novel properties of the invention are the hydroxide stability and the ability to sustainably transport hydroxide ions therethrough. In various embodiments, the first and second blocks are compositionally different. In other embodiments, the composition is a diblock copolymer.

As used throughout this specification, reference to "a block copolymer comprising at least a first and second block" should be well understood by the skilled artisan as including those embodiments where the block copolymer contains additional blocks—e.g., triblocks (e.g., ABA, ABC), tetrablocks, pentablocks (e.g., ABCBA).

As used throughout this specification, the term "polymerized ionic liquid" is intended to connote a polymer or polymer segment or block, wherein a polymer backbone has at least one pendant comprising the cationic moiety of an ionic liquid attached thereto. It is not necessarily intended to refer to a polymer derived from monomers originally having such pendants, though such materials are also within the scope of the present invention. That is, a polymerized ionic liquid may or may not be made from the attachment of the cationic moiety of an ionic liquid to a pre-prepared polymer backbone. See, e.g., the Examples for non-limiting exemplars of such strategies.

As used herein, the term "stable" as used in the terms "hydroxide stable" or "stable in the presence of aqueous hydroxide" refers to the chemical stability of the pendant moiety of the polymerized ionic liquid, when subjected to ambient temperatures in the presence of aqueous hydroxides. In certain embodiments, this refers to (a) less than 10% degradation of the polymerized ionic ligand when subjected to 1M aqueous KOH at 25° C. or less for 24 hours; or (b) less than 20% degradation when the polymerized ionic ligand when subjected to 1M aqueous KOH at temperatures up to 80° C. for 24 hours. Separate embodiments include those compositions which are at least as stable as reported for poly(MEBIm-OH) when tested under the descriptions described in Ye, et al., "Relative Chemical Stability of Imidazolium-Based Alkaline Anion Exchange Polymerized Ionic Liquids," *Macromolecules* 2011, 44, 8494-8503, which is incorporated by reference herein in its entirety for all purposes.

Also, as used throughout this specification, the term "nanophase separation" may also be described as "microphase separated morphology," and is recognized by those skilled in the art of block copolymers. Such separations or morphologies may also be describes as a "self-assembly of blocks which form a periodic nanostructured lamellar morphology with connected ion-conducting domains due to the strong microphase separation of the hydrophilic and hydrophobic blocks." In the instant descriptions, the first block comprises the hydrophobic block and the second block comprises the hydrophilic block.

In various embodiments, the at least one region of nanophase separation is characterized by at least one region of a periodic nanostructured lamellar morphology with connected ion-conducting domains. In independent embodiments, the connected ion-conducting domains extend in at least two-, and preferably three-dimensions throughout the block copolymer. The periodicity of the nanostructured lamellar morphology may be characterized by ordered domains having lattice parameter dimensions in the range of about 5 to about 100 nm, as measured by small angle X-ray scattering. In independent embodiments, these ordered domains may have lattice parameter dimensions in ranges wherein the lower end of the range is about 5 nm, about 10 nm, about 15 nm, about 20 nm, about 25 nm, about 30 nm, about 40 nm, or about 50 nm, and the upper end of the range is independently about 100 nm, about 90 nm, about 80 nm, about 70 nm, about 60 nm, or about 50 nm. In exemplary, non-limiting embodiments, the domains have lattice parameters in a range of about 5 nm to about 50 nm, about 5 nm to about 30 nm, or about 10 nm to about 30 nm.

As described herein, the first block may also be characterized as a plastic or a glassy block of hydrophobic polymer or copolymer. In separate embodiments, the first block may comprise polymers or copolymers comprising an acrylate, methacrylate, styrene, or vinylpyridine derivative, or a combination thereof. Exemplary, non-limiting examples of this first block may include polymers or co-polymers comprising styrene or styrene derivatives such as, for example, α-methylstyrene, methylstyrene, chlorostyrene, hydroxystyrene, and vinylbenzyl chloride. Other examples of plastic polymers include polymers of indene, indene derivatives such as, for example, methylindene, ethylindene, and trimethylindene, vinylpyridine, vinylpyridine derivatives such as for example, vinylmethylpyridine, vinylbutylpyridine, vinylquiniolinne, and vinylacrydine, methyl methacrylate, methacrylate derivatives such as, for example, hydroxyethyl methacrylate or dimethylamino-ethyl methacrylate, and vinylcarbazole. The plastic block may be a copolymer such as, for example, copolymers of styrene and styrene derivatives, copolymers of methyl methacrylate and methacrylate derivatives, copolymers of indene and indene derivatives, copolymers of vinylpyridine and vinylpyridine derivatives copolymers of α-methylstyrene, methylstyrene and indene, copolymers of vinylpyridine and methyl methacrylate, and copolymers of styrene and vinylbenzyl chloride. Preferred independent embodiments include those where the first block comprises a polymer or copolymer comprising a styrene derivative and/or where the first block comprises a polymer or copolymer comprising an acrylate or methacrylate derivative.

In other preferred embodiments, the block copolymer comprises a first block having a repeating unit according to:

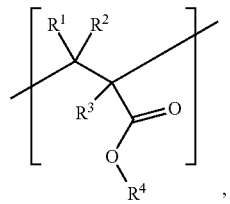

where $R^1$, $R^2$, $R^3$, and $R^4$ are independently H or $C_{1-6}$ alkyl. Additional independent embodiments provide compositions wherein: (a) $R^1$ and $R^2$ are both H; (b) both $R^3$ and $R^4$ are both $C_{1-3}$ alkyl; and/or (c) $R^1$ and $R^2$ are both H and $R^3$ and $R^4$ are both methyl.

The first block of these copolymers may be characterized as having a number average molecular weight. While not necessarily limited to any particular number average molecular weight, in certain separate independent embodiments, the number average molecular weight of the first block is in a range bounded at the lower end by a value of about 500, about 1000, about 2000, about 3000, about 5000, about 10,000, about 20,000, or about 50,000 Daltons, and bounded at the upper end by a value of about 1 million, about 500,000, about 100,000, about 80,000, about 70,000, about 60,000, about 50,000, about 40,000, about 30,000, or about 20,000 Daltons, as measured by size exclusion chromatography. In some exemplary, non-limiting embodiment, the number average molecular weight is in a range of from about 1000 to about 70,000 Daltons or from about 5,000 to about 20,000 Daltons.

The second block of the block copolymers includes those where the pendant cation of the ionic liquid comprises an optionally substituted imidazolium, pyridinium, pyrrolidinium cation, or combination thereof. In addition to the pendant linking group, these cations may be mono-, di-, or tri-substituted, typically alkyl substituted, where each alkyl independently defined to include $C_{1-8}$ linear, branched, or cyclic carbon moieties. The second block may comprise or consist essentially of these tethered imidazolium, pyridinium, pyrrolidinium cations, or combination thereof. That is, the second block may contain at least 40% polymerized ionic liquid content, at least 10%, at least 20%, at least 30%, at least 40%, at least 50%, at least 60%, at least 70%, at least 80%, at least 90%, at least 95%, at least 98%, or essentially 100% polymerized ionic liquid content (as a percentage of repeating units containing the cation relative to the total repeating units in that block). To the extent that the second block contains a repeating unit which does not contain a tethered ionic liquid cation, this repeating unit should be hydrolytically stable and not compromise the intended ability to transport hydroxide ions.

In preferred embodiments, the pendant cation of the ionic liquid comprises a $C_{3-6}$ alkyl-substituted imidazolium cation. In other preferred embodiments, the pendant ionic liquid comprises a carboalkoxy, carboxylato, carboxyamino, or ether linking group. The pendant itself may also comprise alkylene, alkenylene, or ether linkages, or a combination thereof. In still other preferred embodiments, the polymerized ionic liquid comprises a repeating unit according to:

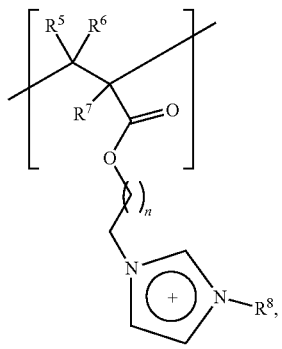

where $R^5$, $R^6$, $R^7$, and $R^8$ are independently H or optionally substituted $C_{1-12}$ alkyl; and n has a value in a range from 0 to about 20, or from 0 to about 10, or from 0 to about 5. Additional independent embodiments provide compositions wherein: (a) $R^5$ and $R^6$ are both H; (b) $R^7$ and $R^8$ are both $C_{1-6}$ alkyl; and/or (c) $R^5$ and $R^6$ are both H, $R^7$ is methyl, and $R^8$ is n-butyl, and n is 1 or about 10.

In further embodiments of the hydroxide stable composition, the second block further comprises hydroxide counterions, either in the presence or absence of water. In additional embodiments of the hydroxide stable composition, the counterions may additionally include aqueous or anhydrous alkyl phosphate, biscarbonate, bistriflimide ((i.e., $N(SO_2CF_3)_2^-$)), $N(SO_2C_2F_5)_2^-$, $N(SO_2CF_3)(SO_2C_4F_9)^-$, carbonate, chlorate, formate, glycolate, halide (including, e.g., fluoro, chloro, bromo, iodo), perchlorate, hexasubstituted phosphate (including $PF_6^-$, $PF_3(CF_3)_3^-$, $PF_3(C_2F_5)_3^-$); tetra-substituted borate (including e.g., $BF_4^-$, $B(CN)_4^-$, optionally fluorinated $C_{1-4}$ alkyl-$BF_3^-$ (including $BF_3(CH_3)^-$, $BF_3(CF_3)^-$, $BF_3(C_2H_5)^-$, $BF_3(C_2F_5)^-$, $BF_3(C_3F_7)^-$), tosylate, or triflate.

In various independent embodiments of the compositions described herein, the second block comprising the pendant ionic liquid ionic liquid has a number average molecular weight in a range bounded at the lower end by a value of about 250, about 500, about 1000, about 2500, about 5,000, about 10,000, or about 25,000 Daltons, and bounded at the upper end by a value of about 1 million, about 500,000, about 100,000, about 80,000, about 70,000, about 60,000, about 50,000, about 40,000, about 30,000, or about 20,000 Daltons, as measured by size exclusion chromatography. Exemplary non-limiting embodiments provide a range of from about 1000 to about 70,000 Daltons or from about 5000 to about 20,000 Daltons.

The total number average molecular weight of the total block copolymer is not necessarily limited, except to the extent necessary provide at least one region of nanophase separation. But certain independent embodiments, the block copolymer itself has a number weighted molecular weight in a range bounded at the lower end by a value of about 2500, about 5000, about 10,000, about 15,000, or about 20,000 Daltons and bounded at the upper end of the range by a value of about 1 million, about 500,000, about 100,000, about 80,000, about 70,000, about 60,000, about 50,000, about 40,000, about 30,000, about 25,000, or about 20,000 Daltons, as measured by size exclusion chromatography. Exemplary, non-limiting, embodiments provide compositions having a number average molecular weight in the range of from about 5000 to about 25,000 Daltons or in the range of from about 10,000 to about 25,000 Daltons, or in the range of about 15,000 to about 25,000 Daltons.

The block copolymers may be prepared by a controlled RAFT polymerization technique, such that the relative lengths of the two blocks may be controlled with good accuracy. The resulting copolymers may be characterized has exhibiting a polydispersity in the range of about 1 to about 2 or in the range of about 1 to about 1.5, as measured by size exclusion chromatography.

The block copolymers may also be characterized by the proportion of the second block (i.e., the content of the polymerized ionic liquid) relative to the first content. In independent embodiments, the second block comprising the polymerized ionic liquid is present in a range of about 5 mole % to about 95 mole %, or in a range of from about 5 mole % to about 50 mole %, of the total block copolymer. In certain of these embodiments, the second block is present in a range of from about 5 to about 10 mole %, from about 10 to about 20 mole %, from about 20 to about 30 mole %, from about 30 to about 40 mole %, from about 40 to about 50 mole %, from about 50 to about 70 mole % from about 70 to about 95 mole %, or a range combining these ranges. In other specific embodiments, the second block comprises about 7%, about 12%, about 17%, and about 25% by mole relative to the total block copolymer (where mole % or mole content refers to percentage or content of repeating units in the second block relative to the amount of repeating units in the total polymer).

In further embodiments of the hydroxide stable compositions, the copolymer also comprises water, present in a range of from about 1 wt % to about 50 wt %, relative to the total combined weight of the block copolymer and the water. In other embodiments, the water may be present in a range having a lower value of about 1 wt %, about 2 wt %, about 5 wt %, about 10 wt % or about 20 wt % and having an upper value of about 60 wt %, about 50 wt %, about 40 wt %, about 30 wt %, or about 20 wt %, with exemplary ranges of about 1 wt % to about 16 wt %, or in a range of about 1 wt % to about 10 wt %, relative to the combined weight of the block copolymer and water.

In certain embodiments of the hydroxide stable block copolymers, the periodic nanostructured lamellar morphology with connected ion-conducting domains allows for the conduction of aqueous hydroxide ions through the block copolymer. In some embodiments, the conductivity of hydroxide through the block copolymer, at 30° C., is independently at least: (a) about $1.6 \times 10^{-5}$ S cm$^{-1}$ at a water content of about 4 wt %, relative to the total weight of the water and copolymer; or (b) about $1.6 \times 10^{-4}$ S cm$^{-1}$ at a water content of about 6 wt %, relative to the total weight of the water and copolymer; or (c) about $1 \times 10^{-3}$ S cm$^{-1}$ at a water content of about 10 wt %, relative to the total weight of the water and copolymer; or (d) about $1 \times 10^{-2}$ S cm$^{-1}$ at a water content of about 16 wt %, relative to the total weight of the water and copolymer. The conductivity of the hydroxide may further be characterized in these compositions having periodic nanostructured lamellar morphology as being at least an order of magnitude (i.e., at least 10 times) higher than the conductivity of hydroxide through a compositionally equivalent, but random copolymer.

To this point, the various embodiments have been described mostly in terms of the compositions themselves, but it should be appreciated that the present invention also contemplates membranes and devices comprising these compositions. That is, various embodiments of the present invention include a polymer electrolyte comprising any of the block copolymers described thus far as an effective component. Other embodiments provide polymer electrolyte membranes comprising a polymer electrolyte as just immediately described. These polymer electrolytes may be incorporated into composite membranes, each further comprising a porous substrate. These membranes may also be adapted for use in a fuel cell, for example in the form of a membrane electrode assembly comprising a membrane and at least one catalysts or catalytically active electrode. Such catalyst or catalytically active electrode may comprise a noble or non-noble metal catalyst, as is known for use in fuel cells, but particularly attractive embodiments include those wherein the catalyst or catalytically active electrode comprises a non-noble metal catalyst, for example nickel or silver. These compositions, polymer electrolyte membranes composite membranes, and/or membrane assembly electrodes may be incorporated into an energy storage device, including a fuel cell. Each of these is considered independent embodiments of the present invention.

Compositions Containing Lithium Ions, Including Lithium Ion Batteries

Certain embodiments of the present invention provide block polymer compositions, each block copolymer comprising a first and second block, said second block comprising (or consisting essentially of) a polymerized ionic liquid, said polymerized ionic liquid comprising a tethered cation and a mobile anion, and further comprising a lithium ion salt of said anion, wherein said block copolymer exhibits at least one region of nanophase separation. In other embodiments, these lithium ion-containing compositions comprise a second block consisting essentially of polymerized monomers having at least one type of tethered ionic liquid. In various embodiments, the first and second blocks are compositionally different. In other embodiments, the composition is a diblock copolymer, a triblock copolymer, or a pentablock copolymer.

Again, for the sake of clarity, as used throughout this specification, the term "polymerized ionic liquid" is intended to connote a polymer or polymer segment or block, wherein a polymer backbone has at least one pendant comprising the cationic moiety of an ionic liquid attached thereto. It is not necessarily intended to refer to a polymer derived from monomers originally having such pendants, though such materials are also within the scope of the present invention. That is, a polymerized ionic liquid may or may not be made from the attachment of the cationic moiety of an ionic liquid to a pre-prepared polymer backbone.

Analogous to the descriptions provided above, in various embodiments of the lithium ion-containing compositions, the at least one region of nanophase separation is characterized by at least one region of a periodic nanostructured lamellar morphology with connected ion-conducting domains. In independent embodiments, the connected ion-conducting domains extend in two- or three-dimensions throughout the block copolymer, allowing for the conduction of lithium ions through the structure. The periodicity of the nanostructured lamellar morphology may be characterized by ordered domains having lattice parameter dimensions in the range of about 5 to about 100 nm, as measured by small angle X-ray scattering. In independent embodiments, these ordered domains may have lattice parameter dimensions in ranges wherein the lower end of the range is about 5 nm, about 10 nm, about 15 nm, about 20 nm, about 25 nm, about 30 nm, about 40 nm, or about 50 nm, and the upper end of the range is independently about 100 nm, about 90 nm, about 80 nm, about 70 nm, about 60 nm, or about 50 nm. In exemplary, non-limiting embodiments, the domains have lattice parameters in a range of about 5 nm to about 50 nm, about 5 nm to about 30 nm, or about 10 nm to about 30 nm.

As described herein, the first block of these lithium salt-containing block copolymers may also be characterized as a plastic or a glassy block of hydrophobic polymer or copolymer. In separate embodiments, the first block may comprise polymers or copolymers comprising an acrylate, methacrylate, styrene, or vinylpyridine derivative, or a combination thereof. Exemplary, non-limiting examples of this first block may include polymers or co-polymers comprising styrene or styrene derivatives such as, for example, α-methylstyrene, methylstyrene, chlorostyrene, hydroxystyrene, and vinylbenzyl chloride. Other examples of plastic polymers include polymers of indene, indene derivatives such as, for example, methylindene, ethylindene, and trimethylindene, vinylpyridine, vinylpyridine derivatives such as for example, vinylmethylpyridine, vinylbutylpyridine, vinylquinioline, and vinylacrydine, methyl methacrylate, methacrylate derivatives such as, for example, hydroxyethyl methacrylate or dimethylamino-ethyl methacrylate, and vinylcarbazole. The plastic block may be a copolymer such as, for example, copolymers of styrene and styrene derivatives, copolymers of methyl methacrylate and methacrylate derivatives, copolymers of indene and indene derivatives, copolymers of vinylpyridine and vinylpyridine derivatives, copolymers of α-methylstyrene, methylstyrene and indene, copolymers of vinylpyridine and methyl methacrylate, and copolymers of styrene and vinylbenzyl chloride. Preferred independent embodiments include those where the first block comprises a polymer or copolymer comprising a styrene derivative and/or where the first block comprises a polymer or copolymer comprising an acrylate or methacrylate derivative.

In certain preferred embodiments, the block copolymer of these compositions comprises a first block having a repeating unit according to:

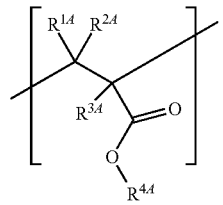

where $R^{1A}$, $R^{2A}$, $R^{3A}$, and $R^{4A}$ are independently H or $C_{1-6}$ alkyl. Additional independent embodiments provide compositions wherein: (a) $R^{1A}$ and $R^{2A}$ are both H; (b) both $R^{3A}$ and $R^{4A}$ are both $C_{1-3}$ alkyl; and/or (c) $R^{1A}$ and $R^{2A}$ are both H and $R^{3A}$ and $R^{4A}$ are both methyl.

Also, analogous to the descriptions above, the first block of these copolymers may be characterized as having a number average molecular weight. While not necessarily limited to any particular number average molecular weight, in certain separate independent embodiments, the number average molecular weight of the first block is in a range bounded at the lower end by a value of about 500, about 1000, about 2000, about 3000, about 5000, about 10,000, about 20,000, or about 50,000 Daltons, and bounded at the upper end by a value of about 1 million, about 500,000, about 100,000, about 80,000, about 70,000, about 60,000, about 50,000, about 40,000, about 30,000, or about 20,000 Daltons, as measured by size exclusion chromatography. In some exemplary, non-limiting embodiment, the number average molecular weight is in a range of from about 1000 to about 70,000 Daltons or from about 5,000 to about 20,000 Daltons.

The second blocks of the block copolymers containing lithium ions include those where the pendant cation of the ionic liquid comprises an optionally alkyl-substituted imidazolium, pyridinium, pyrrolidinium cation, or combination thereof. In addition to the pendant linking group, these cations may be mono-, di-, or tri-substituted, typically alkyl substituted, where each alkyl independently defined to include $C_{1-8}$ linear, branched, or cyclic carbon moieties. The second block may comprise or consist essentially of these tethered imidazolium, pyridinium, pyrrolidinium cations, or combination thereof. That is, the second block may contain at least 40% tethered ionic liquid cation content, at least 10%, at least 20%, at least 30%, at least 40%, at least 50%, at least 60%, at least 70%, at least 80%, at least 90%, at least 95%, at least 98%, or essentially 100% polymerized ionic liquid content (as a percentage of repeating units containing the cation relative to the total repeating units in that block). To the extent that the second block contains a repeating unit which does not contain a tethered ionic liquid cation, this repeating unit should not compromise the intended ability to transport lithium ions.

In preferred embodiments of the lithium ion-containing block copolymers, the pendant cation of the ionic liquid comprises a $C_{3-6}$ alkyl-substituted imidazolium cation. In other preferred embodiments, the pendant ionic liquid comprises a carboalkoxy, carboxylato, carboxyamino, or ether linking group. The pendant itself may also comprise alkylene, alkenylene, or ether linkages, or a combination thereof. In still other preferred embodiments, the polymerized ionic liquid comprises a repeating unit according to

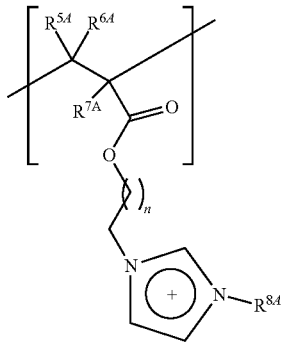

where $R^{5A}$, $R^{6A}$, $R^{7A}$, and $R^{8A}$ are independently H or optionally substituted $C_{1-12}$ alkyl; and n has a value in a range from 0 to about 20, or from 0 to about 10, or from 0 to about 5. Additional independent embodiments provide compositions wherein: (a) $R^5$ and $R^6$ are both H; (b) $R^7$ and $R^8$ are both $C_{1-6}$ alkyl; and/or (c) $R^5$ and $R^6$ are both H, $R^7$ is methyl, and $R^8$ is n-butyl, and n is 1 or about 10.

In various independent embodiments of the lithium ion-containing compositions, the second block comprising polymerized ionic liquid has a number average molecular weight in a range bounded at the lower end of about 250, about 500, about 1000, about 2500, about 5,000, about 10,000, or about 25,000 Daltons, and bounded at the upper end of about 1 million, about 500,000, about 100,000, about 80,000, about 70,000, about 60,000, about 50,000, about 40,000, about 30,000, or about 20,000 Daltons, as measured by size exclusion chromatography. Exemplary non-limiting embodiments provide a range of about 1000 to about 70,000 Daltons or about 5000 to about 20,000 Daltons.

The total number average molecular weight of the total lithium ion-containing block copolymer is not necessarily limited, except to the extent necessary provide at least one region of nanophase separation. But certain independent embodiments, the block copolymer itself has a number weighted molecular weight in a range bounded at the lower end of about 2500, about 5000, about 10,000, about 15,000, or about 20,000 Daltons and bounded at the upper end of the range of about 1 million, about 500,000, about 100,000, about 80,000, about 70,000, about 60,000, about 50,000, about 40,000, about 30,000, about 25,000, or about 20,000 Daltons, as measured by size exclusion chromatography. Exemplary, non-limiting, embodiments provide compositions having a number average molecular weight in the range of from about 5000 to about 25,000 Daltons or in the range of from about 10,000 to about 25,000 Daltons, or in the range of from about 15,000 to about 25,000 Daltons.

As with the hydroxide stable compositions, the lithium ion-containing block copolymers may be prepared by a controlled RAFT polymerization technique, such that the relative lengths of the two blocks may be controlled with good accuracy. The resulting copolymers may be characterized has exhibiting a polydispersity in the range of about 1 to about 2 or in the range of about 1 to about 1.5, as measured by size exclusion chromatography.

As with the hydroxide stable compositions, the lithium ion-containing block copolymers may also be characterized by the proportion of the second block (i.e., the content of the polymerized ionic liquid) relative to the first content. In independent embodiments, the second block comprising the polymerized ionic liquid is present in a range of about 5 mole % to about 95 mole %, or in a range of about 5 mole % to about 50 mole %, of the total block copolymer. In certain of these embodiments, the second block is present in a range of from about 5 to about 10 mole %, from about 10 to about 20 mole %, from about 20 to about 30 mole %, from about 30 to about 40 mole %, from about 40 to about 50 mole %, from about 50 to about 70 mole % from about 70 to about 95 mole %, or a range combining these ranges. In specific embodiments, the second block comprises about 7%, about 12%, about 17%, and about 25% by mole relative to the total block copolymer (where mole % or mole content refers to percentage or content of repeating units in the second block relative to the amount of repeating units in the total polymer).

In various embodiments of the lithium ion-containing block copolymers, the second block of the block copolymer is substantially anhydrous (i.e., does not contain deliberately added water or any water added during processing or preparation of the composition is removed as much as practicable). In other embodiments, the second block may comprise anhydrous solvents, for example comprising ethylene carbonate, ethylene glycol, polyethylene glycol, propylene glycol, propylene carbonate, butylene carbonate, dimethyl carbonate, diethyl carbonate, methyl ethyl carbonate, dipropyl carbonate, γ-butyrolactone, dimethoxyethane, diethoxyethane, or a mixture thereof.

In certain embodiments, these lithium ion-containing block copolymer compositions comprise lithium ions wherein the counterions may include alkyl phosphate, biscarbonate, bistriflimide ((i.e., $N(SO_2CF_3)_2^-$)), $N(SO_2 C_2F_5)_2^-$, $N(SO_2CF_3)(SO_2C_4F_9)^-$, carbonate, chlorate, formate, glycolate, perchlorate, hexasubstituted phosphate (including $PF_6^-$, $PF_3(CF_3)_3^-$, $PF_3(C_2F_5)_3^-$); tetra-substituted borate (including e.g., $BF_4^-$, $B(CN)_4^-$, optionally fluorinated $C_{1-4}$ alkyl-$BF_3^-$, including $BF_3(CH_3)^-$, $BF_3 (CF_3)^-$, $BF_3(C_2H_5)^-$, $BF_3(C_2F_5)^-$, $BF_3(C_3F_7)^-$), tosylate, or triflate. In other embodiments, these lithium ion-containing block copolymers additionally or alternatively comprise mobile (untethered) ionic liquids, said mobile ionic liquids comprising at least one optionally substituted imidazolium, pyridinium, pyrrolidinium cation and at least one alkyl phosphate, biscarbonate, bistriflimide ((i.e., $N(SO_2CF_3)_2^-$)), $N(SO_2C_2F_5)_2^-$, $N(SO_2CF_3)(SO_2C_4F_9)^-$, carbonate, chlorate, formate, glycolate, perchlorate, hexasubstituted phosphate (including $PF_6^-$, $PF_3(CF_3)_3^-$, $PF_3(C_2F_5)_3^-$); tetra-substituted borate (including e.g., $BF_4^-$, $B(CN)_4^-$, optionally fluorinated $C_{1-4}$ alkyl-$BF_3^-$, including $BF_3(CH_3)^-$, $BF_3(CF_3)^-$, $BF_3 (C_2H_5)^-$, $BF_3(C_2F_5)^-$, $BF_3(C_3F_7)^-$), tosylate, or triflate anion.

In certain embodiments, the lithium salt concentration and the mobile ionic liquid concentration may independently vary such that the total is in a range of about 1% to about 50% by weight, relative to the total weight of the block copolymer including the lithium salt and mobile ionic liquid. In other independent embodiments, the lithium salt concentration and the mobile ionic liquid concentration may independently vary such that the total is defined by a range having a lower end of about 1%, 2%, 3%, 4%, 5%, 6%, 7%, 8%, 9%, or 10% by weight, and having an upper end of about 50%, about 45%, about 40%, about 35%, about 30%, about 25%, about 20% about 15%, or about 10% by weight, relative to the total weight of the block copolymer including the lithium salt or mobile ionic liquid or both. In other embodiments, the block copolymers may be contained as additives within liquids comprising at least one lithium salt or mobile ionic liquid or both, wherein the polymer is present in the liquid at a concentration in a range of from about 1 to about 50% by weight, relative to the weight of the liquid including the polymer.

As used here, the term "nanophase separation" carries the same meaning as described about—i.e., it may also be described as "microphase separated morphology," and is recognized by those skilled in the art of block copolymers. Such separations or morphologies may also be describes as a "self-assembly of blocks which form a periodic nanostructured lamellar morphology with connected ion-conducting domains due to the strong microphase separation of the hydrophilic and hydrophobic blocks." In the instant descriptions, the first block comprises the hydrophobic block and the second block comprises the hydrophilic block.

To this point, the embodiments related to the lithium ion-containing compositions have been described mainly in terms of block copolymer compositions, but other embodiments of this invention also include those wherein these compositions are adapted for use, and/or actually comprise or are incorporated within a lithium ion battery membrane, or a membrane electrode assembly. Still other embodiments include those lithium ion batteries (or reversible or irreversible energy storage and/or delivery systems) which comprise a composition or a membrane or a membrane electrode assembly comprising a composition described herein.

The following Embodiments are meant to complement and not supersede previous descriptions. Among the many embodiments considered within the scope of the present invention are these:

Embodiment 1

A block copolymer comprising at least a first and second block, said second block copolymer comprising a polymerized ionic liquid, said polymerized ionic liquid being stable in the presence of aqueous hydroxide, and wherein said block copolymer composition exhibits at least one region of nanophase separation.

Embodiment 2

The block copolymer of Embodiment 1, wherein at least one region of nanophase separation is characterized by at least one region of a periodic nanostructured lamellar morphology with connected ion-conducting domains.

Embodiment 3

The block copolymer of Embodiment 2, wherein the connected ion-conducting domains extend in three-dimensions throughout the block copolymer.

Embodiment 4

The block copolymer of Embodiment 2 or 3, wherein the periodicity of the nanostructured lamellar morphology is characterized by ordered domains having lattice parameter dimensions in the range of about 5 to about 50 nm, as measured by small angle X-ray scattering.

Embodiment 5

The block copolymer of any one of Embodiments 1 to 4, wherein the block copolymer is a diblock copolymer.

Embodiment 6

The block copolymer of any one of Embodiments 1 to 5, wherein the first block comprises polymers or copolymers comprising an acrylate, methacrylate, styrene, or vinylpyridine derivative, or a combination thereof.

Embodiment 7

The block copolymer of any of one of Embodiments 1 to 6, wherein the first block comprises a polymer or copolymer comprising a styrene derivative.

Embodiment 8

The block copolymer of any of Embodiments 1 to 7, wherein the first block comprises a polymer or copolymer comprising an acrylate or methacrylate derivative.

Embodiment 9

The block copolymer of any one of Embodiments 1 to 8, wherein the first block comprises a repeating unit:

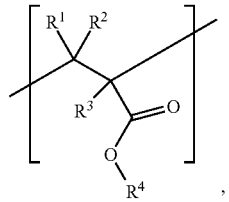

where $R^1$, $R^2$, $R^3$, and $R^4$ are independently H or $C_{1-6}$ alkyl.

Embodiment 10

The block copolymer of Embodiment 9, wherein $R^1$ and $R^2$ are both H.

Embodiment 11

The block copolymer of Embodiment 9, wherein both $R^3$ and $R^4$ are both $C_{1-3}$ alkyl.

Embodiment 12

The block copolymer of Embodiment 9, wherein $R^1$ and $R^2$ are both H and $R^3$ and $R^4$ are both methyl.

Embodiment 13

The block copolymer of any one of Embodiments 1 to 12, wherein the first block has an average molecular weight in the range of about 1000 to about 1,000,000 Daltons.

Embodiment 14

The block copolymer of any one of Embodiments 1 to 13, wherein the polymerized ionic liquid comprises an optionally alkyl-substituted imidazolium, pyridinium, pyrrolidinium, cation, or combination thereof.

Embodiment 15

The block copolymer of any one of Embodiments 1 to 14, wherein the polymerized ionic liquid comprises a $C_{3-6}$ alkyl-substituted imidazolium cation.

Embodiment 16

The block copolymer of any one of Embodiments 1 to 15, wherein the polymerized ionic liquid comprises a carboalkoxy linking group.

Embodiment 17

The block copolymer of any one of Embodiments 1 to 16, wherein the polymerized ionic liquid comprises a repeating unit:

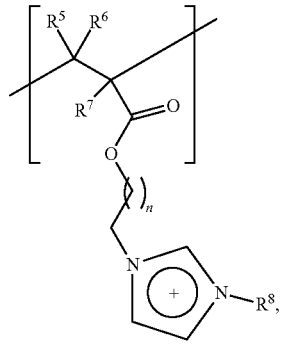

where $R^5$, $R^6$, $R^7$, and $R^8$ are independently H or optionally substituted $C_{1-12}$ alkyl; and n is 0 to about 20.

Embodiment 18

The block copolymer of Embodiment 17, wherein $R^5$ and $R^6$ are both H.

Embodiment 19

The block copolymer of Embodiment 17, wherein $R^7$ and $R^8$ are both $C_{1-6}$ alkyl.

Embodiment 20

The block copolymer of Embodiment 17, wherein $R^5$ and $R^6$ are both H, $R^7$ is methyl, and $R^8$ is n-butyl, and n=1.

Embodiment 21

The block copolymer of any one of Embodiments 1 to 20, wherein the second block comprising polymerized ionic liquid further comprises aqueous hydroxide counterions.

Embodiment 22

The block copolymer of any one of Embodiments 1 to 21, wherein the second block comprising polymerized ionic liquid has an average molecular weight in the range of about 250 to about 1,000,000 Daltons.

Embodiment 23

The block copolymer of any one of Embodiments 1 to 22, wherein the block copolymer has a number weighted molecular weight in a range of about 5000 to about 25,000 Daltons, as measured by size exclusion chromatography.

Embodiment 24

The block copolymer of any one of Embodiments 1 to 23, wherein the block copolymer has a number weighted molecular weight characterized as exhibiting a polydispersity in the range of about 1 to about 1.5, as measured by size exclusion chromatography.

Embodiment 25

The block copolymer of any one of Embodiments 1 to 24, wherein the second block comprising the polymerized ionic liquid is present in a range of about 5 mole % to about 95 mole % of the total block copolymer.

Embodiment 26

The block copolymer of any one of Embodiments 1 to 25, further comprising water, present in a range of about 1 wt % to about 50 wt %, relative to the total combined weight of the block copolymer and the water.

Embodiment 27

The block copolymer of any one of Embodiments 2 to 26, wherein the periodic nanostructured lamellar morphology with connected ion-conducting domains allows for the conduction of aqueous hydroxide ions through the block copolymer.

Embodiment 28

The block copolymer of Embodiment 27, wherein the conductivity of hydroxide through the block copolymer, at 30° C., is at least: (a) about $1.6 \times 10^{-5}$ S cm$^{-1}$ at a water content of about 4 wt %, relative to the total weight of the water and copolymer; or (b) about $1.6 \times 10^{-4}$ S cm$^{-1}$ at a water content of about 6 wt %, relative to the total weight of the water and copolymer; or (c) about $1 \times 10^{-3}$ S cm$^{-1}$ at a water content of about 10 wt %, relative to the total weight of the water and copolymer; or (d) about $1 \times 10^{-2}$ S cm$^{-1}$ at a water content of about 16 wt %, relative to the total weight of the water and copolymer.

Embodiment 29

The block copolymer of any of Embodiments 1 to 28, wherein the conductivity of hydroxide through the block copolymer is at least 10 times higher than the conductivity of hydroxide through a compositionally equivalent, but random copolymer.

Embodiment 30

A polymer electrolyte comprising the block copolymer of any of Embodiments 1 to 29 as an effective component.

Embodiment 31

A polymer electrolyte membrane comprising the polymer electrolyte of Embodiment 30.

Embodiment 32

A polymer electrolyte composite membrane comprising the polymer electrolyte of Embodiment 30, and a porous substrate.

Embodiment 33

A membrane for use in a fuel cell, comprising a block copolymer of any one of Embodiments 1-29, adapted for use as a membrane in a fuel cell.

Embodiment 34

A membrane electrode assembly comprising a membrane of any one of Embodiments 31 to 33.

Embodiment 35

The membrane electrode assembly of Embodiment 34, further comprising a nickel or silver catalyst.

Embodiment 36

A fuel cell comprising a membrane of any one of Embodiments 31 to 33 or a membrane electrode assembly of Embodiment 34 or 35.

Embodiment 37

An energy storage device comprising a membrane of any one of Embodiments 31 to 33.

Embodiment 38

An energy storage device comprising a membrane assembly of Embodiment 34 or 35.

Embodiment 39

A block copolymer comprising a first and second block, said second block comprising a polymerized ionic liquid, said polymerized ionic liquid comprising a tethered ionic liquid cation and a mobile anion, and further comprising a lithium ion salt of said anion, wherein said block copolymer exhibits at least one region of nanophase separation.

Embodiment 40

The block copolymer of Embodiment 39, wherein at least one region of nanophase separation is characterized by at least one region of a periodic nanostructured lamellar morphology with connected ion-conducting domains.

Embodiment 41

The block copolymer of Embodiment 40, wherein the connected ion-conducting domains extend in three-dimensions throughout the block copolymer.

Embodiment 42

The block copolymer of Embodiment 40 or 41, wherein the periodicity of the nanostructured lamellar morphology is characterized by ordered domains having lattice parameter dimensions in the range of about 5 to about 50 nm, as measured by small angle X-ray scattering.

Embodiment 43

The block copolymer of any one of Embodiments 40 to 42, wherein the periodic nanostructured lamellar morphology with connected ion-conducting domains allows for the conduction of lithium ions through the block copolymer.

Embodiment 44

The block copolymer of any one of Embodiments 39 to 43, wherein the first block comprises polymers or copolymers comprising an acrylate, methacrylate, styrene, or vinylpyridine derivative, or a mixture thereof.

Embodiment 45

The block copolymer of any of Embodiments 39 to 44, wherein the first block comprises a polymer or copolymer comprising a styrene derivative.

Embodiment 46

The block copolymer of any one of Embodiments 39 to 44, wherein the first block comprises polymers or copolymers comprising an acrylate or methacrylate derivative.

Embodiment 47

The block copolymer of any one of Embodiments 39 to 44, wherein the first block comprises a repeating unit:

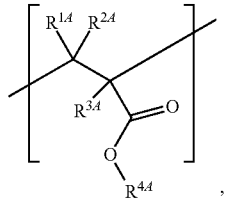

where $R^{1A}$, $R^{2A}$, $R^{3A}$, and $R^{4A}$ are independently H or $C_{1-12}$ alkyl.

Embodiment 48

The block copolymer of Embodiment 47, wherein $R^{1A}$ and $R^{2A}$ are both H.

Embodiment 49

The block copolymer of Embodiment 47, wherein both $R^{3A}$ and $R^{4A}$ are both $C_{1-6}$ alkyl.

Embodiment 50

The block copolymer of Embodiment 47, wherein $R^{1A}$ and $R^{2A}$ are both H and $R^{3A}$ and $R^{4A}$ are both methyl.

Embodiment 51

The block copolymer of any one of Embodiments 39 to 49, wherein the first block has an average molecular weight in the range of about 1000 to about 50000 Daltons.

Embodiment 52

The block copolymer of any one of Embodiments 39 to 51, wherein the tethered ionic liquid cation comprises an optionally alkyl-substituted imidazolium, pyridinium, pyrrolidinium cation, or combination thereof.

Embodiment 53

The block copolymer of any one of Embodiments 39 to 52, wherein the polymerized ionic liquid comprises a $C_{3-6}$ alkyl-substituted imidazolium cation.

Embodiment 54

The block copolymer of any one of Embodiments 39 to 53, wherein the cation of the polymerized is tethered by a carboalkoxy linking group.

Embodiment 55

The block copolymer of any one of Embodiments 39 to 54, wherein the second block comprising a polymerized ionic liquid comprises a repeating unit:

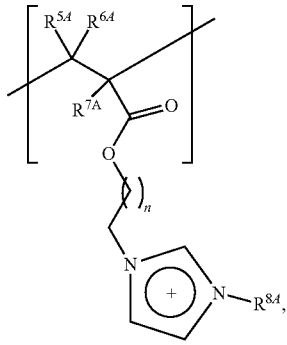

where $R^{5A}$, $R^{6A}$, $R^{7A}$, and $R^{8A}$ are independently H or $C_{1-6}$ alkyl; and n is in a range of 0 to 20.

Embodiment 56

The block copolymer of Embodiment 55, wherein $R^{5A}$ and $R^{6A}$ are both H.

Embodiment 57

The block copolymer of Embodiment 55, wherein $R^{7A}$ and $R^{8A}$ are both $C_{1-4}$ alkyl.

Embodiment 58

The block copolymer of Embodiment 55, wherein $R^{5A}$ and $R^{6A}$ are both H, $R^{7A}$ is methyl, and $R^{8A}$ is n-butyl, and n=1.

Embodiment 59

The block copolymer of any one of Embodiments 39 to 58, wherein the block copolymer is substantially anhydrous.

Embodiment 60

The block copolymer of any one of Embodiments 39 to 59, wherein the second block further comprises a solvent comprising ethylene carbonate, ethylene glycol, polyethylene glycol, propylene glycol, propylene carbonate, butylene carbonate, dimethyl carbonate, diethyl carbonate, methylethyl carbonate, dipropyl carbonate, γ-butyrolactone, dimethoxyethane, diethoxyethane, or a mixture thereof.

Embodiment 61

The block copolymer of any one of Embodiments 39 to 60, further comprising a lithium salt of an alkyl phosphate, biscarbonate, bistriflimide, $N(SO_2C_2F_5)_2^-$, $N(SO_2CF_3)(SO_2C_4F_9)^-$, carbonate, chlorate, formate, glycolate, perchlorate, hexasubstituted phosphate; tetra-substituted borate), tosylate, or triflate or combination thereof.

Embodiment 62

The block copolymer of any one of Embodiments 39 to 61, further comprising a mobile ionic liquid.

Embodiment 63

The block copolymer of Embodiment 62, wherein said mobile ionic liquid comprising at least one optionally substituted imidazolium, pyridinium, pyrrolidinium cation and at least one alkyl phosphate, biscarbonate, bistriflimide, $N(SO_2C_2F_5)_2^-$, $N(SO_2CF_3)(SO_2C_4F_9)^-$, carbonate, chlorate, formate, glycolate, perchlorate, hexasubstituted phosphate; tetra-substituted borate), tosylate, or triflate anion.

Embodiment 64

The block copolymer of any one of Embodiments 39 to 63, wherein the polymerized ionic liquid block has an average molecular weight in the range of about 1000 to about 50000 Daltons.

Embodiment 65

The block copolymer of any one of Embodiments 39 to 64, wherein the block copolymer has a number weighted molecular weight in a range of about 5000 to about 25,000 Daltons, as measured by size exclusion chromatography.

Embodiment 66

The block copolymer of any one of Embodiments 39 to 65, wherein the block copolymer has a number weighted molecular weight which is characterized as exhibiting a polydispersity in the range of about 1 to about 1.5, as measured by size exclusion chromatography.

Embodiment 67

The block copolymer of any one of Embodiments 39 to 66, wherein the polymerized ionic liquid block is present in a range of about 5 mole % to about 95 mole % of the total block copolymer.

Embodiment 68

A membrane for use in a lithium ion battery, comprising a block copolymer of any one of Embodiments 39 to 67, adapted for use as a membrane in the lithium ion battery.

Embodiment 69

A membrane electrode assembly comprising a membrane of Embodiment 68.

Embodiment 70

A lithium ion battery comprising a membrane of Embodiment 68 or a membrane electrode assembly of Embodiment 69.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein.

In the following examples, efforts have been made to ensure accuracy with respect to numbers used (e.g. amounts, temperature, etc.) but some experimental error and deviation should be accounted for. Unless indicated otherwise, temperature is in degrees C., pressure is at or near atmospheric.

Example 1: Polymerized Ionic Liquid Block and Random Copolymers: Effect of Weak Microphase Separation on Ion Transport In this study, a series of PIL diblock copolymers were synthesized from 1-[(2-methacryloyloxy)ethyl]-3-butylimidazolium bis(trifluoromethanesulfonyl)imide (MEBIm-TFSI) IL monomer and methyl methacrylate (MMA) nonionic monomer at various PIL compositions using the reversible addition-fragmentation chain transfer (RAFT) polymerization technique. An analogous series of PIL random copolymers at similar PIL compositions were synthesized using conventional free radical polymerization. The comparison of PIL block and random copolymers at similar PIL compositions allows for a clear understanding of the impact of morphology on ion transport in PILs. A significant increase (2 orders of magnitude) in ionic conductivity from the random copolymers to the block copolymers was observed at similar PIL compositions and is attributed to the weak microphase separation in the block copolymer morphology. These results suggest that the local confinement of conducting ions in nanoscale ionic domains can accelerate ion transport, where strong microphase separation is not required for significant enhancements in ion transport.

Example 1.1: Materials 4-cyano-4-(phenylcarbonothioylthio)pentanoic acid (chain transfer agent (CTA), >97%, HPLC), tetrahydrofuran (THF, ≥99.9%), N, N-dimethylformamide (DMF, 99.9%, HPLC), methanol (99.9%, HPLC), diethyl ether (≥98%), acetonitrile (anhydrous, 99.8%), calcium hydride ($CaH_2$, 95%), lithium bis(trifluoromethanesulfonyl) imide (LiTFSI, 97%), lithium bromide (LiBr, ≥99%) and dimethyl sulfoxide-$d_6$ (DMSO-$d_6$, 99.9 atom % D, contains 0.03% v/v TMS) were used as received from Sigma-Aldrich. Azobisisobutyronitrile (AIBN, 98%, Sigma-Aldrich) was purified by recrystallization twice from methanol. Methyl methacrylate (MMA, 99%, Sigma-Aldrich) was purified by distillation over $CaH_2$ at a reduced pressure. Ionic liquid monomer, 1-[(2-methacryloyloxy)ethyl]-3-butylimidazolium bromide (MEBIm-Br), was prepared similarly according to the literature. The quaternization reaction was carried out at room temperature for 30 hrs without using an inhibitor. Dialysis tubing (Spectra/Por biotech membrane, molecular weight cutoff (MWCO)=500) was purchased from Fisher Scientific. Ultrapure deionized (DI) water with resistivity ca. 16 MΩ cm was used as appropriate. Ionic liquid monomer, 11-Bromoundecyl methacrylate (BrUMA) was similarly prepared at room temperature for 18 hrs.

Example 1.2: PIL Block and Random Copolymer Synthesis

A series of polymerized ionic liquid (PIL) block (poly(MMA-b-MEBIm-TFSI)) and random (poly(MMA-r-MEBIm-TFSI)) copolymers were synthesized at various MEBIm-TFSI or PIL compositions. PIL block and random copolymer precursors bearing bromide (Br) counterions were first synthesized via living/controlled polymerization (reversible addition-fragmentation chain transfer (RAFT) polymerization) (Scheme 1a) and conventional free radical polymerization (Scheme 1b), respectively. The precursors were then subsequently converted into TFSI counterion form via salt metathesis (anion exchange) (Scheme 1).

Scheme 1. Synthesis of (a) poly(MMA-b-MEBIm-TFSI)) block copolymers and (b) poly(MMA-r-MEBIm-TFSI)) random copolymers.

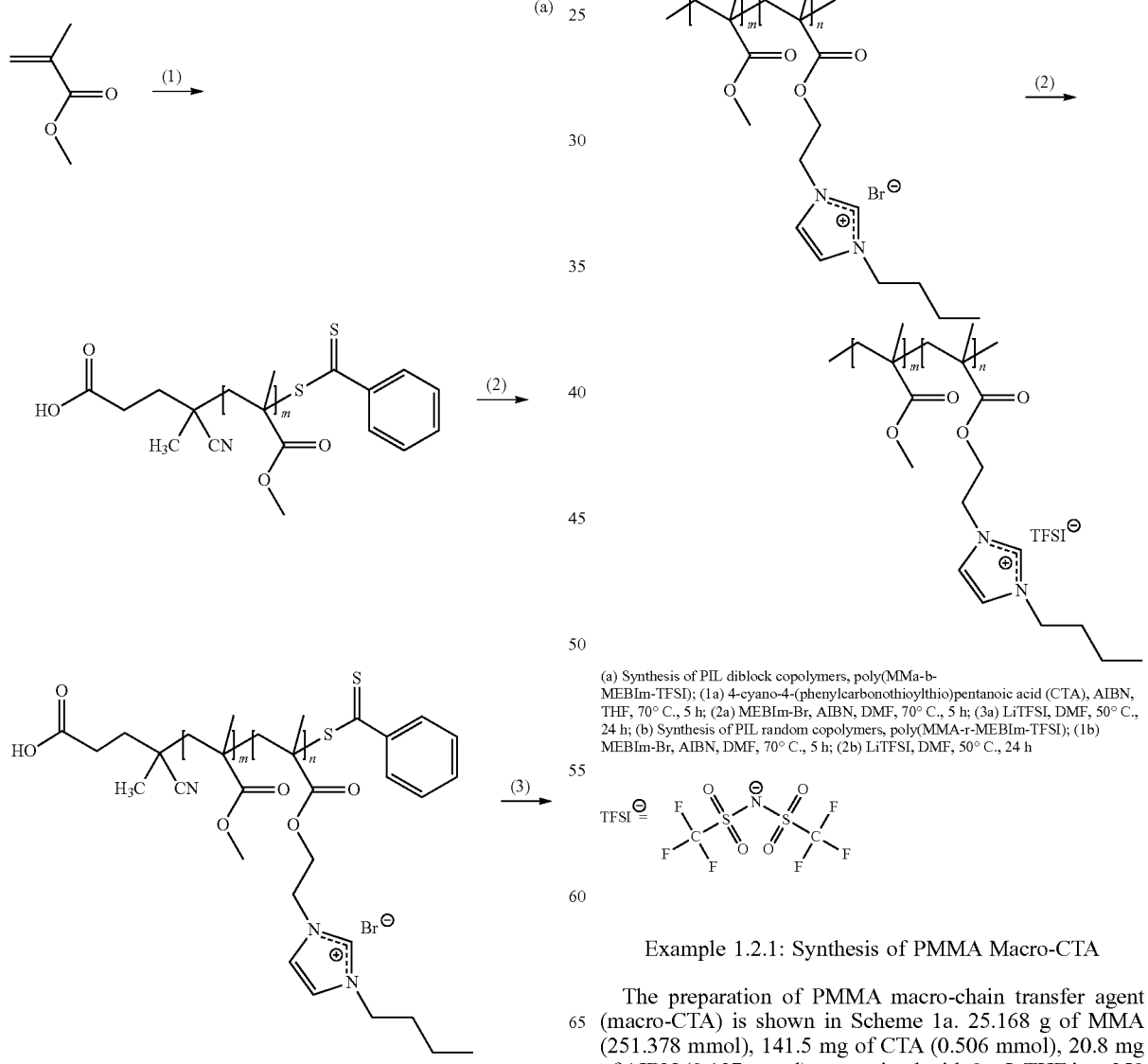

(a) Synthesis of PIL diblock copolymers, poly(MMa-b-MEBIm-TFSI); (1a) 4-cyano-4-(phenylcarbonothioylthio)pentanoic acid (CTA), AIBN, THF, 70° C., 5 h; (2a) MEBIm-Br, AIBN, DMF, 70° C., 5 h; (3a) LiTFSI, DMF, 50° C., 24 h; (b) Synthesis of PIL random copolymers, poly(MMA-r-MEBIm-TFSI); (1b) MEBIm-Br, AIBN, DMF, 70° C., 5 h; (2b) LiTFSI, DMF, 50° C., 24 h Example 1.2.1: Synthesis of PMMA Macro-CTA The preparation of PMMA macro-chain transfer agent (macro-CTA) is shown in Scheme 1a. 25.168 g of MMA (251.378 mmol), 141.5 mg of CTA (0.506 mmol), 20.8 mg of AIBN (0.127 mmol) were mixed with 9 mL THF in a 250 mL single-neck Schlenk flask. The flask was subjected to 4 freeze-pump-thaw degassing cycles followed by sealing the reactor and carrying out the reaction under static vacuum at 70° C. for 5 h. The resulting polymer was twice precipitated in methanol and dried under vacuum in an oven at room temperature for 24 h. Yield: 9.62 g of solid particles (38.2%). $^1$H NMR (500 MHz, DMSO-d$_6$, 23° C.) δ (ppm): 7.87-7.50 (m, C$_6$H$_5$), 3.57 (s, 3H, O—CH$_3$), 1.84-1.76 (d, 2H, CH$_2$—C(CH$_3$)), 0.94-0.74 (d, 3H, CH$_2$—C(CH$_3$)); $M_n$=13.1 kg mol$^{-1}$ (NMR). SEC (DMF, 40° C.): $M_n$=12.53 kg mol$^{-1}$, $M_w/M_n$=1.19 (against PEG/PEO standards).

Example 1.2.2: Synthesis of Diblock Copolymer Poly(MMA-b-MEBIm-Br)

The synthesis of the PIL block copolymer precursor (poly(MMA-b-MEBIm-Br-13.3)) is shown in Scheme 1a(2a). A typical example is given as follows. 3.006 g of IL monomer (MEBIm-Br) in DMF (MEBIm-Br/DMF=1/1 w/w, MEBIm-Br=4.738 mmol), 3.653 g of PMMA macro-CTA in DMF (PMMA/DMF=1/2 w/w, PMMA=0.097 mmol), 1.6 mg of AIBN (0.010 mmol) were mixed with 5 mL DMF solvent in a 50 mL Schlenk flask and subjected to 4 freeze-pump-thaw degassing cycles. After degassing, the reactor was sealed and the reaction was then carried out under static vacuum at 70° C. for 5 h. The resulting polymer was twice precipitated in DI water and subsequently washed extensively with DI water. The block copolymer was filtered and then dried under vacuum in an oven at 40° C. for 24 h. Yield: 1.365 g of solid particles (50.2%). $^1$H NMR (500 MHz, DMSO-d$_6$, 23° C.) δ (ppm): 9.82 (s, 1H, N—CH=N), 8.02 (d, 2H, N—CH=CH—N), 4.64-4.29 (d, 6H, N—CH$_2$—CH$_2$—O, N—CH$_2$—CH$_2$—CH$_2$), 3.57 (s, 3H, OCH$_3$), 1.88 (s, 4H, CH$_2$—C(CH$_3$), N—CH$_2$—CH$_2$—CH$_2$—CH$_3$), 1.32 (s, 5H, N—CH$_2$—CH$_2$—CH$_2$—CH$_3$, CH$_2$—C(CH$_3$)), 0.93 (s, 6H, N—CH$_2$—CH$_2$—CH$_2$—CH$_3$, CH$_2$—C(CH$_3$)), 0.77 (s, 3H, CH$_2$—C(CH$_3$)). SEC (DMF, 40° C.): $M_n$=22.93 kg mol$^{-1}$, $M_w/M_n$=1.31 (against PEG/PEO standards).

Example 1.2.3: Synthesis of Diblock Copolymer Poly(MMA-b-MEBIm-TFSI)

The anion exchange from Br to TFSI neutralized form is shown in Scheme 1a. Poly(MMA-b-MEBIm-Br-13.3) (0.317 g, 0.014 mmol) and LiTFSI (0.653 g, 2.275 mmol) were mixed with DMF (5 mL) and then stirred at 50° C. for 24 h. The reaction mixture was twice precipitated into methanol/water (1/1 v/v) and washed extensively with DI water. The resulting polymer was filtered and dried under vacuum in an oven at 40° C. for 24 h. Yield: 0.277 g of solid particles (72.5%). $^1$H NMR (500 MHz, DMSO-d$_6$, 23° C.) δ (ppm): 9.24 (s, 1H, N—CH=N), 7.83-7.75 (d, 2H, N—CH=CH—N), 4.48-4.20 (d, 6H, N—CH$_2$—CH$_2$—O, N—CH$_2$—CH$_2$—CH$_2$), 3.56 (s, 3H, OCH$_3$), 1.81 (s, 4H, CH$_2$—C(CH$_3$), N—CH$_2$—CH$_2$—CH$_2$—CH$_3$), 1.32 (s, 5H, N—CH$_2$—CH$_2$—CH$_2$—CH$_3$, CH$_2$—C(CH$_3$)), 0.94 (s, 6H, N—CH$_2$—CH$_2$—CH$_2$—CH$_3$, CH$_2$—C(CH$_3$)), 0.74 (s, 3H, CH$_2$—C(CH$_3$)). Elemental Anal. Calcd: C, 48.78; H, 6.30; N, 3.61; F, 9.79; S, 5.51; Br, 0.00. Found: C, 47.09; H, 5.96; N, 4.01; F, 10.66; S, 5.97; Br, <0.25.

Example 1.2.4: Synthesis of Random Copolymer Poly(MMA-r-MEBIm-Br)

The synthesis of the PIL random copolymer precursor (poly(MMA-r-MEBIm-Br-12.7)) is shown in Scheme 1b. A typical example is given as follows. 3.297 g of IL monomer (MEBIm-Br) in DMF (MEBIm-Br/DMF=1/1 wt/wt, MEBIm-Br=5.197 mmol), 2.351 g (23.482 mmol) of MMA, were added to 12 mL DMF and mixed in a flask and purged with N$_2$ for 30 min. 23.6 mg (0.144 mmol) of AIBN initiator was then added to the mixture and further purged with N$_2$ for 10 min. The reaction was carried out at 70° C. for 5 h. The resulting polymer was precipitated in diethyl ether followed by stirring in an extensive amount of DI water for 24 h. The final polymer product was dried under vacuum at 40° C. for 24 h. Yield: 1.913 g of solid particles (47.8%). $^1$H NMR (500 MHz, DMSO-d$_6$, 23° C.) δ (ppm): 9.35 (s, 1H, N—CH=N), 7.91 (d, 2H, N—CH=CH—N), 4.52-4.24 (d, 6H, N—CH$_2$—CH$_2$—O, N—CH$_2$—CH$_2$—CH$_2$), 3.55 (s, 3H, OCH$_3$), 1.84-1.75 (d, 4H, CH$_2$—C(CH$_3$), N—CH$_2$—CH$_2$—CH$_2$—CH$_3$), 1.32 (s, 5H, N—CH$_2$—CH$_2$—CH$_2$—CH$_3$, CH$_2$—C(CH$_3$)), 0.94 (s, 6H, N—CH$_2$—CH$_2$—CH$_2$—CH$_3$, CH$_2$—C(CH$_3$)), 0.73-0.55 (d, 3H, CH$_2$—C(CH$_3$)). SEC (DMF, 40° C.): $M_n$=29.83 kg mol$^{-1}$, =2.28 (against PEG/PEO standards).

Example 1.2.5: Synthesis of Random Copolymer Poly(MMA-r-MEBIm-TFSI)

The synthesis of poly(MMA-r-MEBIm-TFSI) (Scheme 1b) is similar to that of poly(MMA-b-MEBIm-TFSI) described above (Scheme 1a). Yield: 0.380 g of solid particles (70.1%). $^1$H NMR (500 MHz, DMSO-d$_6$, 23° C.) δ (ppm): 9.26 (s, 1H, N—CH=N), 7.86-7.82 (d, 2H, N—CH=CH—N), 4.50-4.22 (d, 6H, N—CH$_2$—CH$_2$—O, N—CH$_2$—CH$_2$—CH$_2$), 3.54 (s, 3H, OCH$_3$), 1.80-1.73 (d, 4H, CH$_2$—C(CH$_3$), N—CH$_2$—CH$_2$—CH$_2$—CH$_3$), 1.31 (s, 5H, N—CH$_2$—CH$_2$—CH$_2$—CH$_3$, CH$_2$—C(CH$_3$)), 0.92 (s, 6H, N—CH$_2$—CH$_2$—CH$_2$—CH$_3$, CH$_2$—C(CH$_3$)), 0.73-0.55 (d, 3H, CH$_2$—C(CH$_3$)). Elemental Anal. Calcd: C, 49.37; H, 6.40; N, 3.42; F, 9.28; S, 5.22; Br, 0.00. Found: C, 48.84; H, 6.39; N, 3.36; F, 9.38; S, 4.96; Br, 0.00.

Example 1.2.6

Similar structures with extended tether lengths were analogously prepared according to Schemes 2-4.

Scheme 2. Synthesis of 11-Bromoundecyl methacrylate (BrUMA) monomer-(1) triethylamine, dichloromethane, room temperature, 18 hrs.

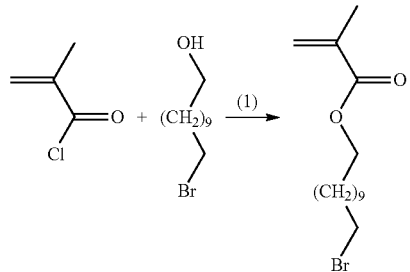

Scheme 3. Synthesis of poly(MMA-b-MUBIm-OH) block copolymers-(1) 4-cyano-4-(phenylcarbonothioylthio)pentanoic acid (CTA), AIBN, THF, 70° C., 5 h; (2) BrUMA, AIBN, THF, 70° C., 6 h; (3) 1-butylimidazole, DMF, 70° C., 72 h; (4) 0.1M KOH, DI water, 25° C., 6 h.

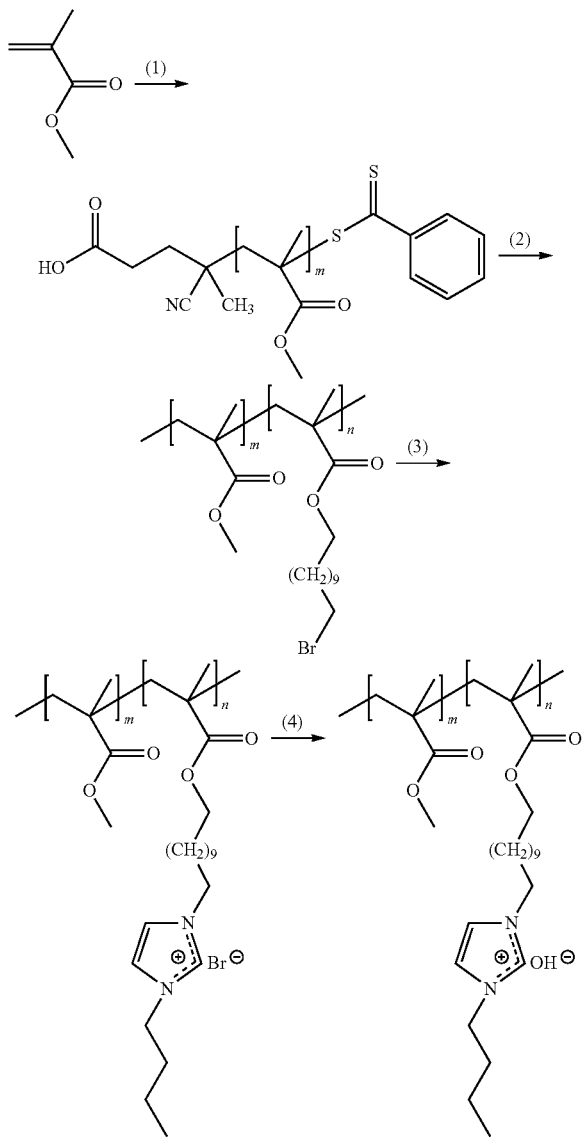

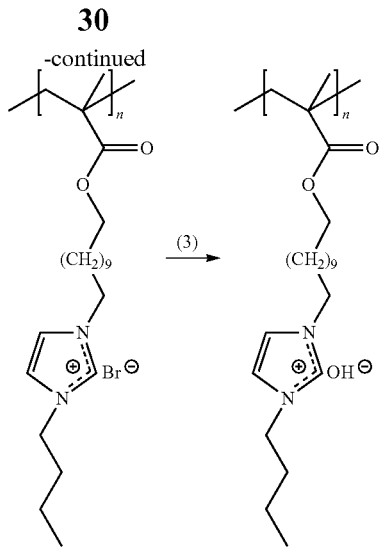

Scheme 4. Synthesis of poly(MUBIm-OH) homopolymer-(1) AIBN, DMF, 65° C., 3.5 h; (2) 1-butylimidazole, DMF, chloroform, 70° C., 72 h; (3) 1-propanol, 0.1M KOH, room temperature, 48 h, dialysis, DI water, room temperature, 24 h.

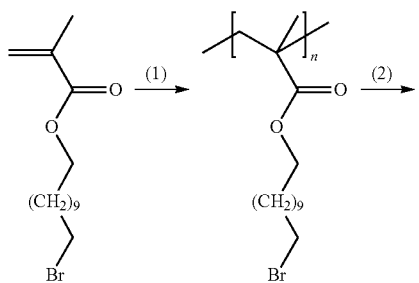

Example 1.3: Solvent-Casting PIL Block and Random Copolymers

Polymers were dissolved in anhydrous acetonitrile (9% w/w) and cast onto Teflon substrates (ca. 35 mm (L)×4 mm (W)×0.525 mm (7)). The polymer solution was partially covered and the solvent was allowed to evaporate under ambient conditions for ca. 12 h. Polymer films were subsequently annealed under vacuum at 150° C. for 72 h. These annealed films were used to characterize thermal, morphological and ion conductive properties. The film thicknesses, ranging between 100 to 200 μm, were measured with a Mitutoyo digital micrometer with ±0.001 mm accuracy.

Example 1.4: Characterization

All chemical structures, PIL compositions, and number-average molecular weights were characterized by $^1$H NMR spectroscopy using a Varian 500 MHz spectrometer at 23° C. with DMSO-$d_6$ as the solvent. The chemical shifts were referenced to tetramethylsilane (TMS). The efficacy of ion exchange in PIL block and random copolymers was confirmed by elemental analysis (Atlantic Microlab, Inc., Norcross, Ga.). The molecular weights and molecular weight distributions of PMMA macro-CTA and PIL block and random copolymers were determined by size exclusion chromatography (SEC) using a Waters GPC system equipped with two DMF Styragel columns (Styragel™ HR 3 and Styragel™ HR 4, effective separation of molecular weight ranges: 500-30,000 and 5,000-600,000) and a 2414 reflective index (RI) detector. All measurements were performed at 40° C. A mixture of DMF and 0.05 M LiBr was used as a mobile phase at a flowrate of 1.0 ml/min. Polyethylene glycol/polyethylene oxide (PEG/PEO) standards (Fluka) with molecular weights ranging from 628 to 478000 g mol$^{-1}$ were used for calibration.

Figure 2A:
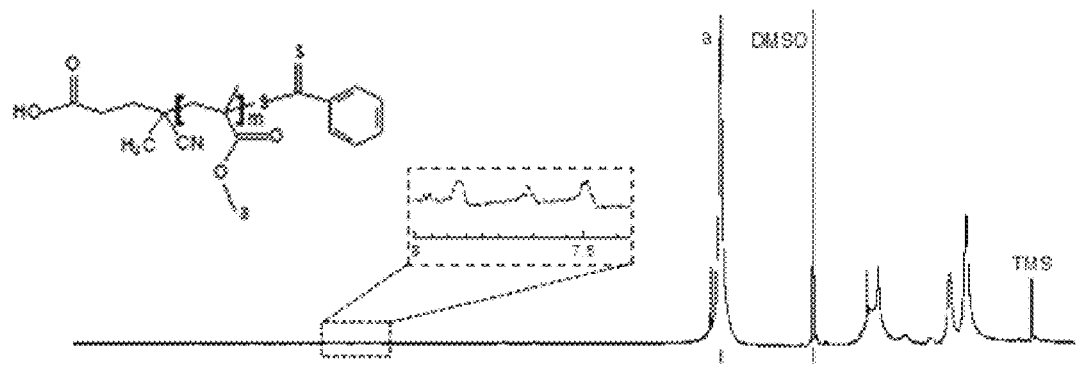
FIGS. 2A-C show $^1$H NMR spectra of (FIG. 2A) PMMA macro-CTA, (FIG. 2B) PIL block copolymer precursor (poly(MMA-b-MEBIm-Br-13.3)), and (FIG. 2C) PIL block copolymer (poly(MMA-b-MEBIm-TFSI-13.4)) in DMSO-$d_6$. PIL compositions are calculated from relative integrations of resonances "c+d" versus resonance "a" (i.e., (c+d)/2/((c+d)/2+a/3)). See Example 1.4.
Figure 2B:
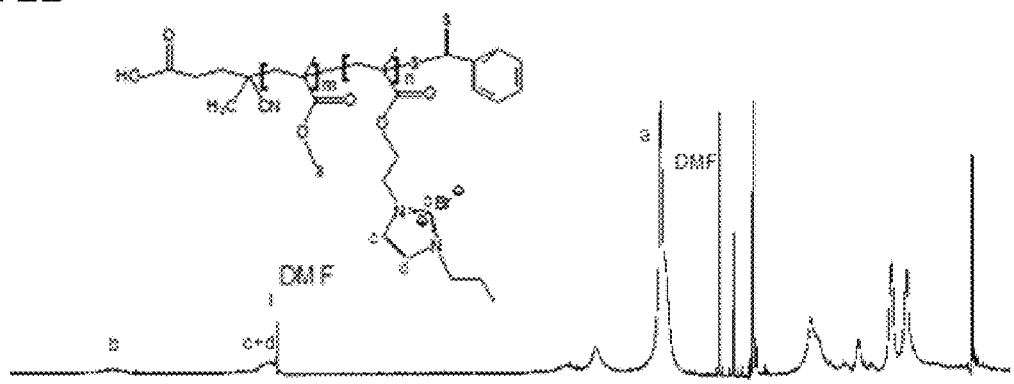
Figure 2C:
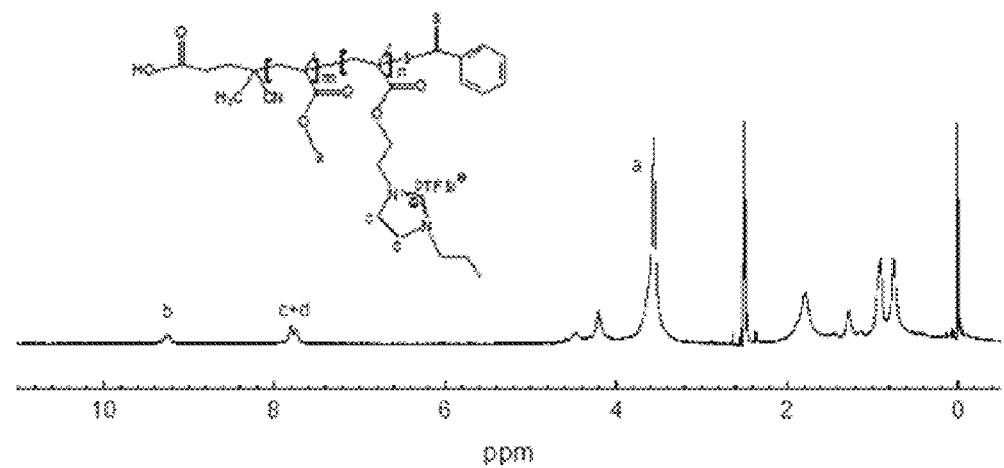

The PIL block copolymer precursors were prepared by sequential addition of monomers. A single batch of PMMA macro-chain transfer agent (macro-CTA) was first synthesized by RAFT polymerization using 4-cyano-4-(phenylcarbonothioylthio)pentanoic acid as the CTA. Subsequently, a series of PIL diblock copolymer precursors (poly(MMA-b-MEBIm-Br)) with various PIL compositions (see Table 1) were prepared via a chain extension reaction of the PMMA macro-CTA (Scheme 1a). Typical SEC results (see Table 1A), shown in FIG. 1, clearly indicate an increase in molecular weight from the PMMA macro-CTA ($M_n$=12.53 kg mol$^{-1}$) to a PIL block copolymer precursor (poly(MMA-b-MEBIm-Br-13.3), 13.3 mol % of PIL, $M_n$=22.93 kg mol$^{-1}$), and relatively low polydispersities for the PMMA macro-CTA ($M_w/M_n$=1.19) and the PIL block copolymer precursor ($M_w/M_n$=1.31) compared to the PIL random copolymer precursor ($M_w/M_n$=2.28) at a similar PIL composition (poly(MMA-r-MEBIm-Br-12.7), 12.7 mol % of PIL, $M_n$=29.83 kg mol$^{-1}$). The $M_n$ of PMMA macro-CTA measured by SEC is in good agreement with the result calculated from the $^1$H NMR spectrum ($M_n$=13.1 kg mol$^{-1}$, FIG. 2a). The successful chain extension reaction was also evidenced by the incorporation of the MEBIm-Br IL monomer, i.e., the appearance of protons at C(2) (9.82 ppm) and C(4,5) (8.02 ppm) from the imidazolium ring in $^1$H NMR spectrum (FIG. 2b). The anion exchange from Br anion to TFSI anion was evidenced by the chemical shifts of C(2) and C(4,5) protons to 9.24 ppm and 7.83-7.75 ppm, respectively. Elemental analysis further confirmed that there was no residual bromide anion present in the resulting polymers and the measured results were in a good agreement with theoretical values (see Table 2).

A series of PIL random copolymer precursors were synthesized using AIBN as an initiator. Six samples of poly(MMA-r-MEBIm-Br) with similar PIL compositions as the PIL block copolymers ranging from 3.9 mol % to 15.4 mol % were selected for anion exchange to TFSI counterion form. The PIL compositions for both PIL block and random copolymers are listed in Table 3.

TABLE 1A

Reaction Conditions, Molecular Weight of PIL Block and Random Copolymer Precursors.

| PIL Block Copolymer Precursors[a] | mol % | Recipe[b] | $M_n$ (kg mol$^{-1}$)[d] | $M_n$ (kg mol$^{-1}$)[e] | PDI[e] |
|---|---|---|---|---|---|
| Poly(MMA-b-MEBIm-Br-3.9) | 3.9 | 10:1:0.1 | 13.1 + 1.7 | 17.21 | 1.22 |
| Poly(MMA-b-MEBIm-Br-6.6) | 6.6 | 20:1:0.1 | 13.1 + 2.94 | 18.23 | 1.22 |
| Poly(MMA-b-MEBIm-Br-9.5) | 9.5 | 30:1:0.1 | 13.1 + 4.36 | 19.45 | 1.33 |
| Poly(MMA-b-MEBIm-Br-11.9) | 11.9 | 40:1:0.1 | 13.1 + 5.6 | 20.38 | 1.41 |
| Poly(MMA-b-MEBIm-Br-13.3) | 13.3 | 50:1:0.1 | 13.1 + 6.39 | 22.93 | 1.31 |
| Poly(MMA-b-MEBIm-Br-15.4) | 15.4 | 60:1:0.1 | 13.1 + 7.55 | 23.18 | 1.60 |

| PIL Random Copolymer Precursors[a] | mol % | Recipe[c] | $M_n$ (kg mol$^{-1}$) | $M_n$ (kg mol$^{-1}$)[e] | PDI[e] |
|---|---|---|---|---|---|
| Poly(MMA-r-MEBIm-Br-3.1) | 3.1 | 19:1 | — | 20.13 | 2.05 |
| Poly(MMA-r-MEBIm-Br-4.8) | 4.8 | 12:1 | — | 25.84 | 2.03 |
| Poly(MMA-r-MEBIm-Br-6.8) | 6.8 | 9:1 | — | 23.5 | 2.32 |
| Poly(MMA-r-MEBIm-Br-12.3) | 12.3 | 4.8:1 | — | 25.33 | 2.33 |
| Poly(MMA-r-MEBIm-Br-12.7) | 12.7 | 4.5:1 | — | 29.83 | 2.28 |
| Poly(MMA-r-MEBIm-Br-15.3) | 15.3 | 4:1 | — | 23.17 | 2.10 |

[a]b = block copolymer, r = random copolymer, Br = bromide counterion number stands for the PIL composition in mol %, which was determined from $^1$H NMR spectra of copolymer PILs;
[b]A:B:C = MEBIm-Br:PMMA-CTA:AIBN (in mol);
[c]A:B = MMA:MEBIm-Br (in mol);
[d]Calculated from $^1$H NMR spectrum of PMMA macro-CTA and chemical structures of PIL block copolymer PILs;
[e]Determined by SEC.

TABLE 1B

Reaction Conditions, Molecular Weight of Neutral Block Copolymer Precursors and Homopolymer Precursor

| Neutral Block Copolymer and Homopolymer Precursors[a] | mol % | Recipe[b] | $M_n$ (kg mol$^{-1}$)[c] | $M_n$ (kg mol$^{-1}$)[d] | PDI[d] |
|---|---|---|---|---|---|
| Poly(MMA-b-BrUMA-5.4) | 5.4 | 10:1:0.1 | 19.8 + 3.4 | 22.52 | 1.19 |
| Poly(MMA-b-BrUMA-12.3) | 12.3 | 35:1:0.1 | 19.8 + 7.76 | 26.45 | 1.26 |
| Poly(MMA-b-BrUMA-17.3) | 17.3 | 50:1:0.1 | 19.8 + 10.9 | 27.51 | 1.33 |
| Poly(MMA-b-BrUMA-20.3) | 20.3 | 60:1:0.1 | 19.8 + 12.8 | 30.42 | 1.38 |
| Poly(MMA-b-BrUMA-23.3) | 23.3 | 100:1:0.1 | 19.8 + 14.7 | 28.43 | 1.48 |
| Poly(MMA-b-BrUMA-37.9) | 37.9 | 150:1:0.1 | 19.8 + 23.9 | 31.26 | 1.46 |
| Poly(BrUMA) | 100 | 20:0:0.1 | — | 43.27 | 4.28 |

[a]b = block copolymer, Br = bromide counterion, number stands for BrUDA composition in mole %, which was determined from $^1$H NMR spectra of copolymers;
[b]A:B:C = BrMUA:PMMA-CTA:AIBN (in mol);
[c]Calculated from $^1$H NMR spectrum of PMMA macro-CTA and chemical structures of BrMUDA block copolymers;
[d]Determined by size exclusion chromatography.

TABLE 1C

PIL Block Copolymers and Homopolymer

| Sample Name[a] | mol % | wt. % | vol %[b] | $T_g$ (° C.)[c] | IEC[d] |
|---|---|---|---|---|---|
| Poly(MMA-b-MUBIm-Br-5.4) | 5.4 | 20.16 | 21.46 | 131 | 0.47 |
| Poly(MMA-b-MUBIm-Br-12.3) | 12.3 | 38.29 | 40.17 | 23, 124 | 0.91 |
| Poly(MMA-b-MUBIm-Br-17.3) | 17.3 | 48.07 | 50.05 | 24, 125 | 1.15 |
| Poly(MMA-b-MUBIm-Br-20.3) | 20.3 | 52.99 | 54.95 | 26, 127 | 1.28 |
| Poly(MMA-b-MUBIm-Br-23.3) | 23.3 | 57.34 | 59.26 | 27, 125 | 1.39 |
| Poly(MMA-b-MUBIm-Br-37.9) | 37.9 | 72.98 | 74.51 | 23, 124 | 1.81 |
| Poly(MUBIm-Br)[e] | 100 | 100 | 100 | −14 | 2.58 |

[a]Numbers correspond to PIL mol %, which was determined from $^1$H NMR spectroscopy.
[b]Volume fractions calculated from density of PMMA (1.18 g cm$^{-3}$) and PIL homopolymer (1.09 g cm$^{-3}$).
[c]Determined from differential scanning calorimetry using the midpoint method.
[d]Calculated as mmol Im$^+$ per g of polymer. [e] PIL homopolymer.

Table 2 shows the elemental analysis results of PIL block (poly(MMA-b-MEBIm-TFSI)) and random (poly(MMA-r-MEBIm-TFSI)) copolymers. These block and random copolymers were synthesized via anion exchange reactions with their block (poly(MMA-b-MEBIm-Br)) and random (poly (MMA-r-MEBIm-Br)) copolymer precursors accordingly. Negligible amount of Br was found in the resulting TFSI anion exchanged PIL block and random copolymers.

TABLE 2

Elemental Analysis of PIL Block and Random Copolymers with TFSI as Counteranion.

| wt % | | C | H | N | F | S | Br |
|---|---|---|---|---|---|---|---|
| PIL Block Copolymer | | | | | | | |
| Poly(MMA-b-MEBIm-TFSI-4.3) | Calc. (%) | 55.27 | 7.33 | 1.52 | 4.11 | 2.31 | 0 |
| | Exp. (%) | 54.71 | 7.23 | 1.35 | 3.02 | 1.83 | trace[a] |
| Poly(MMA-b-MEBIm-TFSI-7.1) | Calc. (%) | 52.89 | 6.95 | 2.29 | 6.20 | 3.49 | 0 |
| | Exp. (%) | 52.26 | 6.76 | 2.31 | 6.01 | 3.41 | 0.46 |
| Poly(MMA-b-MEBIm-TFSI-8.3) | Calc. (%) | 51.98 | 6.81 | 2.58 | 6.99 | 3.93 | 0 |
| | Exp. (%) | 50.67 | 6.58 | 2.90 | 7.72 | 4.22 | trace |
| Poly(MMA-b-MEBIm-TFSI-12.3) | Calc. (%) | 49.39 | 6.40 | 3.42 | 9.26 | 5.21 | 0 |
| | Exp. (%) | 48.84 | 6.25 | 3.41 | 9.07 | 4.94 | trace |
| Poly(MMA-b-MEBIm-TFSI-13.4) | Calc. (%) | 48.78 | 6.30 | 3.61 | 9.79 | 5.51 | 0 |
| | Exp. (%) | 47.09 | 5.96 | 4.01 | 10.66 | 5.97 | trace |
| Poly(MMA-b-MEBIm-TFSI-15.7) | Calc. (%) | 47.64 | 6.12 | 3.98 | 10.8 | 6.07 | 0 |
| | Exp. (%) | 44.90 | 5.63 | 4.39 | 11.98 | 6.56 | 0.53 |
| PIL Random Copolymer | | | | | | | |
| Poly(MMA-r-MEBIm-TFSI-3.7) | Calc. (%) | 55.84 | 7.42 | 1.33 | 3.62 | 2.03 | 0 |
| | Exp. (%) | 55.40 | 7.25 | 1.37 | 3.50 | 2.06 | 0 |
| Poly(MMA-r-MEBIm-TFSI-6.7) | Calc. (%) | 53.19 | 7.00 | 2.19 | 5.94 | 3.34 | 0 |
| | Exp. (%) | 52.56 | 7.01 | 2.27 | 5.95 | 3.42 | 0 |
| Poly(MMA-r-MEBIm-TFSI-12.3) | Calc. (%) | 49.37 | 6.4 | 3.42 | 9.28 | 5.22 | 0 |
| | Exp. (%) | 48.84 | 6.39 | 3.36 | 9.38 | 4.96 | 0 |
| Poly(MMA-r-MEBIm-TFSI-15.4) | Calc. (%) | 47.80 | 6.15 | 3.93 | 10.66 | 6.00 | 0 |
| | Exp. (%) | 47.73 | 6.19 | 3.81 | 10.34 | 5.46 | 0 |

[a]trace < 0.25 wt %.

The density of the PIL homopolymer (poly(MEBIm-TFSI)) was estimated from an additive contribution of components to the molar volume, which is analogous to the group contribution method, where the polymer density is estimated from the additive contribution of functional groups. In other words, the chemical structure of poly (MEBIm-TFSI) can be divided into two components: poly (methyl methacrylate) (PMMA) and tethered TFSI ionic part (i.e., 1-methyl-3-butylimidazolium bis(trifluoromethanesulfonyl)imide, MBIm-TFSI):

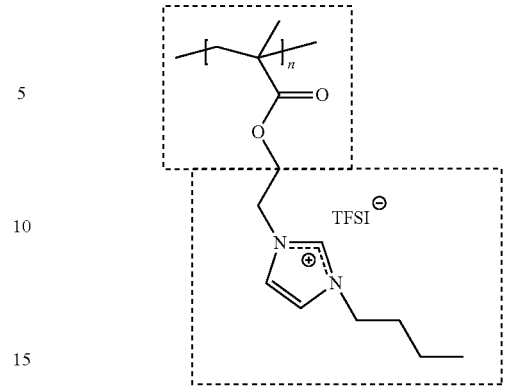

Thus, the total molar volume (cm$^3$ mol$^{-1}$) of poly(MEBIm-TFSI) can be expressed as the addition of the molar volumes of these two components:

$$\frac{M}{\rho} = \frac{M_{PMMA}}{\rho_{PMMA}} + \frac{M_{IL}}{\rho_{IL}} \quad (1)$$

where M, $M_{PMMA}$, $M_{IL}$ and $\rho$, $\rho_{PMMA}$, $\rho_{IL}$ are the molecular weights (g mol$^{-1}$) and densities (g cm$^{-3}$) of the PIL, PMMA and the MBIm-TFSI ionic liquid (IL), respectively. Normalizing Eq. 1 by the total molecular weight yields:

$$\frac{1}{\rho} = \frac{w_{PMMA}}{\rho_{PMMA}} + \frac{w_{IL}}{\rho_{IL}} \quad (2)$$

From Eq. 1, the PIL density can be determined from the experimental densities of PMMA ($\rho_{PMMA}$=1.18 g cm$^{-3}$) and MBIm-TFSI IL ($\rho_{IL}$=1.42 g cm$^{-3}$) and the weight fractions of PMMA ($w_{PMMA}$=0.193) and IL ($w_{IL}$=0.807), which were calculated from the chemical structure. Thus, the calculated density for PIL poly(MEBIm-TFSI) is 1.37 g cm$^{-3}$. In this study, we also assume that the variation of volume fraction due to the density change at different temperatures is negligible for these PIL block and random copolymers.

Example 1.5: Thermal Properties

Glass transition temperatures ($T_g$s) were determined by differential scanning calorimetry (DSC; TA Instruments, Q200) over a temperature range of −60° C. to 180° C. at a heating/cooling rate of 10° C./min under $N_2$ environment using a heat/cool/heat method. $T_g$ was determined using the mid-point method from the second thermogram heating cycle. Thermal degradation temperatures ($T_d$s) were by measured thermal gravimetric analysis (TGA; TA Instruments, Q50) over a temperature range of 30° C. to 800° C. at a heating rate of 10° C./min under $N_2$ environment. $T_d$ was reported at 5% weight loss of a polymer sample.

FIG. 3 shows glass transition temperatures ($T_g$s) of the PIL block and random copolymers containing TFSI counterions as a function of PIL composition, where both sets are compared to a PMMA homopolymer control sample (0 mole % PIL). Note that the PMMA homopolymer control for the PIL block copolymers was synthesized by RAFT polymerization (i.e., PMMA macro-CTA), while the other homopolymer control for the PIL random copolymer was synthesized by free radical polymerization. Also, note that there was no difference in $T_g$ for homopolymers synthesized by either RAFT polymerization (FIG. 3A) or free radical polymerization (FIG. 3B). For the PIL random copolymers with TFSI counterions (FIG. 3B), there is only one relatively narrow $T_g$, which decreases from 124° C. to 93° C. with increasing PIL composition from 0 to 15.4 mol %. This reduction in $T_g$ can be attributed to the lower $T_g$ of the PIL (poly(MEBIm-TFSI), $T_g$=7° C.), where the TFSI counterion reduces the PIL $T_g$ compared to the Br counterion due to the plasticization effect of the bulky TFSI anion with its lower symmetry, extensive charge delocalization, and the higher flexibility. In contrast, two broader glass transitions were observed for PIL block copolymers with TFSI counterions at most PIL compositions (FIG. 3A). Two distinct $T_g$s are expected for microphase-separated block copolymers. Specifically, for strongly microphase-separated block copolymers, the $T_g$s for each block typically do not change with changing block composition. However, FIG. 3A shows that the $T_g$s for both the PIL and PMMA blocks deviate significantly with changing block composition compared to the pure homopolymer $T_g$s, (poly(MEBIm-TFSI), $T_g$=7° C.; PMMA, $T_g$=124° C.). More specifically, the PIL block $T_g$ increases from 7 to 85° C. from 100 to 7.1 mole % PIL composition, while the PMMA block $T_g$ decreases from 124 to 106° C. from 0 to 15.7 mole % PIL composition. Also, note that only one glass transition was observed in FIG. 3A at 4.3 mol % PIL composition, which may be due to relatively short length of the PIL block at this low PIL composition. Overall, the data in FIG. 3A suggests that there is microphase separation in these PIL block copolymers as evidenced by two distinct $T_g$s, but that this separation is weak as evidenced by the significant deviation in $T_g$s of both blocks with changing PIL composition. Note that the number-average molecular weight of the PMMA macro-CTA was 13.1 kg mol$^{-1}$, while that of the PIL block ranged from 3-12.6 kg mol$^{-1}$ (calculated from the mole ratio of a PMMA block to a PIL block determined by NMR) for the PIL composition range we studied. This indicates that the deviation of $T_g$s is less likely attributed to a relatively low molecular weight of the PIL block. Thus, the $T_g$ deviation and the effect of PIL composition on both $T_g$s may be attributed to the partially compatible nature of the methacrylate-based TFSI PIL block and the PMMA block. It is worthwhile to note that PMMA is miscible with the analogous small molecule TFSI ionic liquid that is covalently attached in the PIL block (e.g., 1-ethyl-3-methylimidazolium bis (trifluoromethylsulfonyl)imide (EMIm-TFSI)), suggesting that there may be a partial affinity between the PIL block and PMMA block in this PIL block copolymer. A similar behavior of $T_g$ deviation was also reported in literature for block copolymers of poly(ethylene oxide) and PMMA, which was attributed to an intramolecular plasticizing effect.

Figure 3A:
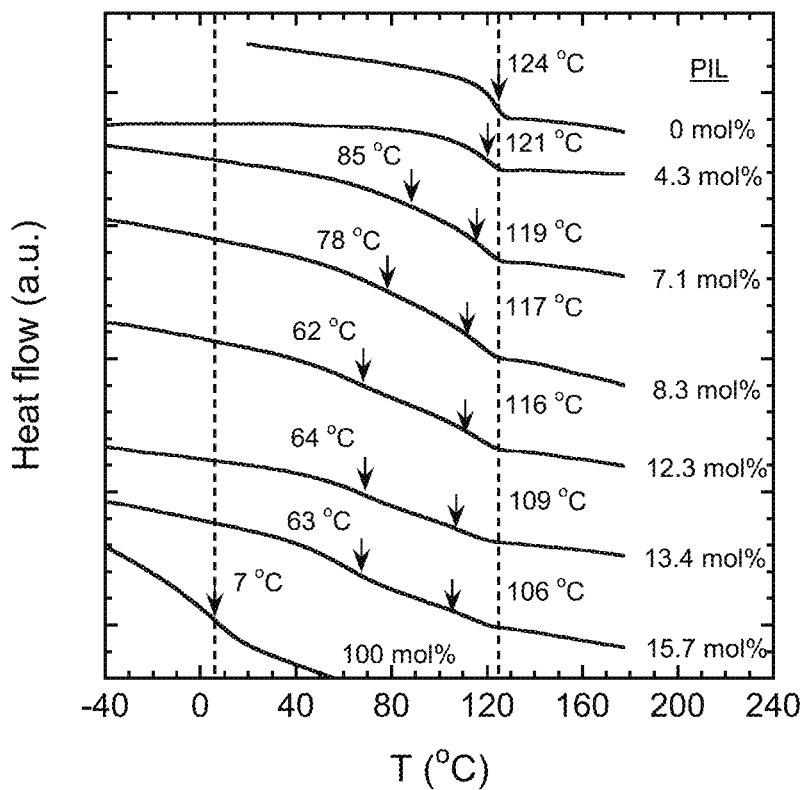
FIG. 3A-B show DSC thermograms of PIL (FIG. 3A) block and (FIG. 3B) random copolymers (with TFSI counteranions) at various PIL compositions from 0 to ca. 15 mol % (ca. 45 vol %, Table 1)
Figure 3B:
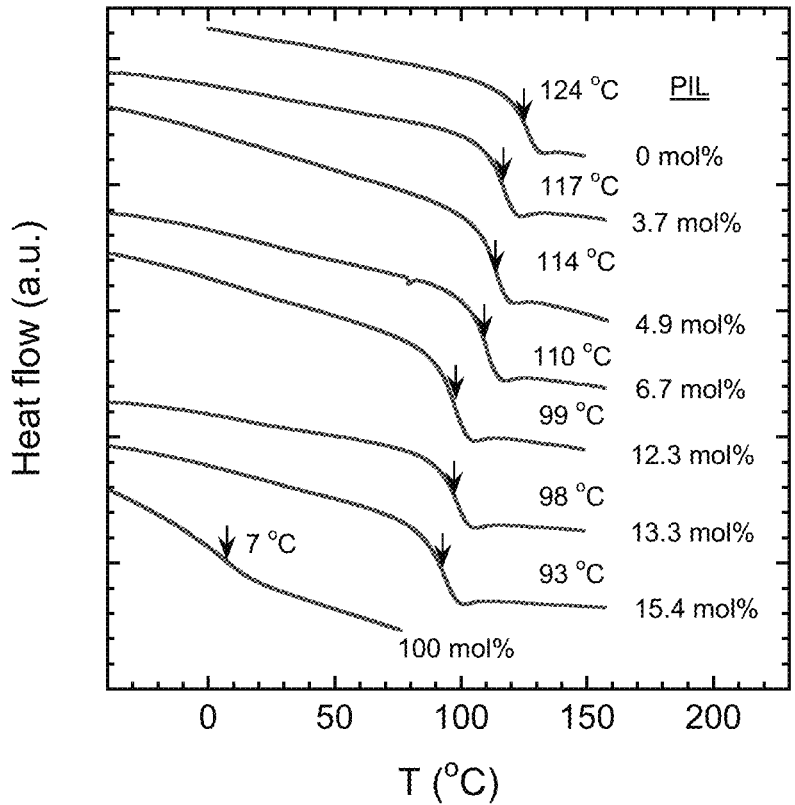
Figure 3C:
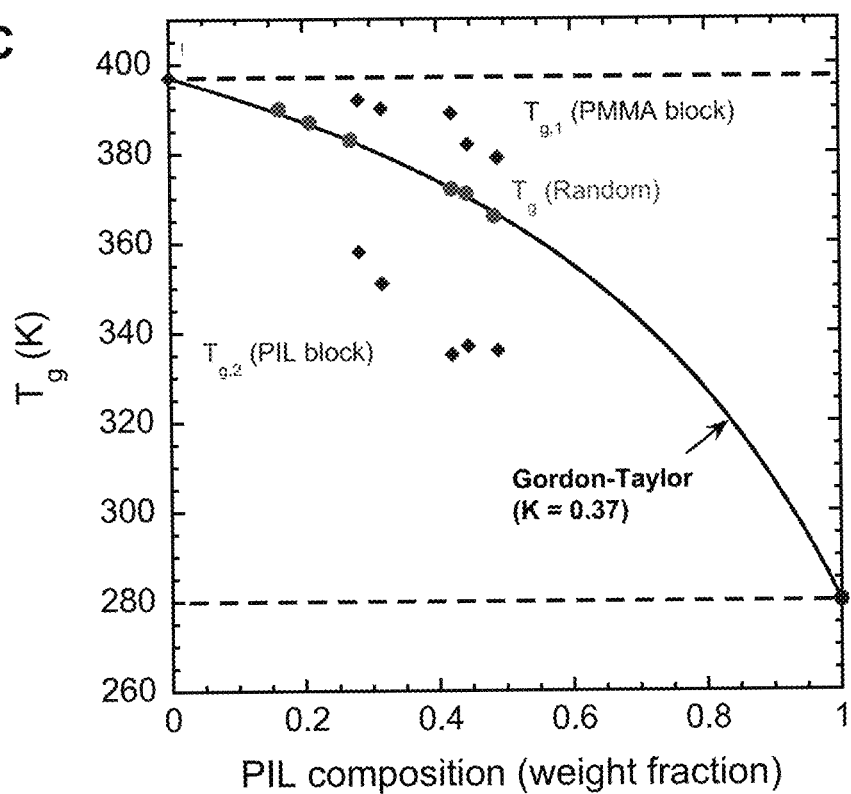
FIG. 3C shows glass transition temperatures as a function of PIL composition. The solid line corresponds to the Gordon-Taylor equation and the dashed lines correspond to the PMMA and PIL homopolymer $T_g$s.
Figure 3D:
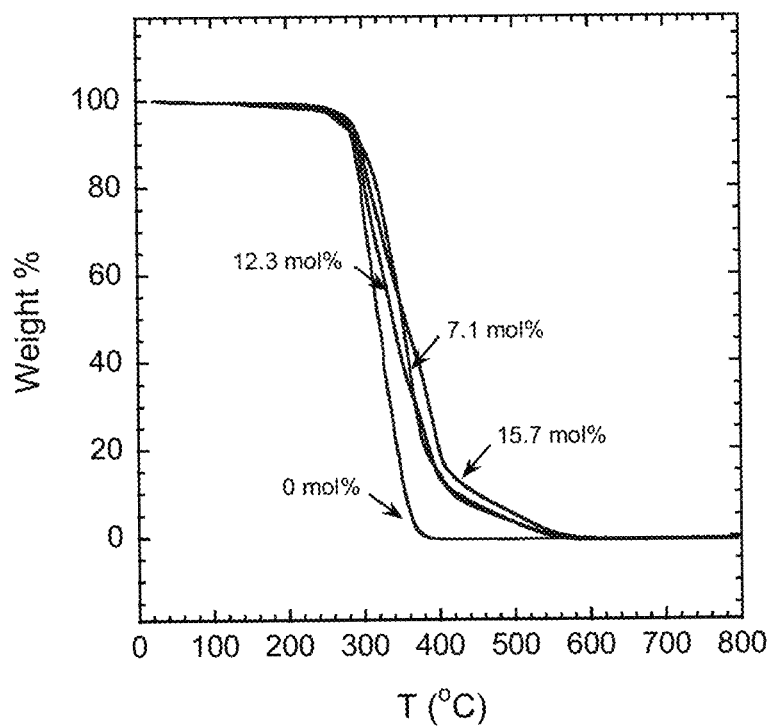
FIG. 3D-E shows TGA thermograms of PIL (FIG. 3D) block and (FIG. 3E) random copolymers as a function of PIL composition. Numbers on graph correspond to PIL composition (mole %), as described in Example 1.5.
Figure 3E:
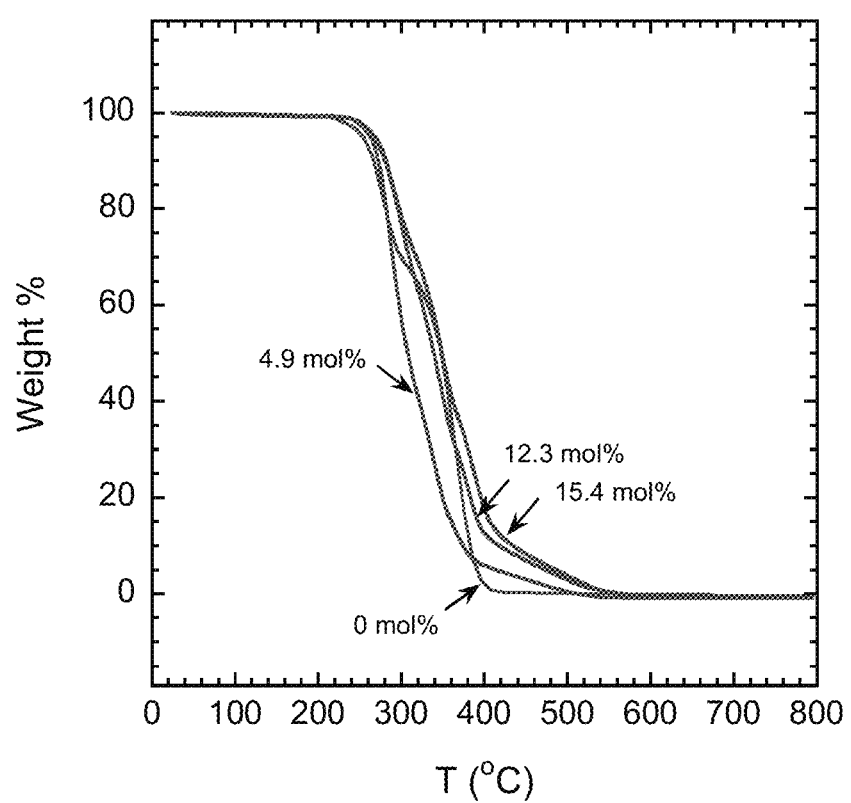

FIG. 3C shows $T_g$s of PIL block and random copolymers as a function of PIL composition. As expected, the one $T_g$ of PIL random copolymer decreases with increasing PIL composition and lies between the $T_g$ of the PMMA ($T_{g,1}$) and PIL ($T_{g,2}$) blocks of the PIL block copolymer. A comparison of the $T_g$s of the PIL random copolymers to the Gordon-Taylor equation is shown in FIG. 4. The Gordon-Taylor equation has one empirical fitting parameter:

$$T_g = \frac{w_1 T_{g,1} + K w_2 T_{g,2}}{w_1 + K w_2} \quad (1)$$

where $w_1$ and $w_2$ are weight fractions of the two components, and K is the fitting parameter. If K=$T_{g,1}/T_{g,2}$, the Gordon-Taylor equation simplifies to the Fox equation, a well-known equation that can describe a fully miscible system. FIG. 3C indicates that the $T_g$ of random copolymers can be well described by the Gordon-Taylor equation with K=0.37 (the best fit). Note that this value is far different from $T_{g,1}/T_{g,2}$=1.42, indicating that the IL monomeric units are not fully mixed with the MMA monomeric units. Clearly, FIG. 3C further indicates $T_g$s of PMMA block and the PIL block in block copolymers significantly deviate from their homopolymers (PMMA and PIL), suggesting that PIL is not fully immiscible with PMMA. The glass transition analysis suggests that the PIL block and PMMA block are partially miscible in these PIL block copolymers.

In contrast with the trends in $T_g$, the TGA thermograms (see FIG. 3D) show that there is no significant difference in thermal degradation temperature ($T_d$, determined by 5 wt % loss) between these PIL block and random copolymers.

For these PIL block copolymers, $T_d$ slightly increases from 257-284° C. (Table 3) with increasing PIL composition from 4 to 15.7 mol %, while there is almost negligible change in $T_d$ (ca. 260° C.) (Table 3) for PIL random copolymers. This slight increase in $T_d$ in these PIL block and random copolymers compared with their PMMA homopolymers is due to the higher $T_d$ of the MEBIm-TFSI block ($T_d$=363° C.). Note that the $T_d$s for PMMA macro-CTA synthesized by RAFT polymerization and PMMA homopolymer synthesized by free radical polymerization are 260° C. and 250° C., respectively.

TABLE 3

Thermal Properties of PIL Block and Random Copolymers with TFSI as Counteranion.

| | mol % | vol %[b] | $T_d$ (° C.)[c] | $T_g$ (° C.)[d] |
|---|---|---|---|---|
| PIL Block Copolymers[a] | | | | |
| Poly(MMA-b-MEBIm-TFSI-4.3) | 4.3 | 16.5 | 257 | 121 |
| Poly(MMA-b-MEBIm-TFSI-7.1) | 7.1 | 25.2 | 270 | 85, 119 |
| Poly(MMA-b-MEBIm-TFSI-8.3) | 8.3 | 28.6 | 276 | 78, 117 |
| Poly(MMA-b-MEBIm-TFSI-12.3) | 12.3 | 38.5 | 277 | 62, 116 |
| Poly(MMA-b-MEBIm-TFSI-13.4) | 13.4 | 40.8 | 286 | 64, 109 |
| Poly(MMA-b-MEBIm-TFSI-15.7) | 15.7 | 45.3 | 284 | 63, 106 |
| PIL Random Copolymers[a] | | | | |
| Poly(MMA-r-MEBIm-TFSI-3.7) | 3.7 | 14.5 | 260 | 117 |
| Poly(MMA-r-MEBIm-TFSI-4.9) | 4.9 | 18.6 | 263 | 114 |
| Poly(MMA-r-MEBIm-TFSI-6.7) | 6.7 | 24.1 | 259 | 110 |
| Poly(MMA-r-MEBIm-TFSI-12.3) | 12.3 | 38.5 | 267 | 99 |
| Poly(MMA-r-MEBIm-TFSI-13.3) | 13.3 | 40.7 | 265 | 98 |
| Poly(MMA-r-MEBIm-TFSI-15.4) | 15.4 | 44.7 | 268 | 93 |

[a]Numbers correspond to PIL mole %, which was determined from $^1$H NMR spectroscopy;
[b]Volume fractions calculated from density of PMMA (1.18 g cm$^{-3}$) and PIL homopolymers (1.37 g cm$^{-3}$, see Supporting Information);
[c]Determined at 5% weight loss;
[d]Determined by mid-point method.

Example 1.6: Morphology

Small angle X-ray scattering (SAXS) was performed on PIL block and random copolymer samples both through and in the plane of the films. The Cu X-ray was generated from a Nonius FR 591 rotating-anode generator operated at 40 kV and 85 mA. The bright, highly collimated beam was obtained via Osmic Max-Flux optics and pinhole collimation in an integral vacuum system. The SAXS and WAXS scattering data were collected using a Bruker Hi-Star two-dimensional detector at a sample-to-detector distance of 150 cm and 11 cm, respectively. Using the Datasqueeze software, isotropic 2-D scattering patterns were converted to 1-D plots using azimuthal angle integration (0-360°). The scattering intensity was first corrected for the primary beam intensity, and then the background scattering from an empty cell was subtracted for correction. Morphologies were also studied using a JEOL 2010F transmission electron microscope (TEM) operating at 200 kV. PIL block copolymer samples were sectioned at room temperature using a Reichert-Jung ultra-microtome with a diamond knife. Polymer samples with ultrathin sections of ca. 40-60 nm nominal thickness were collected on copper grids for examination. The interdomain distance in the TEM was determined from fast Fourier transforms (FFTs) produced by Gatan Digital Micrograph™ (DM) software.

Figure 4A:
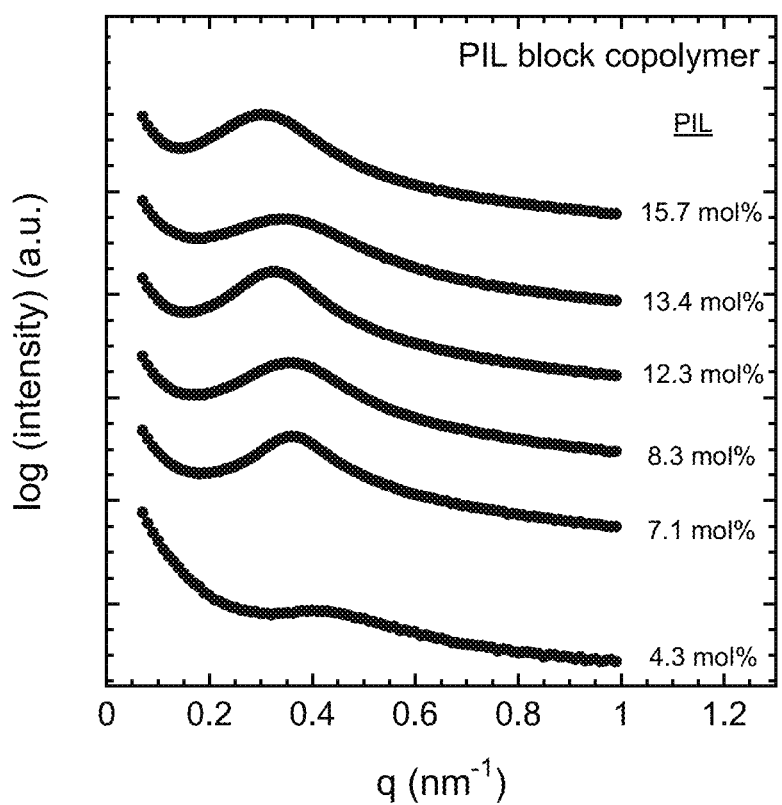
FIG. 4A-B show through-plane small angle X-ray scattering profiles of PIL (FIG. 4A) block and (FIG. 4B) random copolymers (containing TFSI counteranions), as described in Example 1.6. Numbers on graph correspond to PIL composition (mole %). Data in (FIG. 4A) is vertically offset for clarity.
Figure 4B:
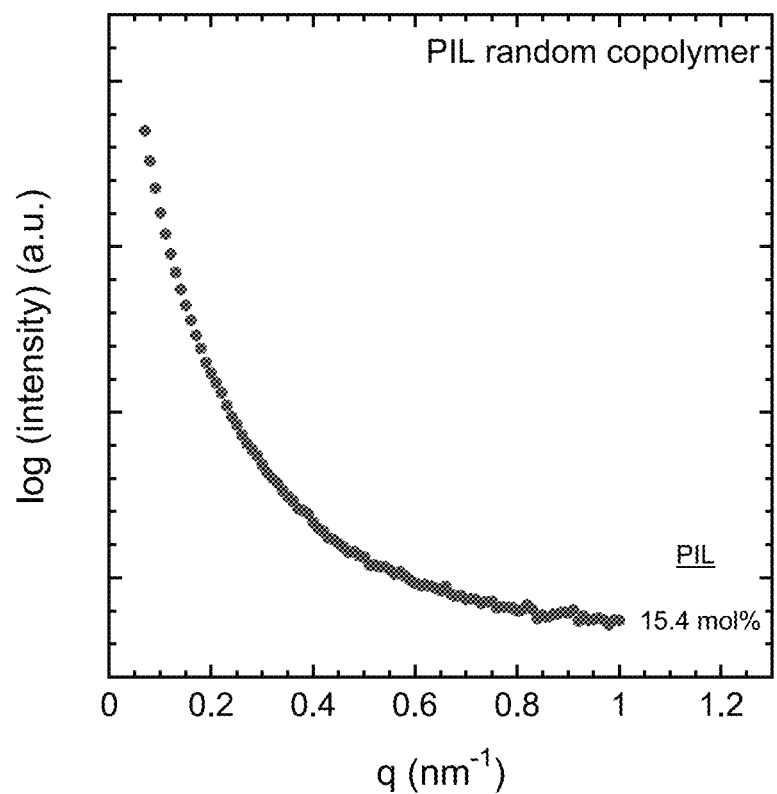
Figure 5A:
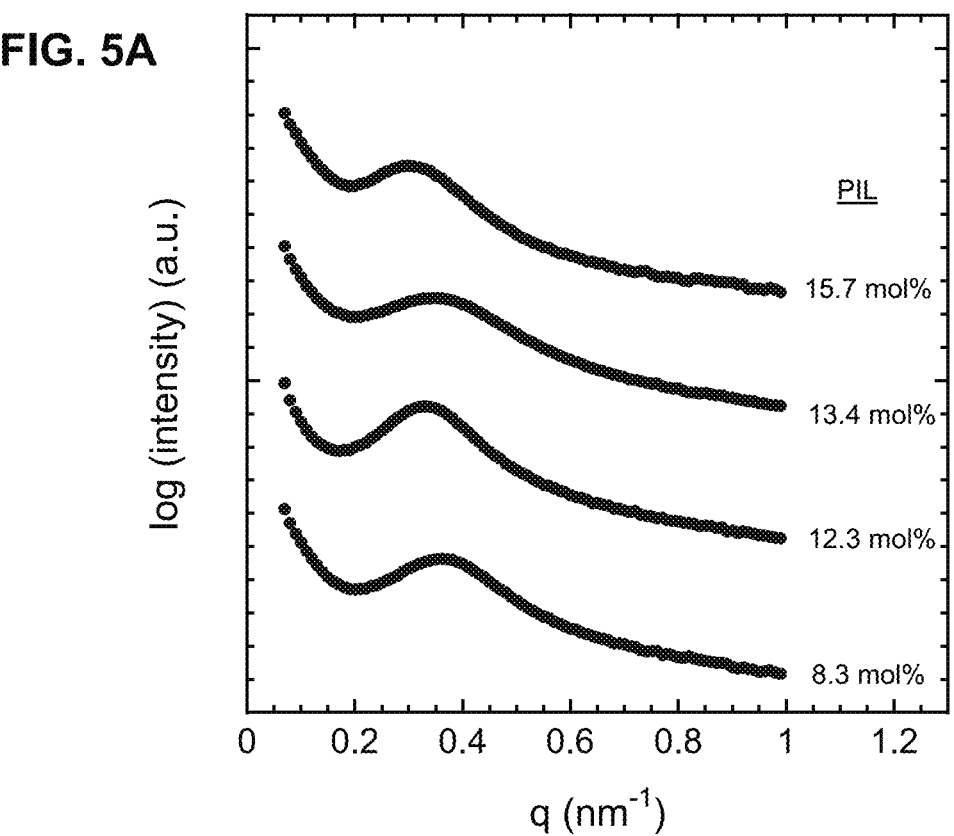
FIG. 5A shows in-plane SAXS profiles of PIL block copolymers (containing TFSI counter anions), as described in Example 1.6. Numbers on graph correspond to PIL composition (mole %). Data is vertically offset for clarity.
Figure 5B:
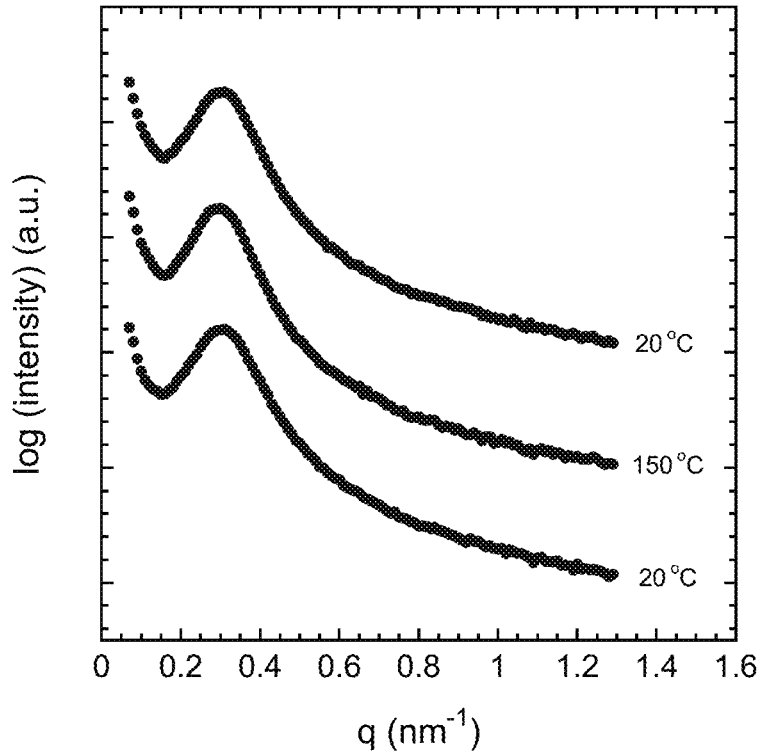
FIG. 5B shows SAXS for a PIL block copolymer (PIL=15.7 mole %; TFSI counter anions) as a function of temperature. Data is vertically offset for clarity.

FIG. 4 shows through-plane SAXS profiles for both PIL block and random copolymers with TFSI counteranions. The scattering profiles (FIG. 4A) of these PIL block copolymers at PIL compositions from 4.3 to 15.7 mol % show one broad primary scattering peak. This one peak is indicative of a microphase-separated morphology; however, the lack of multiple reflections suggests that there is no long-range periodicity and that the two blocks are not strongly microphase separated. This is in good agreement with the $T_g$ trends observed for both blocks as a function of PIL composition (FIG. 3A). Additionally, the peak position (q*) decreases from 0.42 to 0.30 nm$^{-1}$ with increasing PIL composition, except for PIL block copolymer at a PIL composition of 13.4 mol %. This decrease in peak location corresponds to an increase in interdomain distance from ca. 15 to 21 nm with increasing PIL composition as calculated by 2π/q*. It should be also noted that there was no difference in scattering patterns between in-plane (see FIG. 5A) and through-plane scattering profiles (FIG. 4A), indicating an isotropic morphology in these PIL block copolymers at all PIL compositions. Temperature-dependent X-ray scattering indicates that there is no change in morphology type for the temperature range of 30 to 150° C. (see FIG. 5B). In contrast to the PIL block copolymers, the scattering profile of the PIL random copolymer at 15.4 mole % PIL composition in FIG. 4B shows a featureless decay with increasing q as is consistent with the absence of microphase separation. PIL random copolymers at other PIL compositions show similar SAXS patterns (data not shown). This data corroborates with the one $T_g$ observed in the PIL random copolymers (FIG. 3B).

Figure 6:
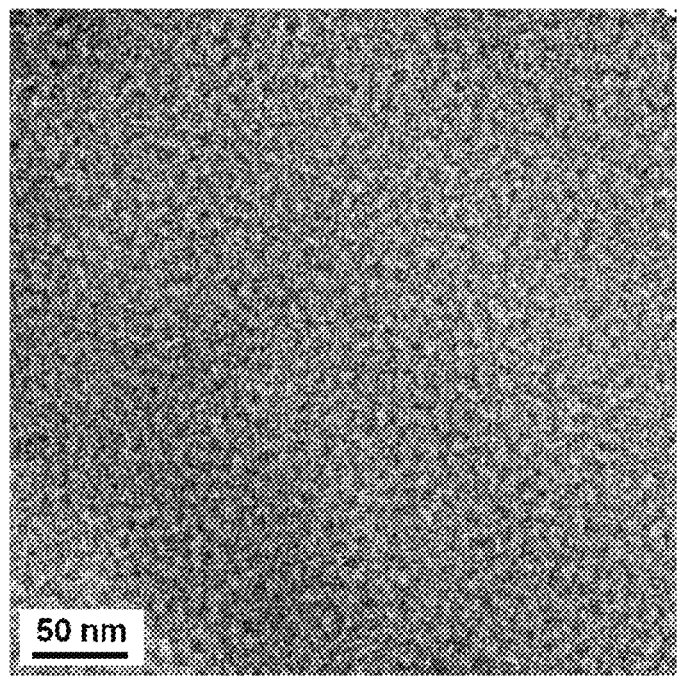
FIG. 6 is a TEM image of a PIL block copolymer, poly(MMA-b-MEBIm-TFSI-13.4), as described in Example 1.6. FFTs of images find characteristic lengths of 12 to 15 nm.

FIG. 6 shows a TEM image of the PIL block copolymer with 13.4 mole % PIL. The TEM image clearly indicates a microphase-separated morphology with no long-range periodic order, which is consistent with the DSC and SAXS results. The measured interdomain distance is in the range of 12 to 15 nm, which is slightly smaller than the results obtained from SAXS (ca. 18 nm) for the 13.4 mole % PIL block copolymer. This discrepancy could be the consequence of compression during microtomy.

Example 1.7: Ionic Conductivity

The ionic conductivities of polymer films were measured with electrochemical impedance spectroscopy (EIS; Solartron, 1260 impedance analyzer, 1287 electrochemical interface, Zplot software) over a frequency range of 1 Hz to $10^6$ Hz at 200 mV. Conductivities were collected in an environmental chamber (Tenney, BTRS model), where temperature and relative humidity (<10% RH) were controlled. The in-plane conductivities of the PIL films were measured in a cell with four-parallel electrodes, where an alternating current was applied to the outer electrodes and the real impedance or resistance, R, was measured between the two inner reference electrodes. The resistance was determined from a high x-intercept of the semi-circle regression of the Nyquist plot. Conductivity was calculated by using the following equation: σ=L/AR, where L and A are the distance between two inner electrodes and the cross sectional area of the polymer film (A=Wl; W is the film width and l is the film thickness), respectively. Samples were allowed to equilibrate for 2 h at each temperature at <10% RH followed by 6 measurements at the equilibrium condition. The values reported are an average of these steady-state measurements.

Figure 7:
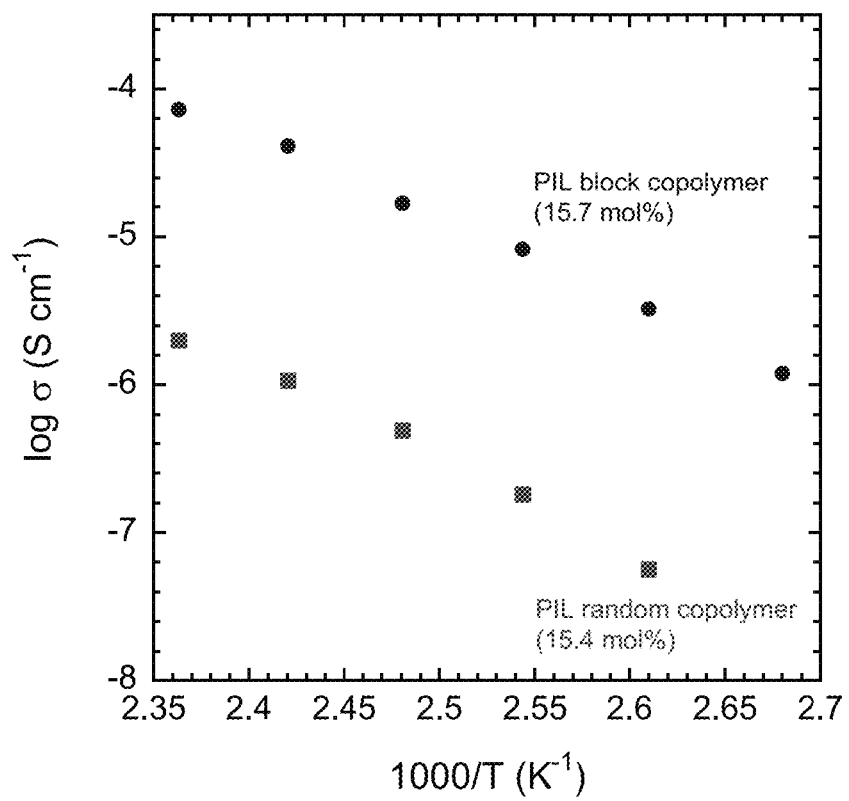
FIG. 7 shows data for the temperature-dependent ionic conductivity for (a) PIL block copolymers (circles) and (b) PIL random copolymers (squares) copolymers with TFSI counteranions with comparable PIL composition, as described in Example 1.7.
Figure 8:
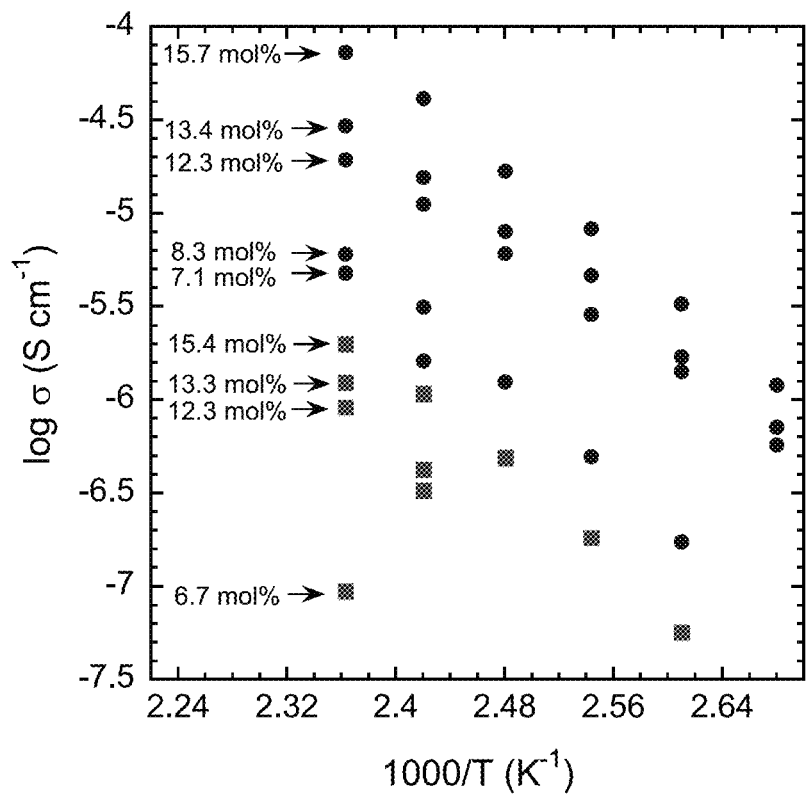
FIG. 8 shows data for the temperature-dependent ionic conductivity of PIL block (circles) and random (squares) copolymers as a function of PIL composition. Numbers on graph correspond to PIL composition (mole %), as described in Example 1.7.
Figure 9:
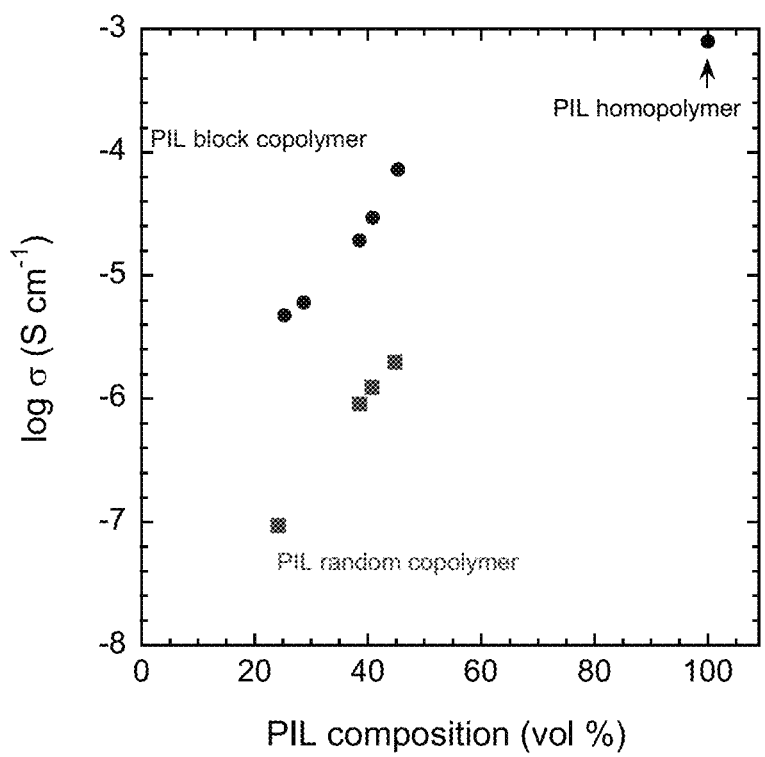
FIG. 9 shows data for the ionic conductivities at 150° C. of PIL block copolymers (circles) and PIL random copolymers (squares) with TFSI counteranions as a function of PIL composition (vol %). The PIL homopolymer conductivity is shown for reference, as described in Example 1.7.
Figure 11B:
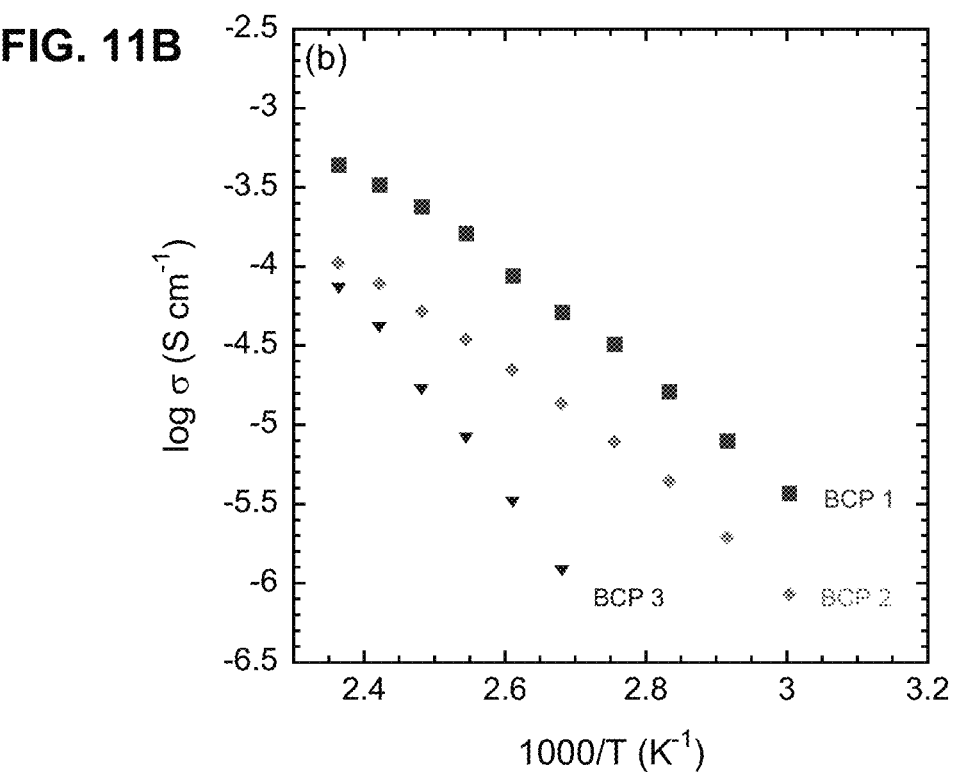
Figure 11C:
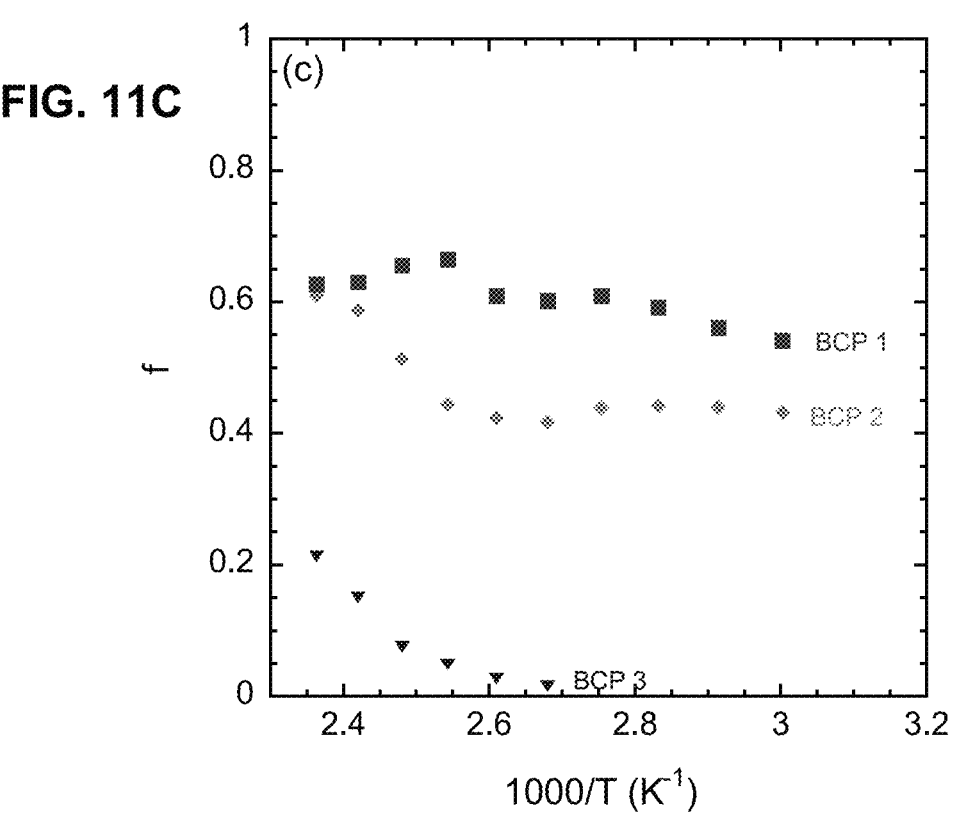

FIG. 7 shows a comparison of temperature-dependent ionic conductivity of the PIL block and random copolymers bearing TFSI counteranions at a comparable PIL composition. Surprisingly, the ionic conductivities of this PIL block copolymer are ca. 2 orders of magnitude higher than that of this PIL random copolymer at all temperatures investigated. A similar ca. 2 orders of magnitude difference was observed for these PIL block and random copolymers at other PIL compositions ranging from ca. 7 to 15 mole % (see FIG. 8). This difference is further illustrated in FIG. 9 where the ionic conductivities of the PIL block and random copolymers are plotted as a function of PIL composition (vol %) at a fixed temperature (150° C.).

For polymer electrolytes, ionic conductivity is strongly dependent on polymer segmental relaxation and the local concentration of conducting ions (i.e., dissociated ions). The fact that ionic conductivity primarily depends on $T_g$ is due to the coupling of ion motion with polymer segmental dynamics. Thus, one would expect a difference in conductivity when comparing a strongly microphase-separated ionic block copolymer to that of an ionic random copolymer due to the significantly lower $T_g$ in the ionic block microdomains of the block copolymer compared to the higher $T_g$ in the homogeneous random copolymer. However, in this case, the weakly microphase-separated PIL block copolymers have slightly lower $T_g$s in the PIL block (e.g., 63° C. at 15.7 mole % PIL) compared to the PIL random copolymers (e.g., 93° C. at 15.4 mole % PIL). Therefore, it is surprising that a relatively modest difference in $T_g$ produces an increase in ionic conductivity of ca. 2 orders of magnitude. For comparison, this PIL homopolymer with different counter ions of similar size resulted in differences in $T_g$ of 35° C., but produced only modest differences in conductivity.

Another factor that affects ion transport in a solid-state polymer electrolyte is the local concentration of conducting ions. In comparison with a random copolymer where TFSI anions are homogeneously distributed, a block copolymer has a much higher local ion concentration even at the same overall PIL composition, which can be attributed to local confinement of conducting ions in the microphase-separated ionic domains. The increase in ionic conductivity due to a favorably concentrated distribution of ions was recently reported in the mixture of poly(styrene-b-ethylene oxide) block copolymers and LiTFSI where the salt is increasingly localized in the poly(ethylene oxide) block with increasing molecular weight of the block copolymer. Similarly, due to the effect of nanodomain confinement, in the mixture of proton-conducting IL with PS-b-P2VP, an ion diffusion enhancement was observed compared to the mixture of IL with P2VP homopolymer. Note that these salt or ionic liquid-doped block copolymers exhibit lamellar structures and mobile cations and anions, while the single anion conductor PIL block copolymers in this study exhibited a weak microphase-separated morphology without periodic long-range order. This indicated that the local confinement of conducting ions greatly facilitated ion transport and significantly contributed to an increase in ionic conductivity even for a block copolymer with weakly microphase-separated morphology. Without being bound by the correctness of any given theory, this phenomenon can be attributed to the increase in local ion concentration that shortened the ion hopping distance and induces faster ion transport in the nanoscale ionic domains of block copolymers.

Example 1.8: General Remarks

A series of polymerized ionic liquid (PIL) block and random copolymers were synthesized from an ionic liquid monomer, 1-[(2-methacryloyloxy)ethyl]-3-butylimidazolium bis(trifluoromethanesulfonyl)imide (MEBIm-TFSI), and a non-ionic monomer, methyl methacrylate (MMA), at various PIL compositions with the goal of understanding the influence of morphology on ion transport. For the diblock copolymers, the partial affinity between the PIL and PMMA blocks resulted in a weakly microphase-separated morphology with no evident long-range periodic structure across the PIL composition range studied, while the random copolymers revealed no microphase separation. These morphologies were identified with a combination of techniques, including differential scanning calorimetry, small angle X-ray scattering, and transmission electron microscopy. Surprisingly, at similar PIL compositions, the ionic conductivity of the block copolymers were ca. 2 orders of magnitude higher than the random copolymers despite the weak microphase-separated morphology evidenced in the block copolymers. The higher conductivity in the block copolymers was attributed to its microphase-separated morphology, because the difference in glass transition temperature between the block and random copolymers is insignificant. Therefore, this work demonstrated that local confinement of conducting ions in nanoscale ionic domains in PIL block copolymers can accelerate ion transport significantly.

Example 2: Effect of Nanostructured Morphology on Ion Transport in Polymerized Ionic Liquid Block Copolymers In this study, a series of strongly microphase-separated polymerized ionic liquid (PIL) diblock copolymers, poly(styrene-b-1-((2-acryloyloxy)ethyl)-3-butylimidazolium bis(trifluoromethanesulfonyl)imide) (poly(S-b-AEBIm-TFSI)), were synthesized to explore relationships between morphology and ionic conductivity. Using small-angle X-ray scattering and transmission electron microscopy, a variety of self-assembled nanostructures including hexagonally packed cylinders, lamellae, and coexisting lamellae and network morphologies were observed by varying PIL composition (6.6-23.6 PIL mol %). At comparable PIL composition, this acrylate-based PIL block copolymer with strong microphase separation exhibited ~1.5-2 orders of magnitude higher ionic conductivity than a methacrylate-based PIL block copolymer with weak microphase separation. Remarkably, high ionic conductivity (0.88 mS cm-1 at 150° C.) and a morphology factor (normalized ionic conductivity, f) of ~1 was achieved through the morphological transition from lamellar to a coexistence of lamellar and three-dimensional network morphologies with increasing PIL composition in anhydrous single-ion conducting PIL block copolymers, which highlights a good agreement with the model predictions. In addition to strong microphase separation and the connectivity of conducting microdomains, the orientation of conducting microdomains and the compatibility between polymer backbone and IL moiety of PIL also significantly affect the ionic conductivity. This study provides avenues to controlling the extent of microphase separation, morphology, and ion transport properties in PIL block copolymers for energy conversion and storage applications.

Example 2.1: Materials

Acryloyl chloride (97%, contains <210 ppm monomethyl ether hydroquinone (MEHQ) as stabilizer), 2-bromoethanol (95%), triethylamine (≥99.5%), dichloromethane (≥99.5%), potassium bicarbonate (KHCO3, 99.7%), magnesium sulfate (anhydrous, 99%), calcium hydride (CaH$_2$, 95%), 4-cyano-4-[(dodecylsulfanylthiocarbonyl)sulfanyl]pentanoic acid (chain transfer agent (CTA), >97%, HPLC), tetrahydrofuran (THF, ≥99.9%, HPLC), methanol (99.8%), 1-butylimidazole (98%), N,N-dimethylformamide (DMF, 99.9%, HPLC), hexanes (≥98.5%), lithium bis(trifluoromethanesulfonyl)imide (LiTFSI, 97%), acetonitrile (anhydrous, 99.8%), deuterated chloroform (CDCl3, 99.96 atom % D, contains 0.03% v/v TMS), and dimethyl-d6 sulfoxide (DMSO-d6, 99.9 atom % D, contains 0.03% v/v TMS) were used as received from Sigma-Aldrich. Azobis(isobutyronitrile) (AIBN, 98%, Sigma-Aldrich) was purified by recrystallization twice from methanol. Styrene (S, 99%, Sigma-Aldrich) was purified by distillation over CaH2 at a reduced pressure. Ultrapure deionized (DI) water with resistivity ca. 16 MΩ cm was used as appropriate.

Example 2.2. Syntheses

A series of acrylate-based PIL block copolymers with various PIL compositions were synthesized via the following route: sequential RAFT polymerization, quaternization reaction, and anion exchange reaction. Overall, the synthesis route was similar that described in Example 1. A major difference is that the imidazolium moiety was not introduced in the stage of monomer synthesis (Scheme 5), but in the polymer stage (Scheme 6). The advantage of this synthesis route was that it facilitates the modular synthesis of a series of PIL block copolymers at constant average degree of polymerization and molecular weight distribution with varied structures and functionalities, thus enabling an experimentalist to vary the physical properties by selecting different PIL chemical structures. For the characterizations, the chemical structure was analyzed by $^1$H NMR (see Example 2.4). The compositions shown in Table 4 were determined from relative integrations of proton resonances of the imidazolium ring at C(4,5) (g, h) positions versus the sum of all styrenic proton resonances at ortho (a), meta (b), and para positions (c). The molecular weight determined by SEC was in the range from 9.95 to 18.80 kg mol-1 with polydispersity ranging from 1.24 to 1.28. Note that the polydispersity was determined from the neutral block copolymer, poly(S-b-BrEA), before the quaternization reaction. The efficacy of ion exchange from the Br anion form to TFSI anion form was confirmed by elemental analysis.

Example 2.2.1: Synthesis of 2-Bromoethyl Acrylate (BrEA)

The synthesis of 2-bromoethyl acrylate (BrEA) monomer is shown in Scheme 5. A typical experimental procedure is described as follows. To a three-neck 500 mL flask in an ice bath, the mixture of 37.47 g (0.3 mol) of 2-bromoethanol and 30 mL of dichloromethane solvent was charged into the reactor. Under the nitrogen environment, the mixture of 30.66 g (0.303 mol) of triethylamine and 40 mL of dichloromethane was added into the reactor, followed by slowly adding the mixture of 27.42 g (0.303 mol) of acryloyl chloride and 30 mL of dichloromethane in the reactor through an addition funnel. After addition, the ice bath was removed. The reaction mixture was stirred at room temperature for 18 h, and then the white solid precipitants (a byproduct) were removed by filtration. The liquid filtrate was neutralized with KHCO$_3$ solution first and then further stirred with 200 mL of DI water 4 times to completely drive residual salt into the water layer. The water layer (byproduct) was removed by a separation funnel, and the residual water in the organic layer was further removed using anhydrous magnesium sulfate. After the removal of the dichloromethane solvent under vacuum, 38.57 g of the organic liquid product BrEA was obtained (clear pale yellow liquid with a 71.8% yield). $^1$H NMR (500 MHz, CDCl$_3$, 23° C.) δ (ppm): 6.51-6.45 (d, 1H, HCH=CH), 6.22-6.12 (m, 1H, HCH=CH), 5.92-5.88 (d, 1H, HCH=CH), 4.51-4.47 (m, 2H, O—CH$_2$—CH$_2$—Br), 3.59-3.55 (m, 2H, O—CH$_2$—CH$_2$—Br).

Scheme 5. Synthesis of poly(S-b-AEBIm-TFSI) block copolymers. (1) 4-cyano-4-[(dodecylsulfanylthiocarbonyl)sulfanyl] pentanoic acid) (chain transfer agent), 100° C., 26 hrs; (2) 2-bromoethyl acrylate (BrEA), AIBN, THF, 55° C., 6 hrs; (3) 1-butylimidazole, DMF, 80° C., 48 hrs; (4) LiTFSI, DMF, 80° C., 24 h

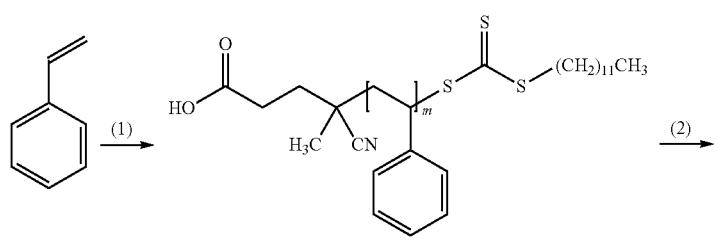

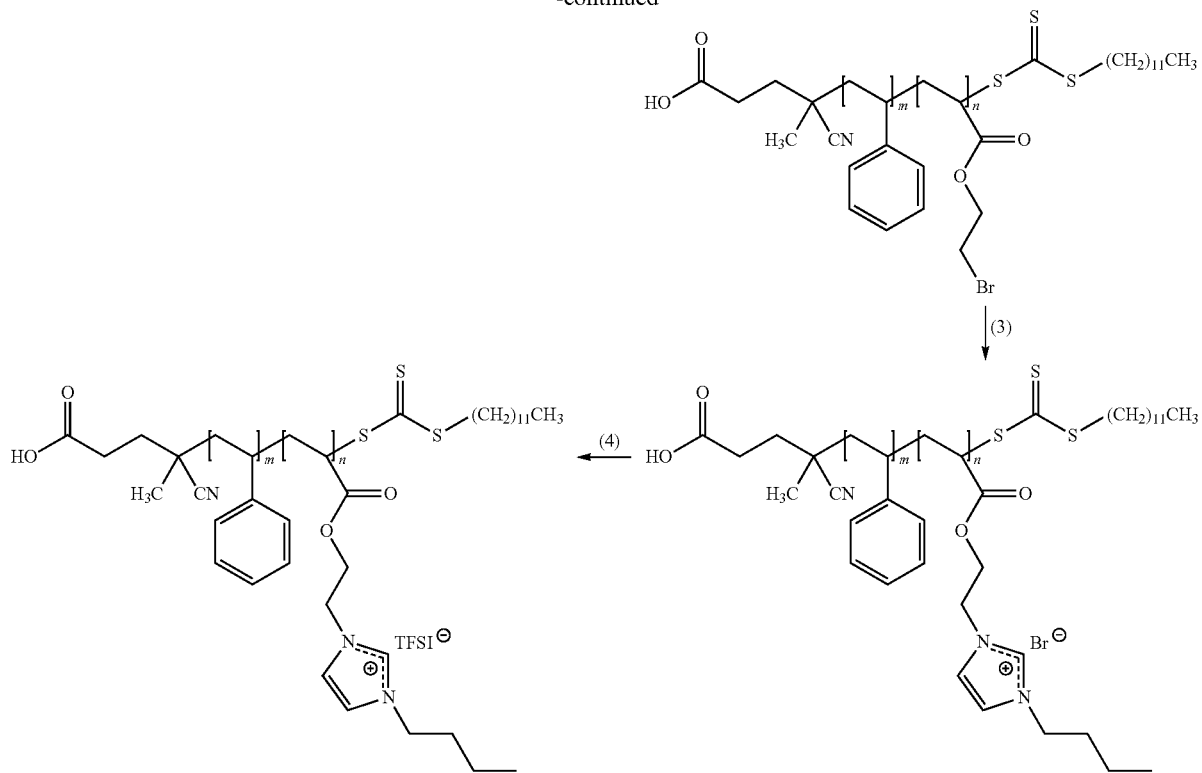

Example 2.2.2: Synthesis of PS Macro-CTA

The preparation of PS macro-chain transfer agent (macro-CTA) is shown in Scheme 5(1). 34.55 g of S (0.332 mol) was mixed with 334.8 mg of CTA (0.829 mmol) in a 250 mL single-neck Schlenk flask. The flask was subjected to four freeze-pump-thaw degassing cycles followed by sealing the reactor and carrying out the reaction under static vacuum at 100° C. for 26 h. The resulting polymer was twice precipitated in methanol and dried under vacuum in an oven at room temperature for 24 h. Yield: 6.01 g of solid particles (17.4%). $^1$H NMR (500 MHz, CDCl$_3$, 23° C.) δ (ppm): 7.22-6.28 (m, 5H, C$_6$H$_5$), 2.40-1.66 (m, 1H, CH2CH), 1.66-1.12 (m, 2H, CH$_2$CH); SEC (THF, 40° C.): Mn=7.54 kg mol-1, Mw/Mn=1.14 (against PS standards).

Scheme 6. Synthesis of 2-bromoethyl acrylate (BrEA) monomer-(1) triethylamine, dichloromethane, room temperature, 18 h

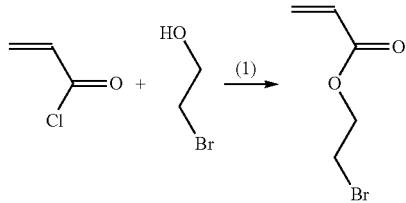

Example 2.2.3: Synthesis of Diblock Copolymer Poly(S-b-BrEA)

The synthesis of the block copolymer (poly(S-b-BrEA)) is shown in Scheme 5(2). A typical example is given as follows. 0.390 g of BrEA monomer (2.176 mmol), 0.328 g of PS macro-CTA (0.044 mmol), and 0.71 mg of AIBN (0.004 mmol) were mixed with 18 mL of THF solvent in a 50 mL Schlenk flask and subjected to four freeze-pump-thaw degassing cycles. After degassing, the reactor was sealed, and the reaction was then carried out under static vacuum at 55° C. for 6 h. The resulting copolymer was twice precipitated in methanol, filtered, and then dried under vacuum in an oven at 40° C. for 24 h. Yield: 0.359 g of solid particles (50.0%). $^1$H NMR (500 MHz, CDCl$_3$, 23° C.) δ (ppm): 7.24-6.28 (m, 5H, C$_6$H$_5$), 4.40 (s, 2H, O—CH$_2$—CH$_2$—Br), 3.56 (s, 2H, O—CH$_2$—CH$_2$—Br), 2.60-1.66 (m, 1H, CH$_2$CH), 1.66-0.70 (m, 2H, CH$_2$CH); SEC (THF, 40° C.): Mn=9.44 kg mol-1, Mw/Mn=1.26 (against PS standards).

Example 2.2.4: Synthesis of Diblock Copolymer Poly(S-b-AEBIm-Br)

The synthesis of poly(S-b-AEBIm-Br) was prepared by a quaternization reaction (Scheme 6). A typical reaction process is given as follows. 0.269 g of poly(S-b-BrEA-24) (0.518 mmol Br) and 0.321 g of 1-butylimidazole (2.59 mmol) were mixed with 3 mL of DMF solvent in a 40 mL vial, followed by stirring at 80° C. for 48 h. The reaction mixture was three times precipitated in hexanes and extensively washed with hexanes. The resulting polymer was dried in a vacuum oven for 24 h. Yield: 0.303 g of solid particles (90.9%). $^1$H NMR (500 MHz, DMSO-d$_6$, 23° C.) δ (ppm): 9.90 (s, 1H, N—CH=N), 8.08-7.95 (d, 2H, N—CH=CH—N), 7.30-6.26 (m, 5H, C$_6$H$_5$), 4.80-4.05 (d, 4H, N—CH$_2$—CH$_2$—O, N—CH$_2$—CH$_2$—CH$_2$—CH$_3$), 3.56 (s, 4H, N—CH$_2$—CH$_2$—O, N—CH$_2$—CH$_2$—CH$_3$), 2.10-1.66 (m, 1H, CH$_2$CH), 1.66-1.10 (m, 2H, CH$_2$CH), 1.00-0.60 (m, 5H, N—CH$_2$—CH$_2$—CH$_2$—CH$_3$, N—CH$_2$—CH$_2$—CH$_2$—CH$_3$).

Example 2.2.5: Synthesis of Diblock Copolymer Poly(S-b-AEBIm-TFSI)

The anion exchange from poly(S-b-AEBIm-Br) to poly(S-b-AEBIm-TFSI) is shown in Scheme 5(4). In a typical procedure, poly(S-b-AEBIm-Br-24) (0.303 g, 0.464 mmol Br) and LiTFSI (0.665 g, 2.319 mmol) were mixed with DMF (3 mL) and then stirred at 50° C. for 24 h. The reaction mixture was twice precipitated into methanol/water (1/1 v/v) and washed extensively with DI water. The resulting polymer was filtered and dried under vacuum in an oven at 40° C. for 24 h. Yield: 0.354 g of solid particles (87.7%). $^1$H NMR (500 MHz, DMSO-$d_6$, 23° C.) δ (ppm): 9.13 (s, 1H, N—CH=N), 7.78-7.67 (d, 2H, N—CH=CH—N), 7.30-6.30 (m, 5H, $C_6H_5$), 4.90-3.90 (m, 4H, N—$CH_2$—$CH_2$—O, N—$CH_2$—$CH_2$—$CH_2$—$CH_3$), 3.59 (s, 4H, N—$CH_2$—$CH_2$—O, N—$CH_2$—$CH_2$—$CH_2$—$CH_3$), 2.40-1.66 (m, 1H, $CH_2$CH), 1.66-1.10 (m, 2H, $CH_2$CH), 1.00-0.70 (m, 5H, N—$CH_2$—$CH_2$—$CH_2$—$CH_3$, N—$CH_2$—$CH_2$—$CH_2$—$CH_3$). Elemental Analysis Anal. Calcd: C, 57.00; H, 5.39; N, 5.00; F, 13.56; S, 7.63; Br, 0.00. Found: C, 55.58; H, 5.49; N, 4.86; F, 12.26; S, 7.39; Br, 0.00.

TABLE 4

Acrylate-Based PIL Block Copolymer Samples (Poly(S-b-AEBIm-TFSI)).

| Sample[a] | mol % | wt % | vol %[b] | $M_n$ (kg mol$^{-1}$)[c] | PDI[d] | Morphology[e] |
|---|---|---|---|---|---|---|
| Poly(S-b-AEBIm-TFSI-6.6) | 6.6 | 24.2 | 18.3 | 9.95 | 1.24 | C |
| Poly(S-b-AEBIm-TFSI-12.2) | 12.2 | 40.2 | 32.0 | 12.60 | 1.27 | C |
| Poly(S-b-AEBIm-TFSI-17.0) | 17.0 | 49.8 | 41.0 | 15.00 | 1.28 | L |
| Poly(S-b-AEBIm-TFSI-23.6) | 23.6 | 59.9 | 51.1 | 18.80 | 1.26 | L + G |

[a]b = block copolymer, TFSI = bis(trifluoromethanesulfonyl)imide anion, numbers stand for PIL composition in mol %, determined from $^1$H NMR spectroscopy;
[b]Volume fractions calculated from density of polystyrene (0.969 g cm$^{-3}$) and PIL homopolymer (1.382 g cm$^{-3}$, see Supporting Information);
[c]Determined from the molecular weight of poly(S-b-BrEA) (SEC), PIL composition ($^1$H NMR) and the chemical structure of poly(S-b-AEBIm-TFSI);
[d]Taken from the polydispersity of poly(S-b-BrEA) (SEC);
[e]Determined from X-ray and TEM, C = cylindrical, L = lamellar, G = gyroid.
Note:
poly(S-b-AEBIm-TFSI) = poly(styrene-block-1-((2-acryloyloxy)ethyl)-3-butylimidazolium bis(trifluoromethanesulfonyl)imide)

Example 2.3: Solution-Casting PIL Block Copolymers

Block copolymers were dissolved in anhydrous acetonitrile (AcN) or THF (~10% w/w) and cast onto Teflon substrates (ca. 35 mm (L)×4 mm (W)×0.525 mm (H)). To investigate the effect of solvent evaporation on the resulting morphology and conductivity, the polymer solution was dried under ambient conditions at two solvent evaporation rates: (1) fast drying: partially covered and the solvent was allowed to evaporate in ca. 12 h; (2) slow drying: a solvent reservoir was placed next to the casting films, and the solvent was allowed to slowly evaporate over 120 h. Subsequently, polymer films were further dried by placing in a fume hood and then annealed under vacuum at 150° C. for 72 h. After annealing, no residual solvent was detected in the films with FTIRATR spectroscopy (data not shown). These annealed films were used to characterize thermal, morphological, and ion conductive properties. The film thicknesses, ranging between 100 and 200 μm, were measured with a Mitutoyo digital micrometer with ±1 μm accuracy.

Example 2.4: Characterization

All chemical structures, PIL compositions, and number-average molecular weights were characterized by $^1$H NMR spectroscopy using a Varian 500 MHz spectrometer at 23° C. with CDCl$_3$ or DMSO-$d_6$ as the solvent. (FIG. 10). The chemical shifts were referenced to tetramethylsilane (TMS). The efficacy and purity of ion exchange in PIL block copolymers were confirmed by elemental analysis (Atlantic Microlab, Inc., Norcross, Ga.). Table 5.

TABLE 5

Elemental Analysis Results of Poly(S-b-AEBIm-TFSI).

| Styrene-Based PIL Block Copolymer | wt % | C | H | N | F | S | Br |
|---|---|---|---|---|---|---|---|
| Poly(S-b-AEBIm-TFSI-6.6) | Calc. (%) | 78.00 | 6.80 | 2.02 | 5.48 | 3.08 | 0 |
| | Exp. (%) | 81.32 | 7.04 | 1.40 | 4.27 | 2.73 | 0 |
| Poly(S-b-AEBIm-TFSI-12.2) | Calc. (%) | 68.60 | 6.17 | 3.35 | 9.10 | 5.12 | 0 |
| | Exp. (%) | 70.04 | 6.25 | 3.02 | 7.42 | 4.45 | 0 |
| Poly(S-b-AEBIm-TFSI-17.0) | Calc. (%) | 62.97 | 5.79 | 4.15 | 11.26 | 6.34 | 0 |
| | Exp. (%) | 63.10 | 5.85 | 4.01 | 11.01 | 6.01 | 0 |
| Poly(S-b-AEBIm-TFSI-23.6) | Calc. (%) | 57.00 | 5.39 | 5.00 | 13.56 | 7.63 | 0 |
| | Exp. (%) | 55.58 | 5.49 | 4.86 | 12.26 | 7.39 | 0 |

The density of poly(AEBIm-TFSI) homopolymer could be estimated using the methodology described in Example 1.4, above:

$$\frac{1}{\rho} = \frac{w_{PMA}}{\rho_{PMA}} + \frac{w_{IL}}{\rho_{IL}} = \frac{0.169}{1.22} + \frac{0.831}{1.42} \quad \rho = 1.382$$

TABLE 6

PIL Block Copolymer Samples with similar PIL volume factions

| Sample[a] | Name[b] | vol %[c] | $T_{g,PIL}$ (° C.) | $M_n$ (kg mol$^{-1}$)[d] | PDI[d] | Morphology[e] |
|---|---|---|---|---|---|---|
| BCP 1 | Poly(S-b-AEBIm-TFSI-17.0) | 41.0 | −7 | 15.00 | 1.28 | L |
| BCP 2 | Poly(S-b-VBHIm-TFSI-17.0) | 43.1 | 9 | 40.70 | 1.26 | L |
| BCP 3 | Poly(MMA-b-MEBIm-TFSI-15.7) | 45.3 | 63 | 36.67 | 1.60 | M |

[a]BCP = block copolymer;
[b]Chemical structures of these block copolymers are shown above;
[c]Densities were calculated based on the volume additivity;
[d]Determined from SEC and their chemical structures;
[e]Determined from X-ray scattering profiles and TEM images: M = microphase separation.

Figure 12:
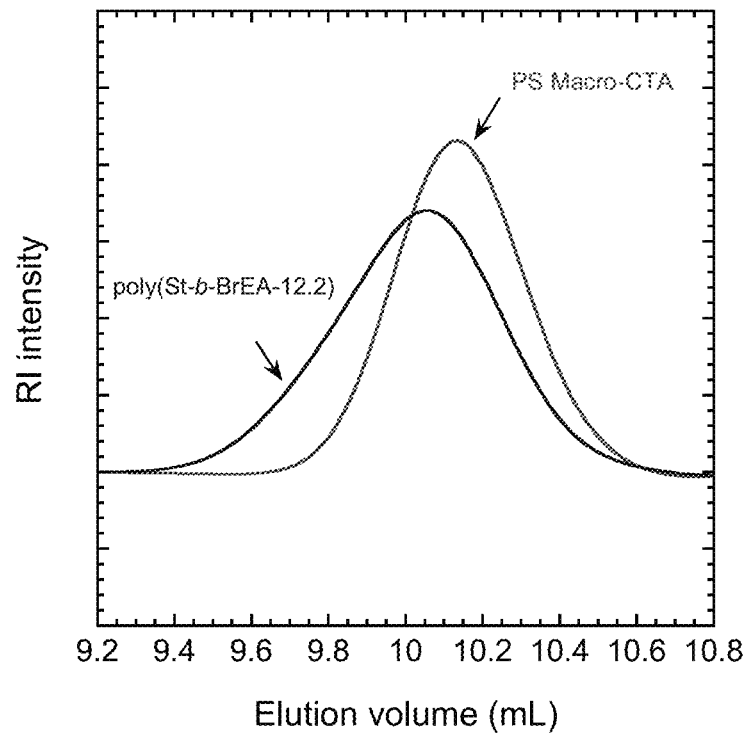
FIG. 12 show SEC chromatograms of PS macro-CTA and poly(S-b-BrEA-12.2), as described in Example 2.4.

The molecular weights and polydispersities of PS macro-CTA and PIL block copolymers were determined by size exclusion chromatography (SEC) using a Waters GPC system equipped with a THF Styragel column (Styragel™ HR 5E, effective separation of molecular weight range: 2-4000 kg mol-1) and a 2414 reflective index (RI) detector. All measurements were performed at 40° C. THF was used as a mobile phase at a flow rate of 1.0 mL/min. PS standards (Shodex, Japan) with molecular weights ranging from 2.97 to 197 kg mol$^{-1}$ were used to produce the molecular weight calibration curve. FIG. 12.

Figure 13:
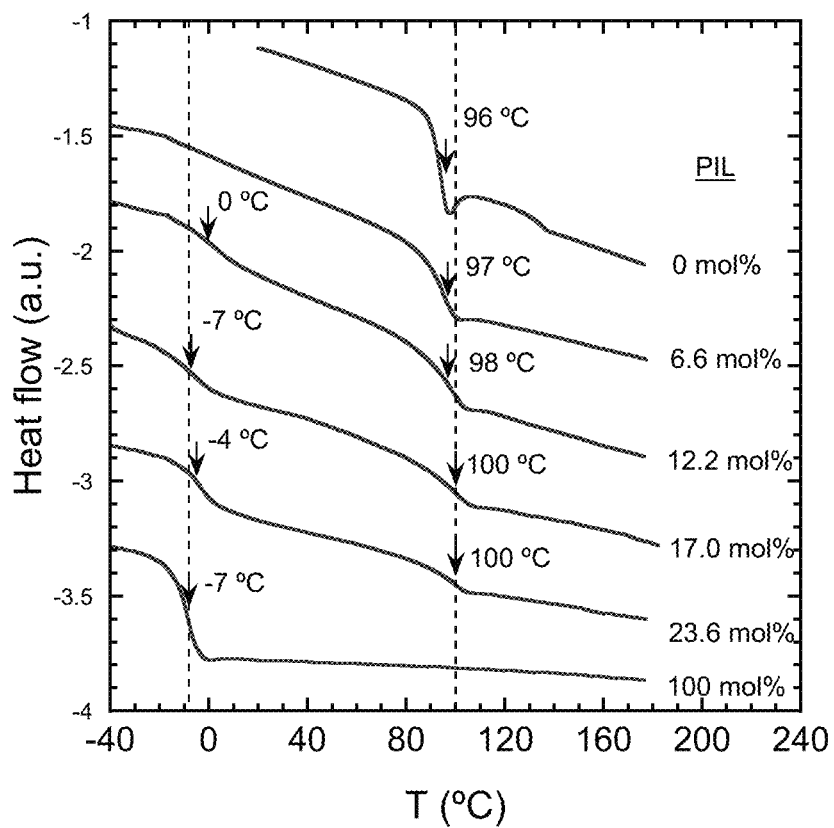
FIG. 13 shows DSC thermograms of poly(S-b-AEBIm-TFSI) at various PIL compositions, as described in Example 2.4. Dashed lines correspond to the $T_g$s of homopolymers.

Glass transition temperatures (Tgs) were determined by differential scanning calorimeter (DSC; TA Instruments, Q200) over a temperature range of −60 to 180° C. at a heating/cooling rate of 10° C./min under a $N_2$ environment using a heat/cool/heat method. Tg was determined using the midpoint method from the second thermogram heating cycle. See FIG. 13.

Figure 14:
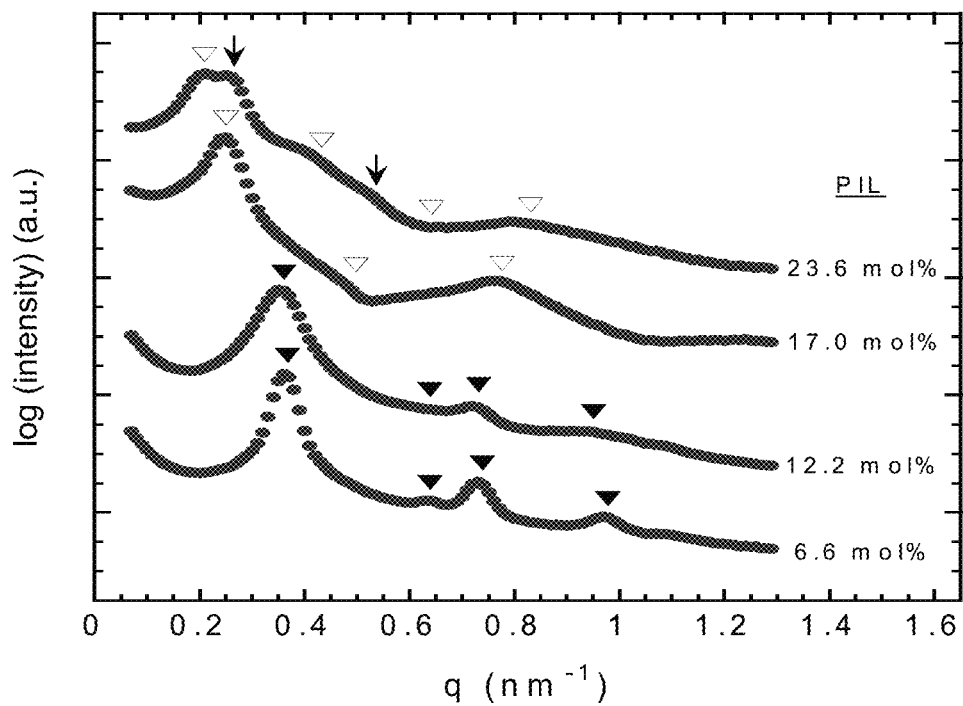
FIG. 14 shows through-plane small-angle X-ray scattering profiles of poly(S-b-AEBIm-TFSI) as a function of PIL composition (all cast from THF, and solvent evaporation for ~12 h), as described in Example 2.4. Data are offset vertically for clarity. The inverted filled triangles (▼) of 6.6 mol % and 12.2 mol % indicate expected peak positions at q*, √3q*, 2q*, √7q* for hexagonally packed cylindrical morphology. The inverted open triangles (▽) of 17.0 mol % and 23.6 mole % indicate expected peak positions at q*, 2q*, 3q*, and 4q* for lamellar morphology. The arrows (↓) of 23.6 mol % indicate observed peak positions for network (reminiscent of gyroid) morphology.
Figure 15:
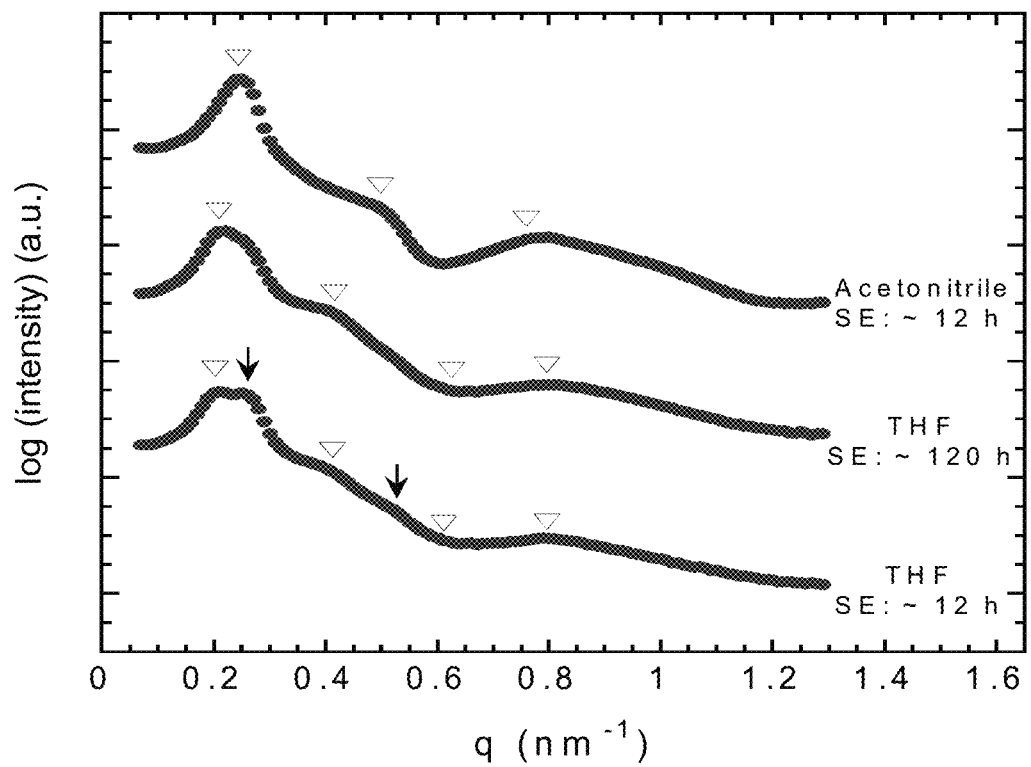
FIG. 15 shows small-angle X-ray scattering profiles of poly(S-b-AEBIm-TFSI-23.6) cast at different conditions (SE=solvent evaporation), as described in Example 2.4. Data are offset vertically for clarity. The inverted open triangles (▽) of 23.6 mole % indicate expected peak positions at q*, 2q*, 3q*, and 4q* for lamellar morphology. The arrows (↓) of 23.6 mol % indicate observed peak positions for network (reminiscent of gyroid) morphology.
Figure 16A:
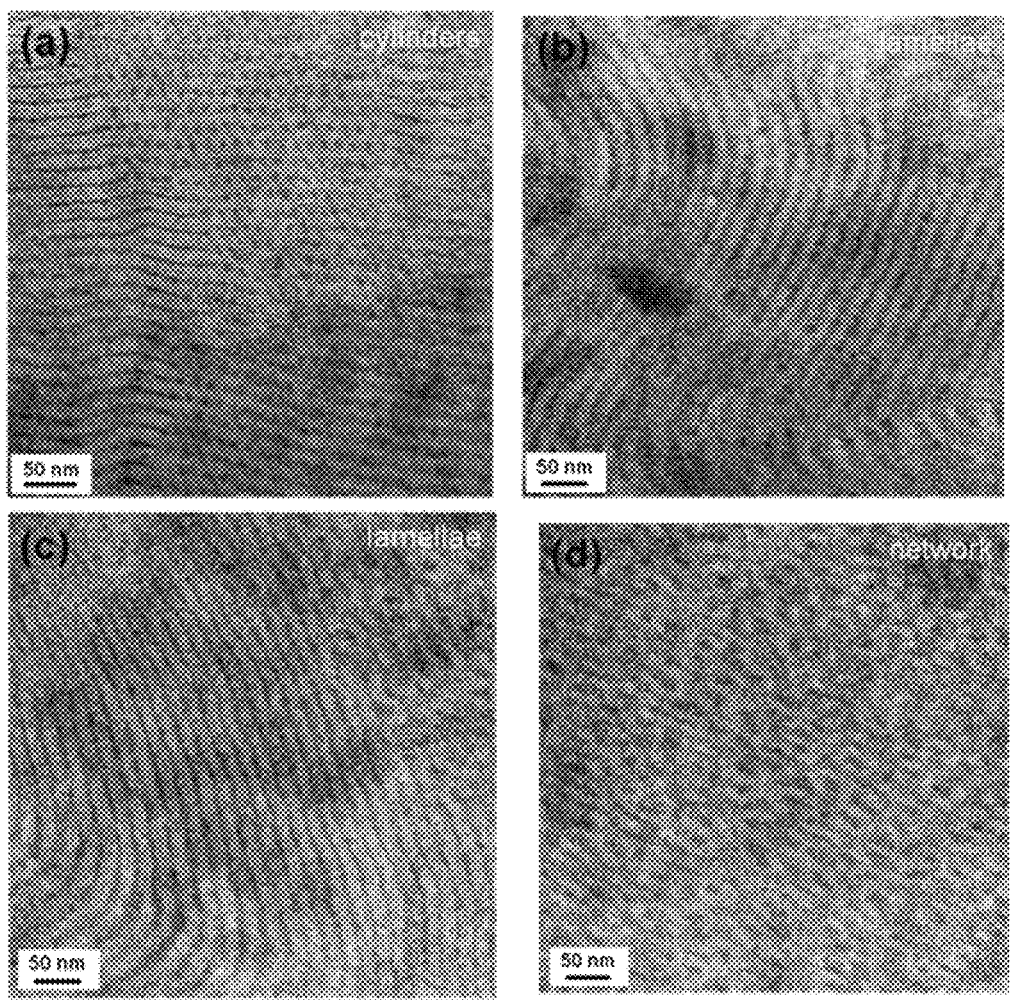
FIG. 16A shows TEM images of poly(S-b-AEBIm-TFSI) at various PIL compositions (all cast from THF, and solvent evaporation for ~12 h): (a) the lowest composition at 6.6 mol % (18.3 vol %), (b) the intermediate composition at 17.0 mol % (41.0 vol %), (c) and (d) the highest composition at 23.6 mol % (51.1 vol %). Dark microdomains correspond to the AEBIm-TFSI phase.
Figure 16B:
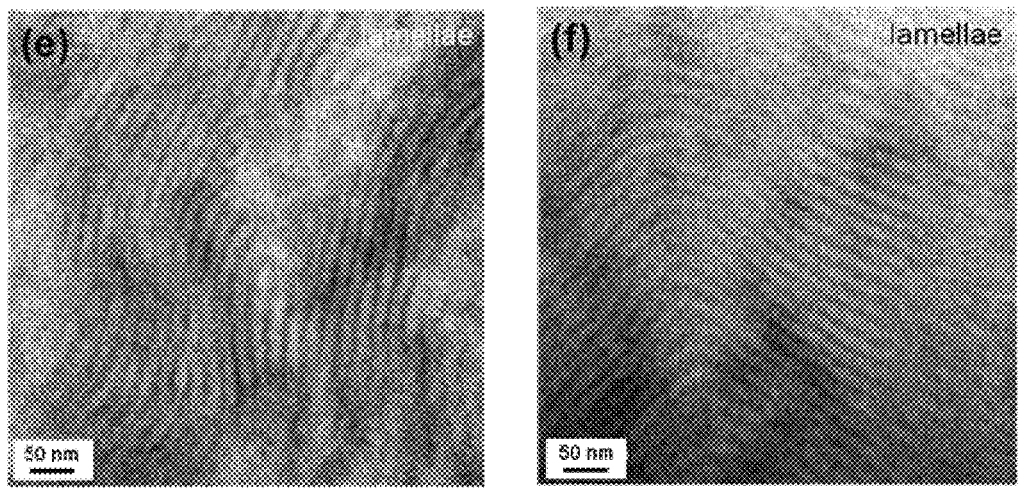
FIG. 16B shows TEM images of poly(S-b-AEBIm-TFSI-23.6) cast at different conditions: (e) cast from acetonitrile with solvent evaporation for ~12 h, and (f) cast from THF with solvent evaporation for ~120 h.
Figure 17A:
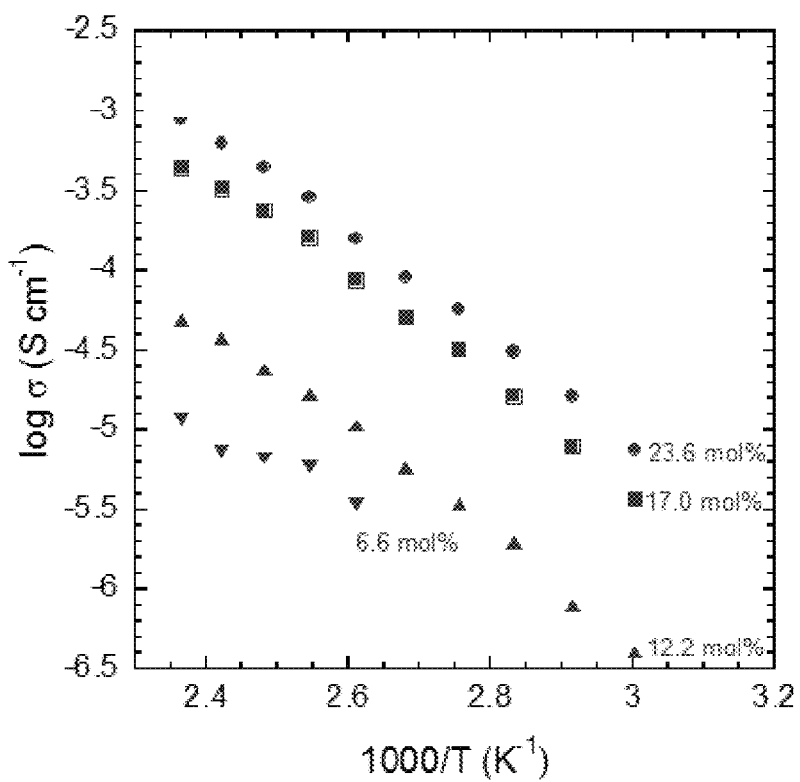
FIGS. 17A-B show the temperature-dependent (FIG. 17A) ionic conductivity and (FIG. 17B) morphology factors of poly(S-b-AEBIm-TFSI) as a function of PIL composition (all cast from THF, and solvent evaporation for ~12 h), as described in Example 2.4.
Figure 17B:
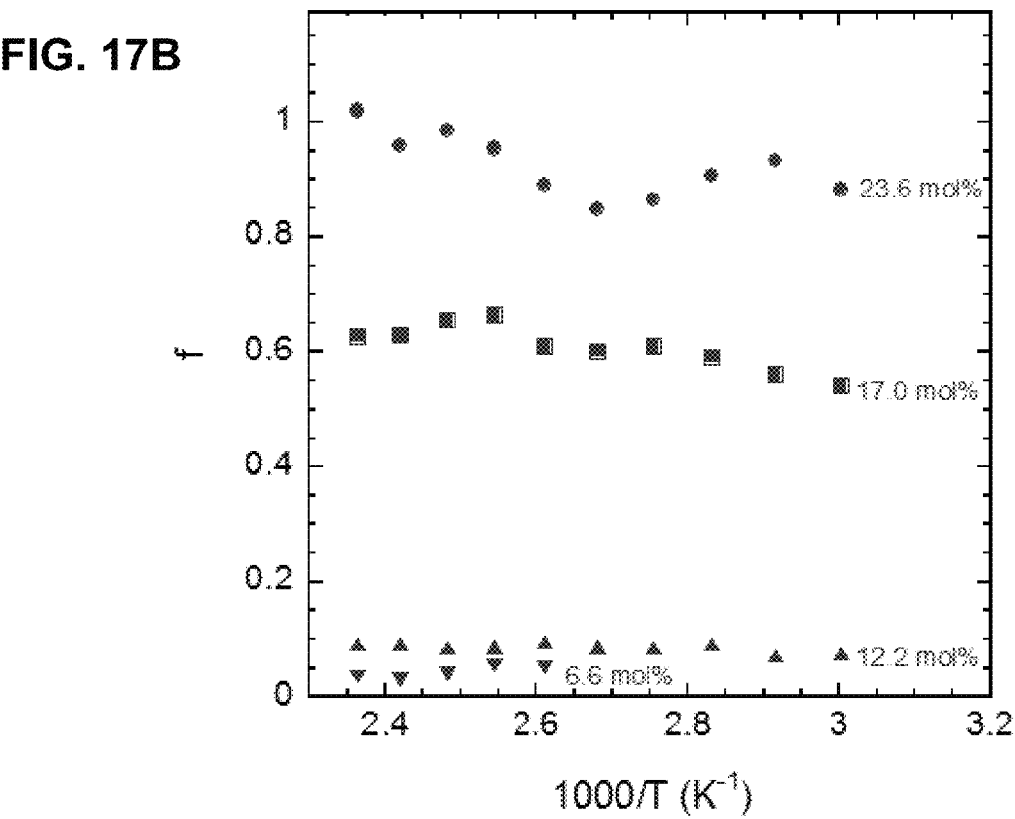
Figure 18A:
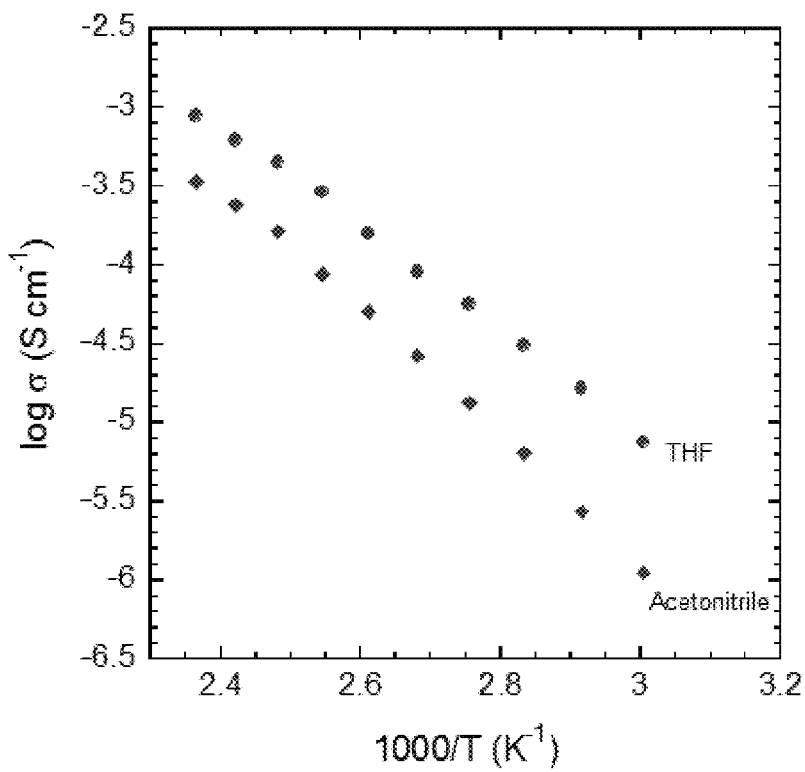
FIGS. 18A-B show the temperature-dependent (FIG. 18A) ionic conductivities, and (FIG. 18B) morphology factors of poly(S-b-AEBIm-TFSI-23.6) cast from different solvents (both solvent evaporation for ~12 h), as described in Example 2.4.
Figure 18B:
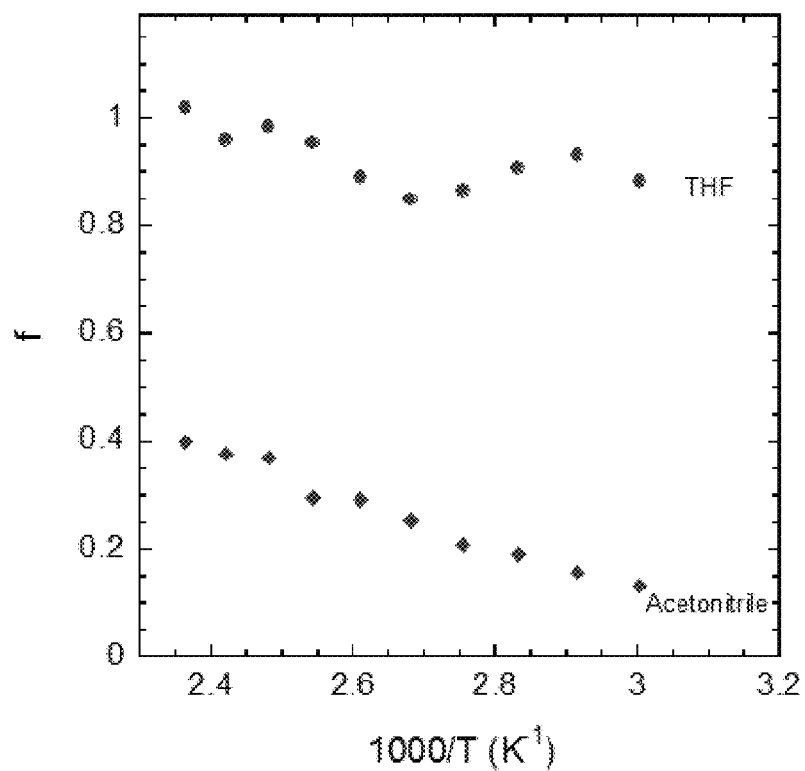
Figure 19:
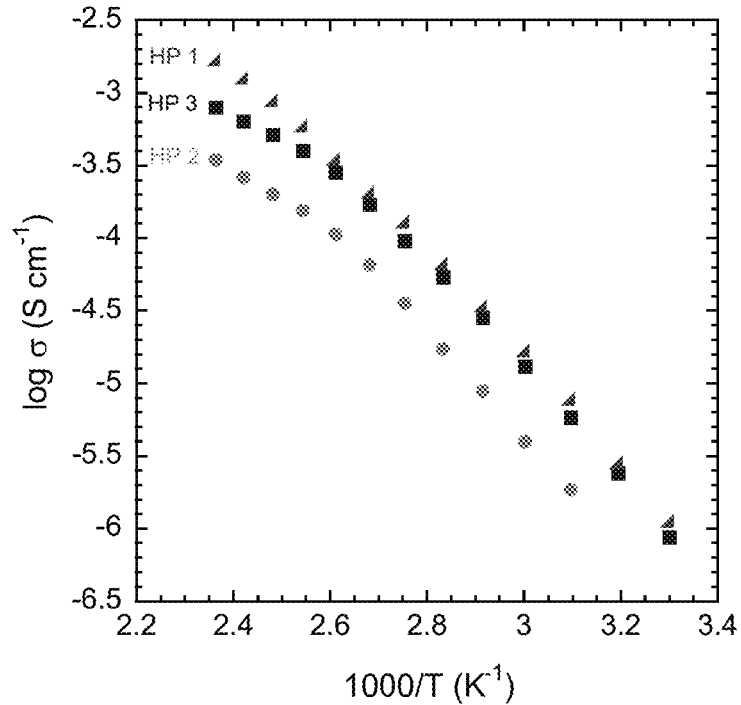
FIG. 19 shows the ionic conductivity of PIL homopolymers as a function of temperature (HP 1=poly(AEBIm-TFSI), triangle; HP 2=poly(VBHIm-TFSI), circle; HP 3=poly(MEBIm-TFSI), square), as described in Example 2.4.
Figure 20:
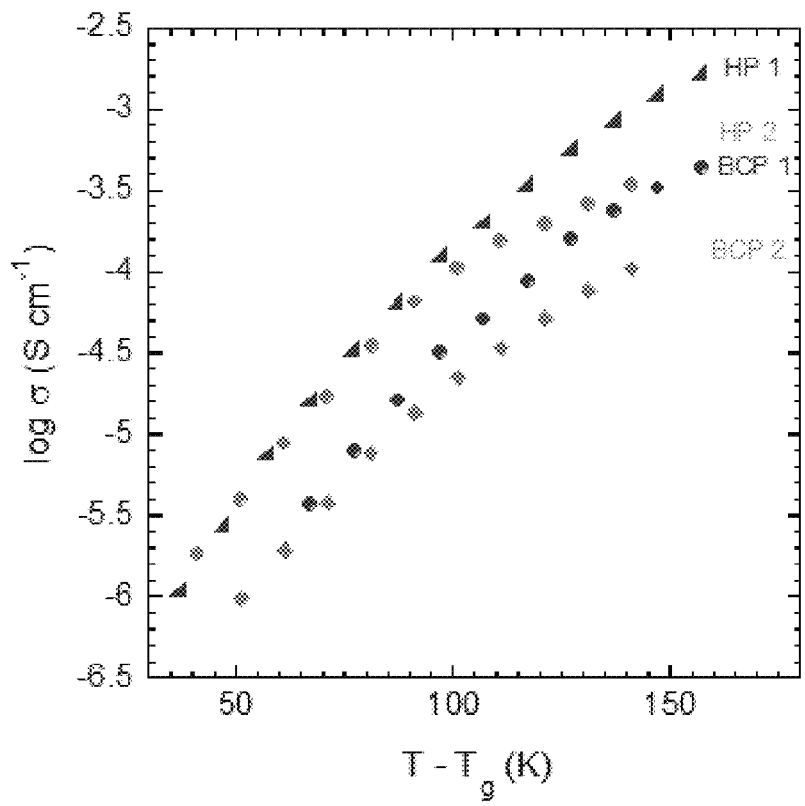
FIG. 20 shows the ionic conductivity of PIL block copolymers as a function of T-$T_g$ (HP 1=poly(AEBIm-TFSI), triangle; HP 2=poly(VBHIm-TFSI), circle; BCP 1=poly(S-b-AEBIm-TFSI-17.0); BCP 2=poly(S-b-VBHIm-TFSI-17.0), diamond), as described in Example 2.4.
Figure 21:
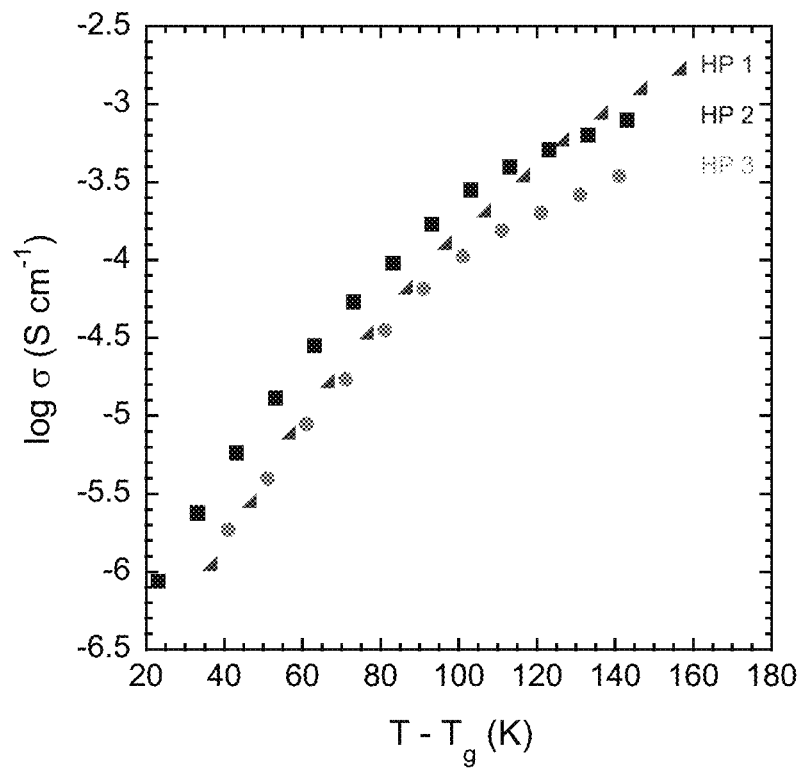
FIG. 21 shows the ionic conductivity of PIL homopolymers as a function of T-$T_g$ (HP 1=poly(AEBIm-TFSI), triangle; HP 2=poly(VBHIm-TFSI), circle; HP 3=poly(MEBIm-TFSI), square), as described in Example 2.4.
Figure 22:
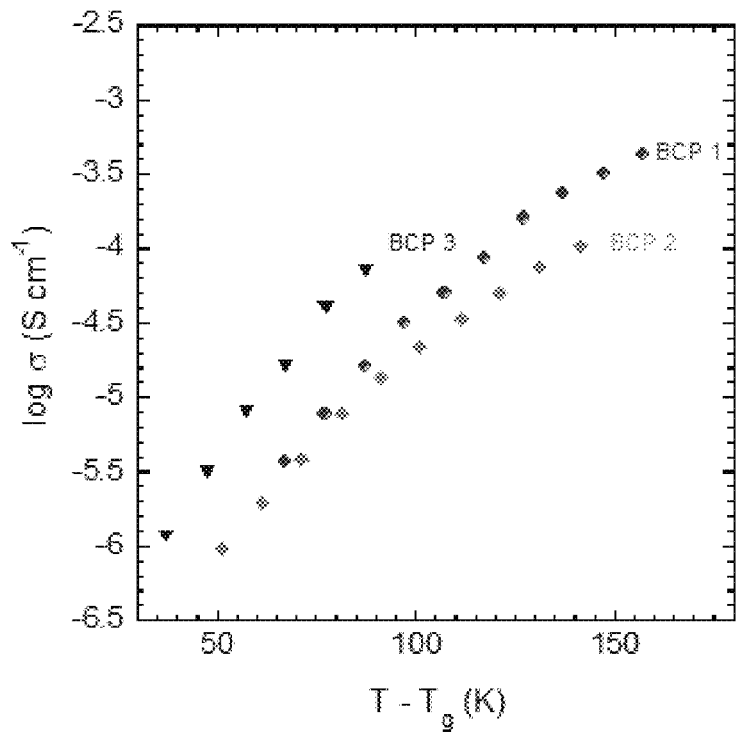
FIG. 22 shows the ionic conductivity of PIL block copolymers as a function of T-$T_g$ (BCP 1=poly(S-b-AEBIm-TFSI-17.0), circle; HP 2=poly(S-b-BHIm-TFSI-17.0), diamond; HP 3=poly(MMA-b-MEBIm-TFSI-15.7), triangle, $T_g$ (PIL block)=63° C.), as described in Example 2.4.
Figure 23:
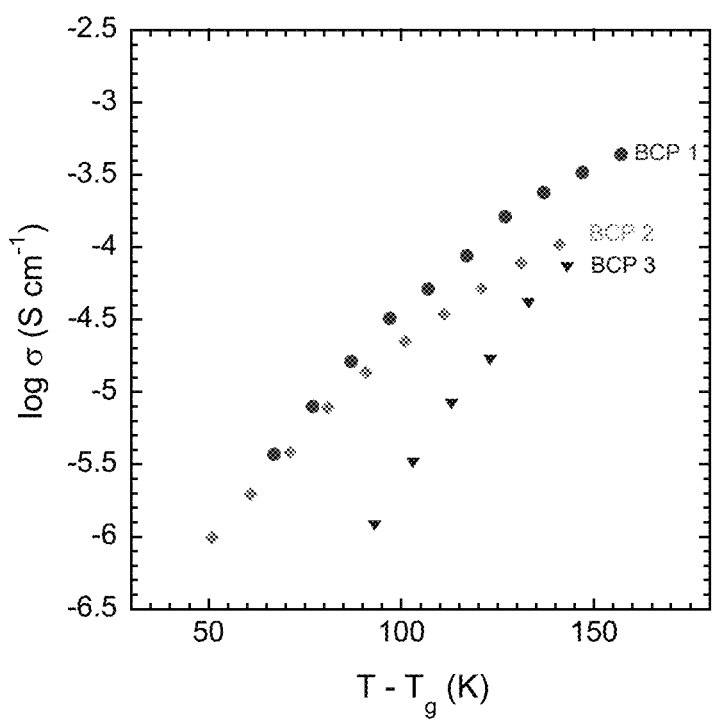
FIG. 23 shows the ionic conductivity of PIL block copolymers as a function of T-$T_g$ (BCP 1=poly(S-b-AEBIm-TFSI-17.0), circle; HP 2=poly(S-b-BHIm-TFSI-17.0), diamond; HP 3=poly(MMA-b-MEBIm-TFSI-15.7), triangle, $T_g$ (PIL homo)=7° C.), as described in Example 2.4.

Small-angle X-ray scattering (SAXS) was performed on PIL block copolymer samples both through and in the plane of the films. The Cu X-rays were generated by a Nonius FR 591 rotating-anode generator operated at 40 kV and 85 mA. The bright, highly collimated beam was obtained via Osmic Max-Flux optics and pinhole collimation in an integral vacuum system. The scattering data were collected using a Bruker Hi-Star two-dimensional detector at a sample-to-detector distance of 150 cm. Using the Datasqueeze software, 32 isotropic 2-D scattering patterns were converted to 1-D plots using azimuthal angle integration (0-360°). The scattering intensity was first corrected for the primary beam intensity, and then the background scattering from an empty cell was subtracted for correction. See FIG. 14-15.

Morphologies were also studied using a JEOL 2010F transmission electron microscope (TEM) operating at 200 kV. Poly(S-b-AEBIm-TFSI) PIL block copolymer samples were sectioned using a Reichert-Jung ultramicrotome with a diamond knife at −70° C. Polymer samples with ultrathin sections of 40-60 nm nominal thickness were collected on copper grids for examination. The TEM specimens for poly(S-b-AEBIm-TFSI) block copolymers were stained with ruthenium tetroxide ($RuO_4$) vapor, and the PIL block was preferentially stained. The interdomain distance in the TEM was determined from fast Fourier transforms (FFTs) produced by Gatan Digital Micrograph (DM) and ImageJ software.

The ionic conductivities of polymer films were measured with electrochemical impedance spectroscopy (EIS; Solartron, 1260 impedance analyzer, 1287 electrochemical interface, Zplot software) over a frequency range of 1-10$^6$ Hz at 200 mV. Conductivities were collected in an environmental chamber (Tenney, BTRS model), where temperature and relative humidity (<10% RH) were controlled. Previous results have shown that conductivities measured under these conditions are comparable to conductivities measured in a glove/drybox by others for Im-TFSI ionic liquids, Im-TFSI ionic liquid monomers, and Im-TFSI polymers. The in-plane conductivities of the PIL films were measured in a cell with four parallel electrodes, where an alternating current was applied to the outer electrodes, and the real impedance or resistance, R, was measured between the two inner reference electrodes. The resistance was determined from a high x-intercept of the semicircle regression of the Nyquist plot. Conductivity was calculated by using the following equation: $\sigma = L/AR$, where L and A are the distance between two inner electrodes and the cross-sectional area of the polymer film (A=Wl; W is the film width and l is the film thickness), respectively. Samples were allowed to equilibrate for 2 h at each temperature at <10% RH followed by six measurements at the equilibrium condition. The values reported are an average of these steady-state measurements. The conductivities were highly reproducible, and multiple measurements found an average error of <5%; this uncertainty is smaller than the plot symbols, so error bars are omitted. Resulting data are shown in FIG. 17-23.

Example 3: Hydroxide Anion Exchange PIL Block and Random Copolymers

In this example, PIL block (poly(MMA-b-MEBIm-Br)) and random (poly(MMA-r-MEBIm-Br)) copolymers associated with Br$^-$ at three MEBIm-Br compositions ranging from ~6 mole % to 17 mole % were synthesized by the revisable addition-fragmentation chain transfer (RAFT) polymerization and the conventional free radical polymerization, respectively. The physical properties such as molecular weight and molecular weight distributions of these PIL block and random copolymers are listed in Table 7. Subsequently, the PIL block and random copolymers at the highest MEBIm-Br composition (17.3 mole %) were selected as precursor polymers to prepare hydroxide anion exchange PIL block (poly(MMA-b-MEBIm-OH)) and random (poly(MMA-r-MEBIm-OH)) copolymers (Table 7). The anion exchange from the Br$^-$ to OH$^-$ form involved a heterogeneous ion exchange process where the precursor PIL polymers were cast as membranes first, then annealed and subsequently converted anions in the already-cast and annealed membranes. Note that these precursor PIL membranes were annealed in advance prior to anion exchange. Otherwise, potential degradation reactions are likely to occur during the post-thermal annealing process at a high temperature (e.g., 150° C.). The elemental analysis showed that no residual Br$^-$ were present in the resulting hydroxide anion exchange PIL block and random copolymers and that the experimental values of elements were in good agreement with theoretical calculation, indicating a successful anion exchange process. As a comparison, PIL homopolymer (poly(MEBIm-Br)) and hydroxide anion exchange PIL homopolymer (poly(MEBIm-OH)) were used as control samples in this study.

TABLE 7

PIL Composition and Molecular Weight of PIL Block and Random Copolymer and Homopolymer Samples Containing OH⁻ and Br⁻.

| | mol % | wt % | vol %[b] | $M_n$ (kg mol$^{-1}$)[c] | $M_n$ (kg mol$^{-1}$)[d] | PDI[d] |
|---|---|---|---|---|---|---|
| PIL Block Copolymers[a] | | | | | | |
| Poly(MMA-b-MEBIm-OH-17.3) | 17.3 | 34.7 | — | 13.1 + 6.96 [e] | 18.25[e] | 1.26 |
| Poly(MMA-b-MEBIm-Br-17.3) | 17.3 | 40.0 | 38.2 | 13.1 + 8.68 | 18.90 | 1.26 |
| Poly(MMA-b-MEBIm-Br-11.9) | 11.9 | 30.0 | 28.6 | 13.1 + 5.60 | 20.38 | 1.41 |
| Poly(MMA-b-MEBIm-Br-6.6) | 6.6 | 18.4 | 17.4 | 13.1 + 2.94 | 18.23 | 1.22 |
| PIL Random Copolymers[a] | | | | | | |
| Poly(MMA-r-MEBIm-OH-17.3) | 17.3 | 34.7 | — | — | 22.38[e] | 2.10 |
| Poly(MMA-r-MEBIm-Br-17.3) | 17.3 | 40.0 | 38.3 | — | 23.17 | 2.10 |
| Poly(MMA-r-MEBIm-Br-12.3) | 12.3 | 30.6 | 29.2 | — | 25.33 | 2.33 |
| Poly(MMA-r-MEBIm-Br-6.8) | 6.6 | 18.8 | 17.8 | — | 23.50 | 2.32 |
| PIL Homopolymer | | | | | | |
| Poly(MEBIm-OH) | 100 | 100 | 100 | — | 10.90[e] | 2.20 |
| Poly(MEBIm-Br) | 100 | 100 | 100 | — | 13.59 | 2.20 |

[a]b = block copolymer, r = random copolymer, OH = hydroxide counterion, Br = bromide counterion, number denotes PIL composition in mol % determined from ¹H NMR spectroscopy;
[b]Volume fractions were calculated from density of PMMA (1.18 g cm⁻³) and precursor PIL homopolymer (1.26 g cm⁻³, see Supporting Information)
[c]Calculated from ¹H NMR spectra of PMMA macro-CTA and precursor PIL block copolymers;
[d]Determined by SEC;
[e]Calculated from precursor PIL polymers.

Example 3.1: PIL Block and Random Copolymers (Br Counterions)

The experimental procedure to synthesize Br-containing PIL block and random copolymers is described above. The PIL (or MEBIm-Br) composition and number-average molecular weight ($M_n$) of PIL block copolymers were determined by ¹H NMR spectroscopy using a Varian 500 MHz spectrometer with DMSO-d₆ as the solvent. The molecular weight and polydispersity index (PDI) of block and random PIL copolymers were measured by a size exclusion chromatography (SEC) system equipped with two Waters Styragel columns (Styragel™ HR 3 and Styragel™ HR 4) and a reflective index (RI) detector. A mixture of dimethylformamide (DMF) and 0.05 M lithium bromide (LiBr) was used as a mobile phase. Polyethylene glycol/polyethylene oxide (PEG/PEO) standards (Fluka) were used for molecular weight calibration.

Example 3.2: Solvent-Casting of PIL Block and Random Copolymers (Br Counterions)

Polymers were dissolved in anhydrous acetonitrile (10% w/w) and cast onto Teflon substrates (ca. 35 mm (L)×4 mm (W)×0.525 mm (l)). The polymer solution was covered and the solvent was allowed to evaporate under ambient conditions for ca. 24 h. Polymer films were subsequently annealed under vacuum at 150° C. for 72 h. These annealed films were used to characterize thermal, morphological and ion conductive properties, and also used as precursor films to exchange into the hydroxide form via anion exchange reactions. The film thicknesses, ranging between 100 to 200 μm, were measured with a Mitutoyo digital micrometer with ±0.001 mm accuracy.

Example 3.3: Hydroxide Anion Exchange PIL Block and Random Copolymers

The hydroxide anion exchange PIL block copolymer (poly(MMA-b-MEBIm-OH-17.3)) was anion exchanged from its precursor PIL polymer (poly(MMA-b-MEBIm-Br-17.3)). A typical procedure of anion exchange reaction is given as follows: (1) The annealed precursor polymer film was placed in a freshly prepared potassium hydroxide (KOH) solution (0.2 M) and purged with nitrogen for 2 h; (2) The KOH solution was replaced every 2 h; (3) Repeat step (2) 3 times; (4) The hydroxide exchange membrane was removed from the KOH solution and washed extensively with nitrogen-saturated DI water for 4 h, and changes of fresh DI water at least four batches. The amount of residual bromide anion in the anion exchange PIL block and random copolymers was determined by elemental analysis (Atlantic Microlab, Inc., Norcross, Ga.). Anal. Calcd: C, 60.46; H, 8.30; N, 3.82; Br, 0. Found: C, 56.95; H, 8.04; N, 2.83; Br, 0.00. The preparation of the anion exchange PIL random copolymer (poly(MMA-r-MEBIm-OH-17.3)) followed the same procedure. Anal. Calcd: C, 60.46; H, 8.30; N, 3.82; Br, 0. Found: C, 57.37; H, 7.92; N, 2.81; Br, 0.00.

Example 3.4: Characterization

Figure 24A:
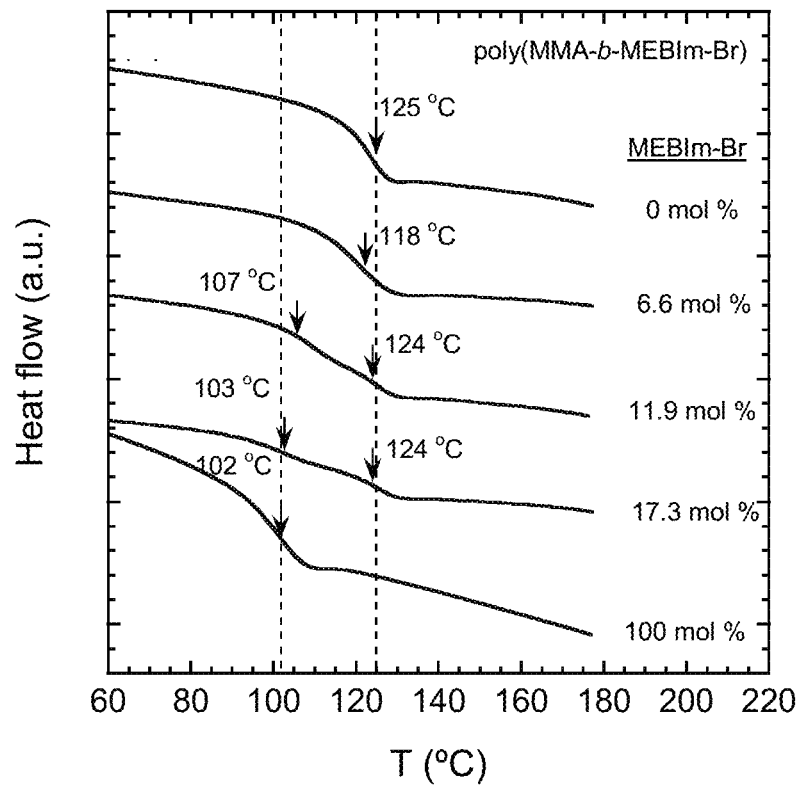
FIGS. 24A-B show DSC thermograms of (FIG. 24A) poly(MMA-b-MEBIm-Br) and (FIG. 24B) poly(MMA-r-MEBIm-Br) at various PIL compositions with PMMA (0 mole % PIL) and PIL (100 mole % PIL) homopolymers as control samples, as described in Example 3.4.
Figure 24B:
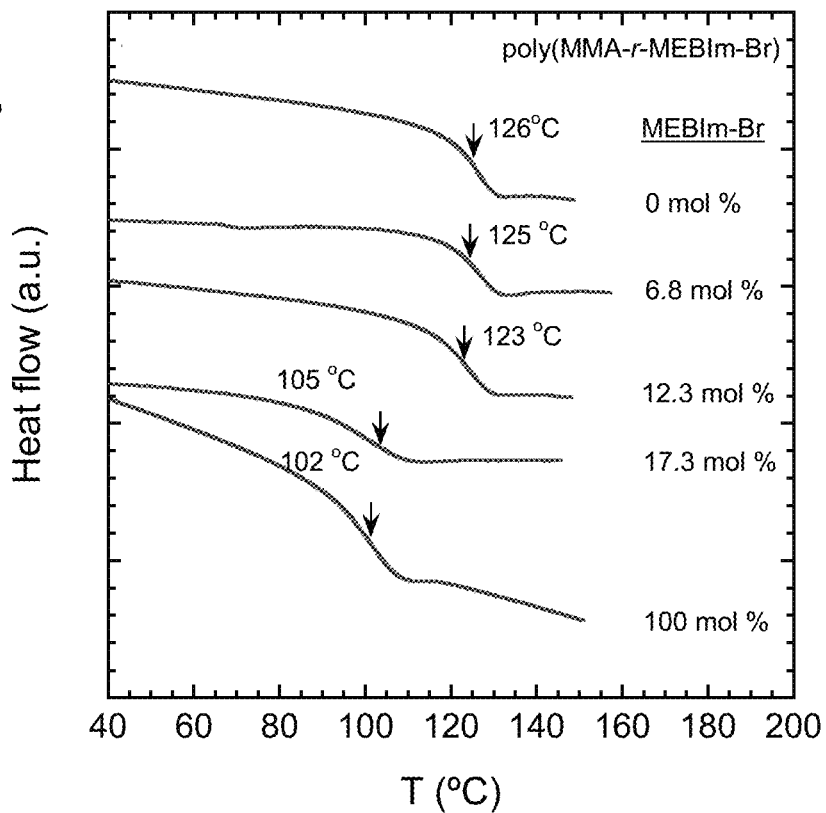
Figure 25A:
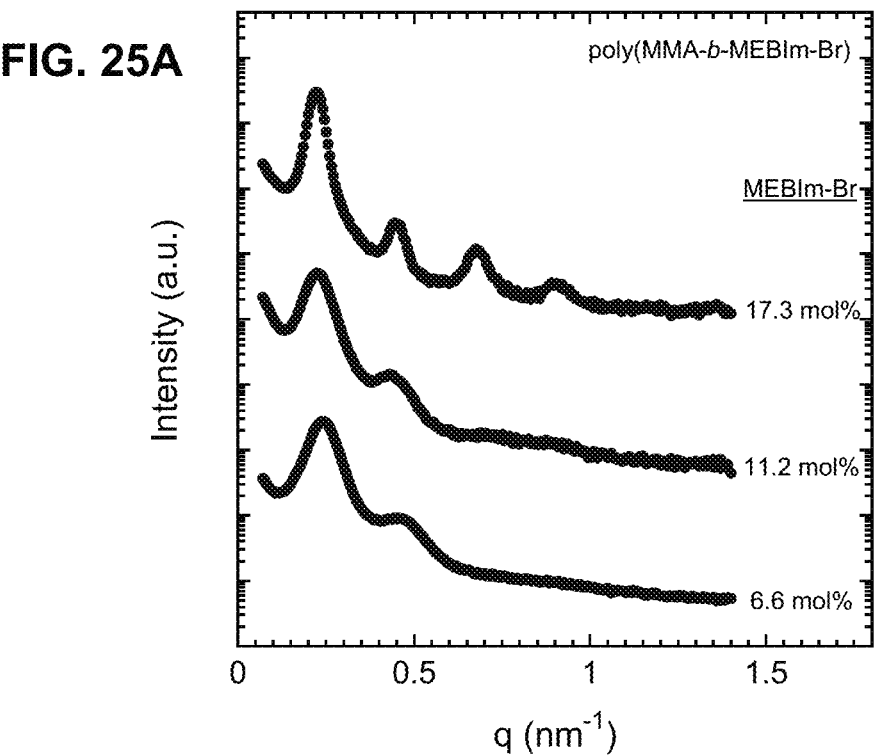
FIGS. 25A-B show small angle X-ray scattering profiles of (FIG. 25A) poly(MMA-b-MEBIm-Br) as a function of MEBIm-Br composition (data collected under vacuum at 25° C. and 0% RH) and (FIG. 25B) the PIL block copolymer (poly(MMA-b-MEBIm-Br-17.3)) as a function of humidity and temperature (data collected in an EC unit), as described in Example 3. Data is offset vertically for clarity.
Figure 25B:
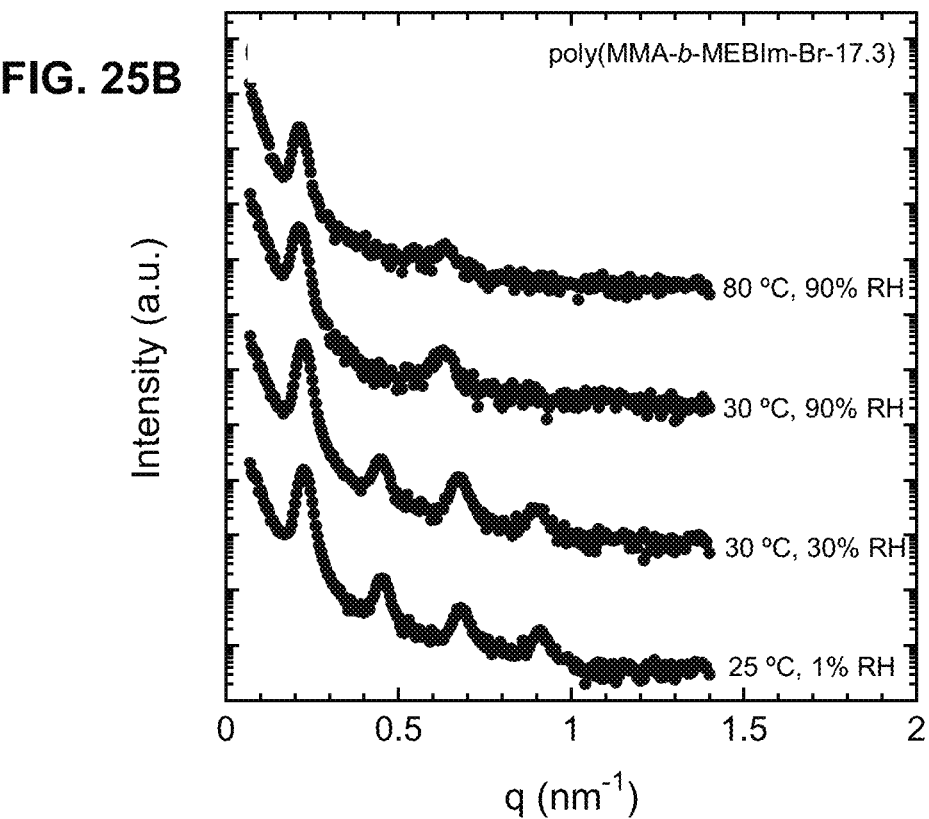
Figure 26A:
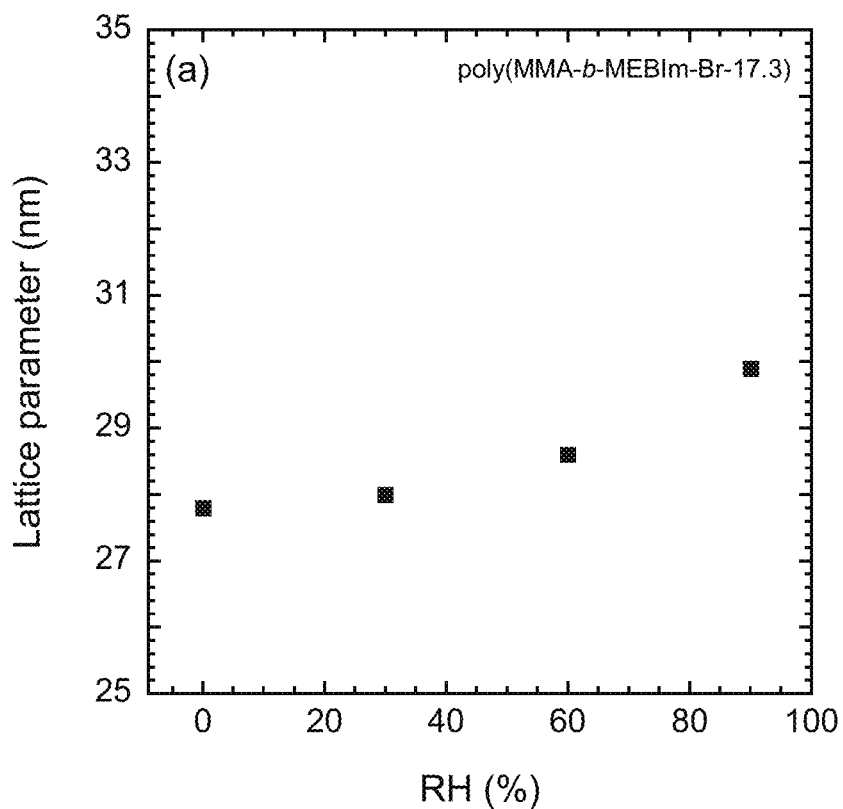
FIGS. 26A-B show (FIG. 26A) Lattice parameter and (FIG. 26B) domain size of PIL ($a_{PIL}$) and PMMA ($a_{PMMA}$) blocks for poly(MMA-b-MEBIm-Br-17.3) as a function of humidity at 30° C., as described in Example 3. Data at 1% RH was taken at 25° C.
Figure 26B:
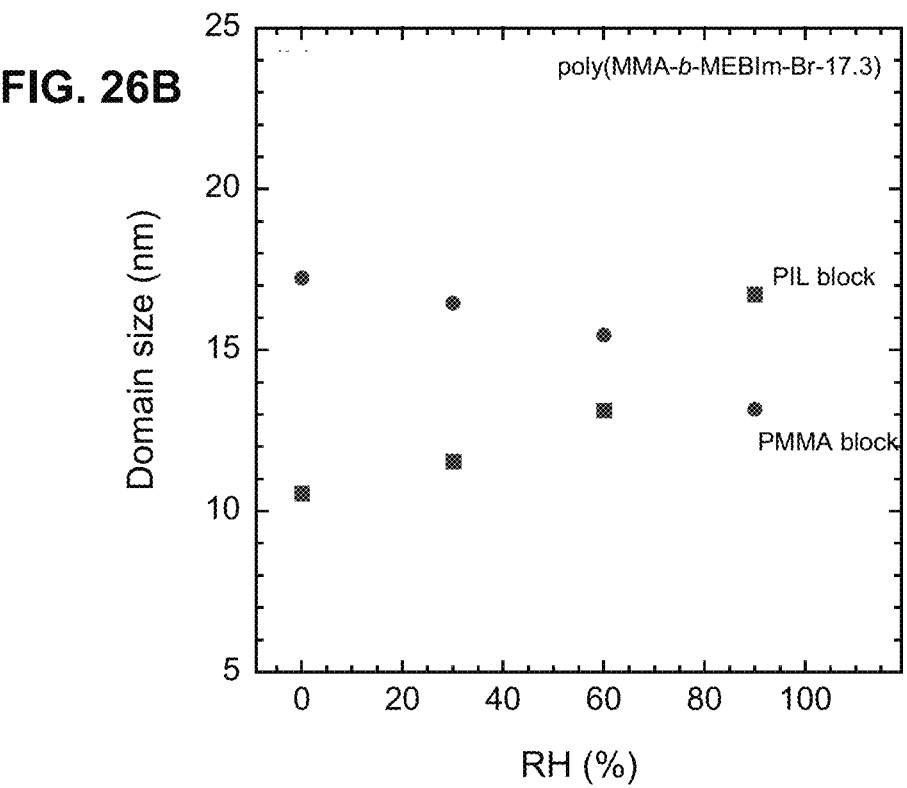
Figure 27:
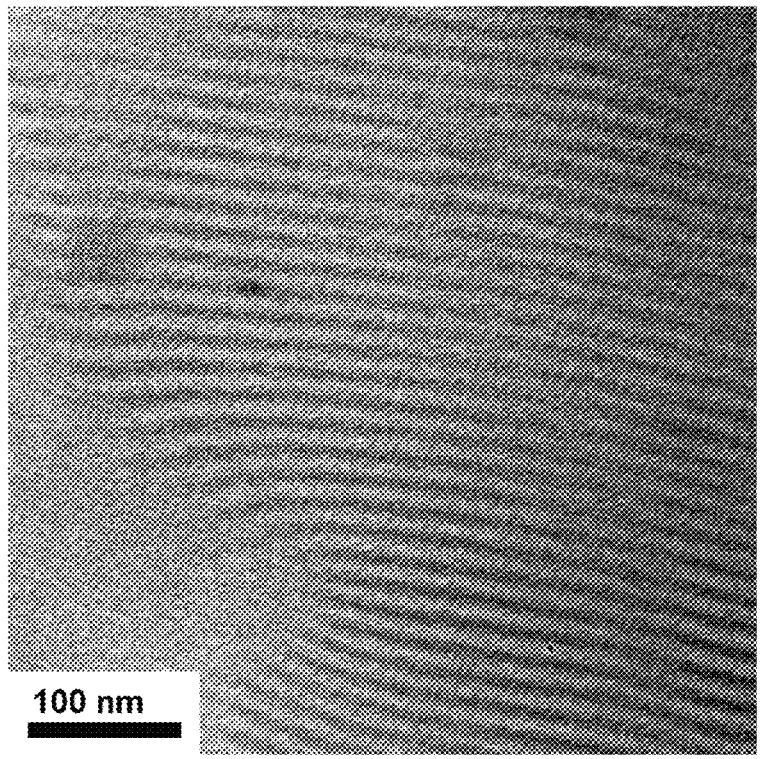
FIG. 27 shows TEM image of poly(MMA-b-MEBIm-Br) with MEBIm-Br composition of 17.3 mole %, as described in Example 3.
Figure 28:
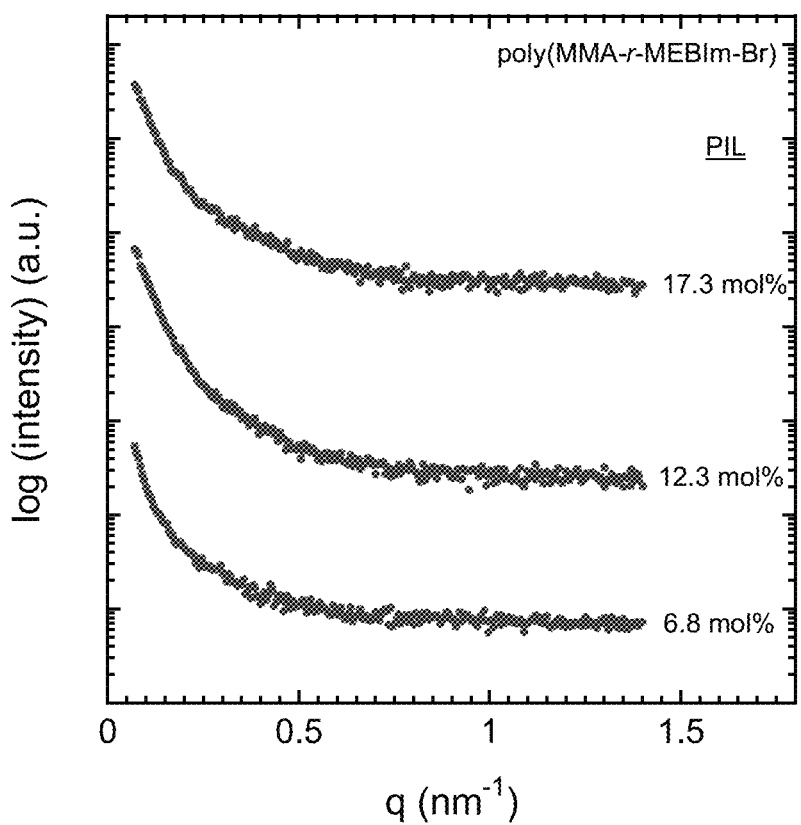
FIG. 28 shows small-angle X-ray scattering profiles of precursor PIL random copolymers as function of PIL compositions at 25° C. and 0% RH, as described in Example 3.

Glass transition temperatures ($T_g$s) were determined by differential scanning calorimetry (DSC; TA Instruments, Q200) over a temperature range of −60° C. to 180° C. at a heating/cooling rate of 10° C./min under $N_2$ environment using a heat/cool/heat method. $T_g$ was determined using the mid-point method from the second thermogram heating cycle. See FIG. 24.

The density of the PIL homopolymer associated with bromide anions was estimated from the additive contribution of components to the molar volume as reported in the literature.[f] The chemical structure of poly(MEBIm-Br) was divided into two components: poly(methyl methacrylate) (PMMA) backbone and tethered ionic part (i.e., 1-methyl-3-butylimidazolium bis(trifluoromethanesulfonyl)imide, MBIm-Br):

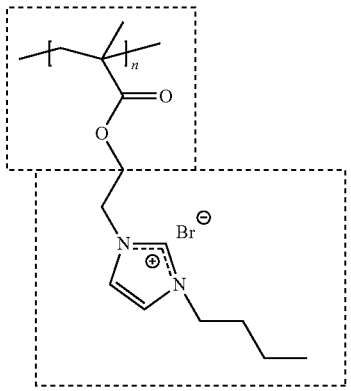

Example 3.5: Water Uptake

Water uptake was measured by a dynamic vapor sorption system (DVS, TA Instruments Q5000). A film sample was first dried in a vacuum oven at 30° C. for 24 h and then loaded into the DVS system to precondition at 0% RH and 60° C. for an additional 2 h. The film was allowed to equilibrate with humidified water vapor for 2 h to match conductivity measurements at the same temperature and RH. The water uptake was calculated as follows, $$\text{Water uptake} = \frac{W_{wet} - W_{dry}}{W_{dry}} \times 100\% \qquad (1)$$

where $W_{dry}$ and $W_{wet}$ are dry and wet polymer weights before and after water uptake experiments, respectively.

TABLE 8

Morphological, Water Uptake and Conductive Properties of PIL Block and Random Copolymer and Homopolymer Samples Containing the OH⁻ and Br⁻ (30° C. and 90% RH).

| PIL Samples | IEC[a] mmol g⁻¹ | Morphology | α[b] nm | WU[c] wt % | σ[d] mS cm⁻¹ | $E_a$ kJ mol⁻¹ |
|---|---|---|---|---|---|---|
| PIL Block Copolymers | | | | | | |
| Poly(MMA-b-MEBIm-OH-17.3) | 1.364 | lamellae | | 16.3 | 13.27 | 20.2 |
| Poly(MMA-b-MEBIm-Br-17.3) | 1.257 | lamellae | | 18.0 | 1.12 | 28.7 |
| Poly (MMA-b-MEBIm-Br-11.9) | 0.945 | cylinders | | 11.5 | 0.81 | 30.0 |
| Poly (MMA-b-MEBIm-B r-6.6) | 0.577 | | | 8.3 | 0.15 | 37.1 |
| PIL Random Copolymers | | | | | | |
| Poly(MMA-r-MEBIm-OH-17.3) | 1.364 | — | — | 18.0 | 1.10 | 25.1 |
| Poly(MMA-r-MEBIm-Br-17.3) | 1.257 | — | — | 18.2 | 0.36 | 31.4 |
| Poly(MMA-r-MEBIm-Br-12.3) | 0.970 | — | — | 11.6 | 0.07 | 39.5 |
| Poly(MMA-r-MEBIm-Br-6.8) | 0.592 | — | — | 8.4 | 0.01 | 41.8 |
| PIL Homopolymer | | | | | | |
| Poly(MEBIm-OH) | 3.932 | — | — | 61.5 | 9.57 | 17.1 |
| Poly(MEBIm-Br) | 3.152 | — | — | 34.1 | 0.87 | 24.1 |

[a]IEC = ion exchange capacity, determined from ¹H NMR;
[b]LP = lattice parameter;
[c]WU = water uptake at 90% RH and 30° C.;
[d]σ = Ionic conductivity at 90% RH and 30° C.

The additive contributions to the molar volume is:

$$\frac{1}{\rho} = \frac{w_{PMMA}}{\rho_{PMMA}} + \frac{w_{IL}}{\rho_{IL}}$$

where $w_{PMMA}$, $w_{IL}$ denote weight fractions of PMMA and MBIm-Br ionic part. $\rho$, $\rho_{PMMA}$, $\rho_{IL}$ are densities (g cm⁻³) of the poly(MEBIm-Br), PMMA and the MBIm-Br ionic liquid, respectively. $w_{PMMA}$ and $w_{IL}$, calculated from the chemical structure, are 0.312 and 0.688, respectively. The densities of PMMA and MBIm-Br IL determined experimentally are 1.18 g cm⁻³, and 1.30 g cm⁻³, respectively. Thus, the calculated density for poly(MEBIm-Br) is 1.26 g cm⁻³. In this study, we also assume that the variation of volume fraction due to the density change at different temperatures is negligible for these PIL block and random copolymers.

Figure 29A:
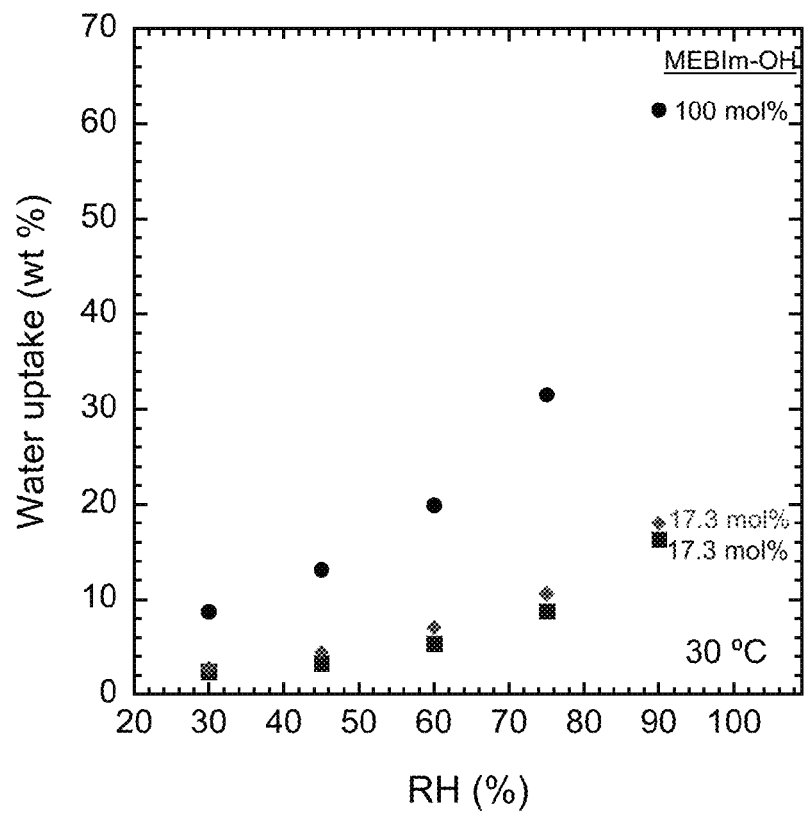
FIGS. 29A-B show water uptake of (FIG. 29A) poly(MMA-b-MEBIm-OH-17.3) (squares), poly(MMA-r-MEBIm-OH-17.3) (diamonds) copolymers and PIL homopolymer (circles) and (FIG. 29B) their precursor PIL polymers as a function of relative humidity at 30° C., as described in Example 3.5.
Figure 29B:
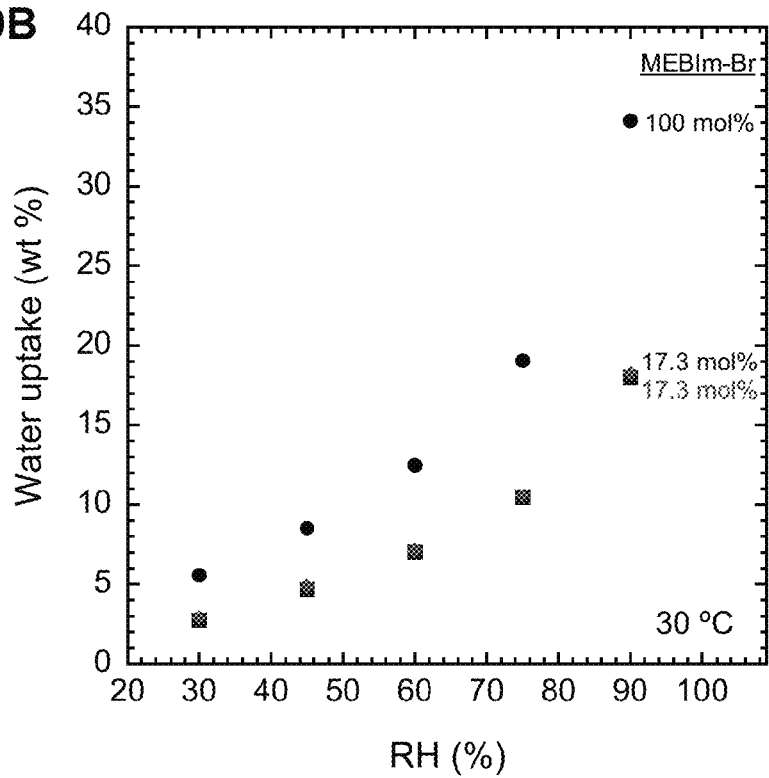

Water uptake was reported as the percentage of weight gain relative to its dry polymer sample (equation 1) under equilibrium with water vapor at a certain temperature and humidity. FIG. 29 shows the water uptake of poly(MMA-b-MEBIm-OH-17.3), poly(MMA-r-MEBIm-OH-17.3) and poly(MEBIm-OH) (FIG. 29A) and the water uptake of their precursor PIL polymers (FIG. 29B) as a function of RH at 30° C.

As shown in FIG. 29A, water uptake of all anion exchange polymer samples increases with increasing RH. At 30% RH, the water uptake values were relatively low, corresponding to 2.4% for poly(MMA-b-MEBIm-OH-17.3), 2.8% for poly(MMA-r-MEBIm-OH-17.3), and 8.6% for poly(MEBIm-OH), respectively. By increasing RH to 90%, the water uptake increases to 16.3%, 18.0% and 61.5% accordingly (Table 8). Notice that there is a nearly 6~7 fold increase in water uptake when increasing RH from 30% to 90%, indicating that RH has a significant effect on water uptake.

FIG. 29B shows a similar trend for the water uptake of precursor PIL polymers as a function of RH. With increasing RH from 30% to 90%, water uptake values increase from 2.7% to 18.0% for poly(MMA-b-MEBIm-Br-17.3), from 2.9% to 18.2% for poly(MMA-r-MEBIm-Br-17.3), and from 5.6% to 34.1% for poly(MEBIm-Br), respectively. It is interesting to note that there are similar water uptake values for PIL block and random copolymers associated with either Br$^-$ or OH$^-$ at a same RH (e.g., 30%), but the water uptake of the poly(MEBIm-OH) is ~1.5 or 2 times higher than that of poly(MEBIm-Br), indicating that the presence of MMA component reduces the difference in water uptake of PIL copolymers for different types of counter anions. This is likely due to the restrained MMA component in copolymers that constrains the water uptake since the hydrophobic MMA units do not undergo substantial segmental relaxation and still remain glassy in the presence of water.

Figure 30A:
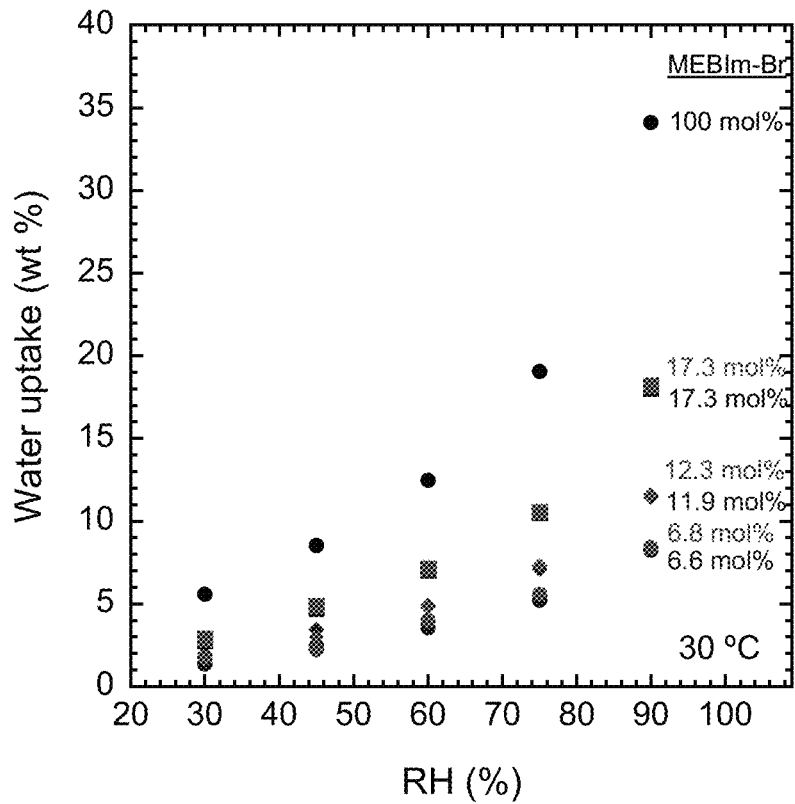
FIGS. 30A-B show water uptake of PIL block (poly(MMA-b-MEBIm-Br)) (squares) and random (poly(MMA-r-MEBIm-Br)) (diamonds) copolymers and PIL homopolymer (poly(MEBIm-Br)) (circles) as a function of (FIG. 30A) humidity at 30° C.
Figure 30B:
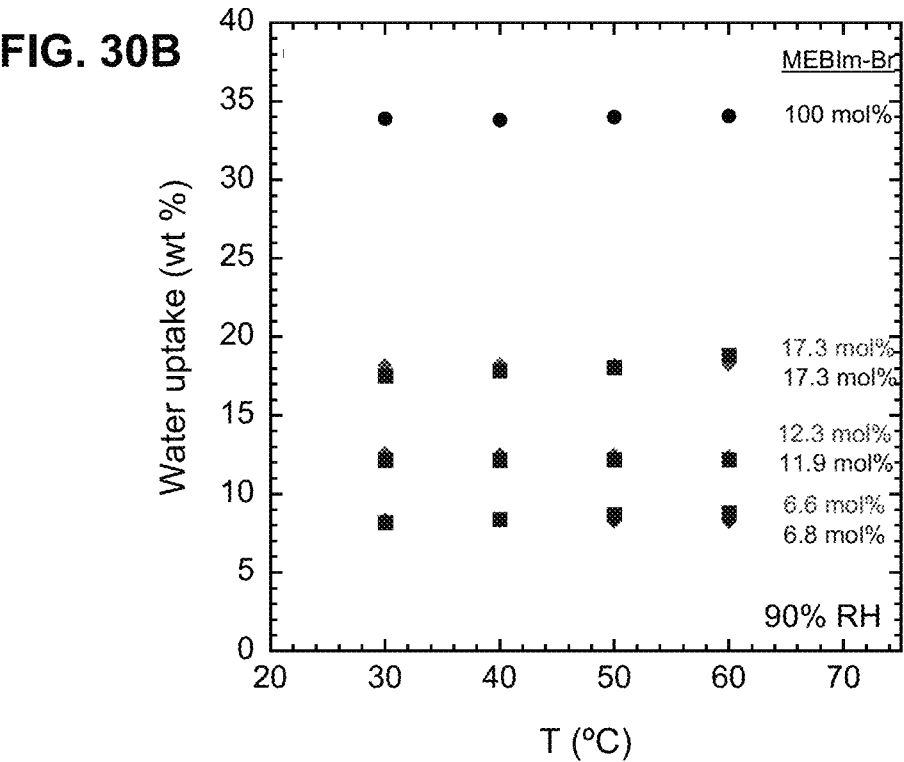
Figure 31:
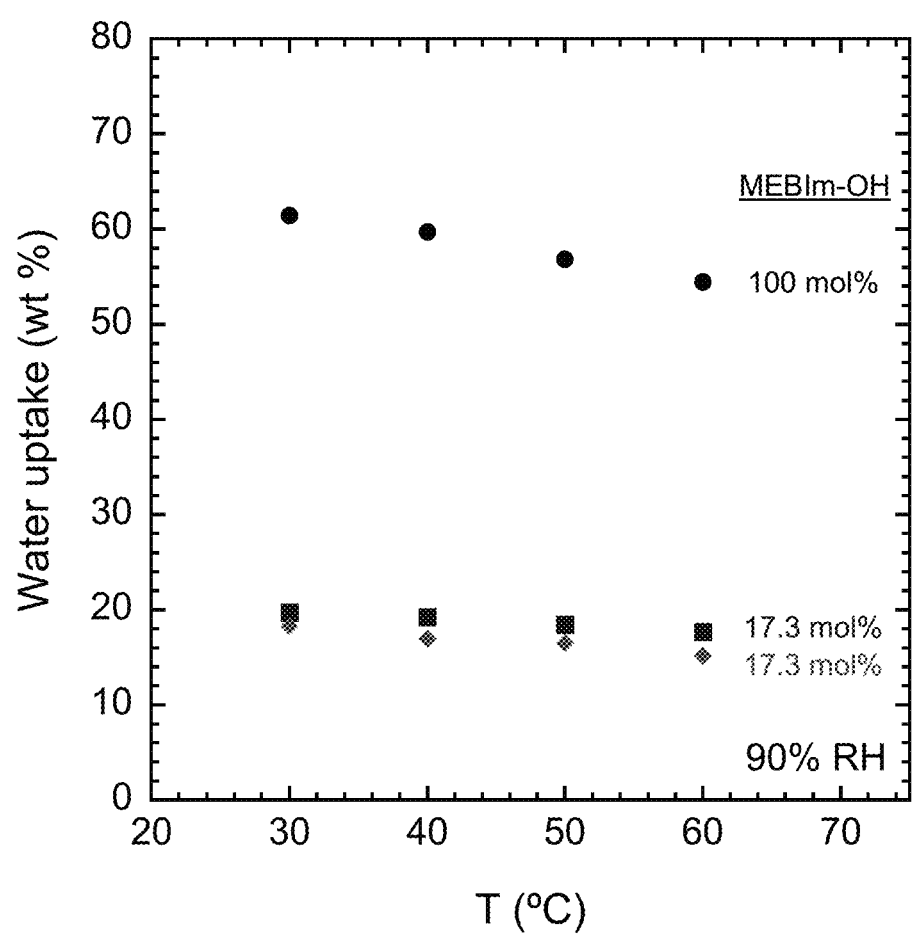
FIG. 31 shows water uptake of anion exchange PIL block (poly(MMA-b-MEBIm-OH)) (squares) and random (poly(MMA-r-MEBIm-OH)) (diamonds) copolymers and anion exchange PIL homopolymer (poly(MEBIm-OH)) (circles) as a function of temperature at 90% RH, as described in Example 3.5.

The temperature dependence of water uptake was also investigated for both hydroxide anion exchange PIL block and random copolymers and their precursor PIL polymers in this study. No significant change in water uptake was observed in the temperature range we studied (30-60° C.) (see FIG. 30 and FIG. 31), indicating that temperature has much less effect on water uptake compared to RH.

Both FIG. 29A and FIG. 29B also show that PIL block and random copolymers have similar water uptake values over the temperature and humidity range we investigated, which was also observed at other PIL compositions (see FIG. 30), indicating that the arrangement of monomer units in the polymer backbone has no significant effect on the water uptake of these PIL copolymers.

Example 3.6: Ionic Conductivities

The ionic conductivities of polymer films were measured with electrochemical impedance spectroscopy (EIS; Solartron, 1260 impedance analyzer, 1287 electrochemical interface, Zplot software) over a frequency range of 1 Hz to $10^6$ Hz at 200 mV. Conductivities were collected under humidified conditions, where temperature and relative humidity were controlled by an environmental chamber (Tenney, BTRS model). The in-plane conductivities of the PIL films were measured in a cell with four-parallel electrodes, where an alternating current was applied to the outer electrodes and the real impedance or resistance, R, was measured between the two inner reference electrodes. The resistance was determined from a high x-intercept of the semi-circle regression of the Nyquist plot. Conductivity was calculated by using the following equation: $\sigma=L/AR$, where L and A are the distance between two inner electrodes and the cross sectional area of the polymer film (A=Wl; W is the film width and l is the film thickness), respectively. Samples were allowed to equilibrate for 2 h at each temperature and RH followed by 6 measurements at the equilibrium condition. The values reported are an average of these steady-state measurements.

Figure 32A:
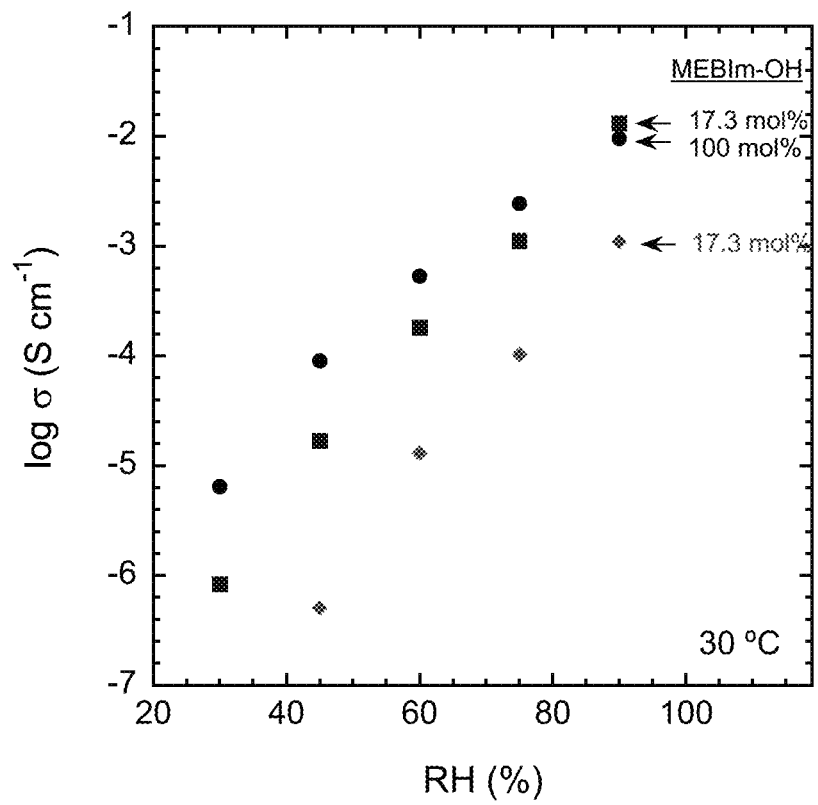
FIGS. 32A-B show ionic conductivity of (FIG. 32A) poly(MMA-b-MEBIm-OH-17.3) (squares), poly(MMA-r-MEBIm-OH-17.3) (diamonds) copolymers and PIL homopolymer (circles) and (FIG. 32B their precursor PIL polymers as a function of relative humidity at 30° C., as described in Example 3.6.
Figure 32B:
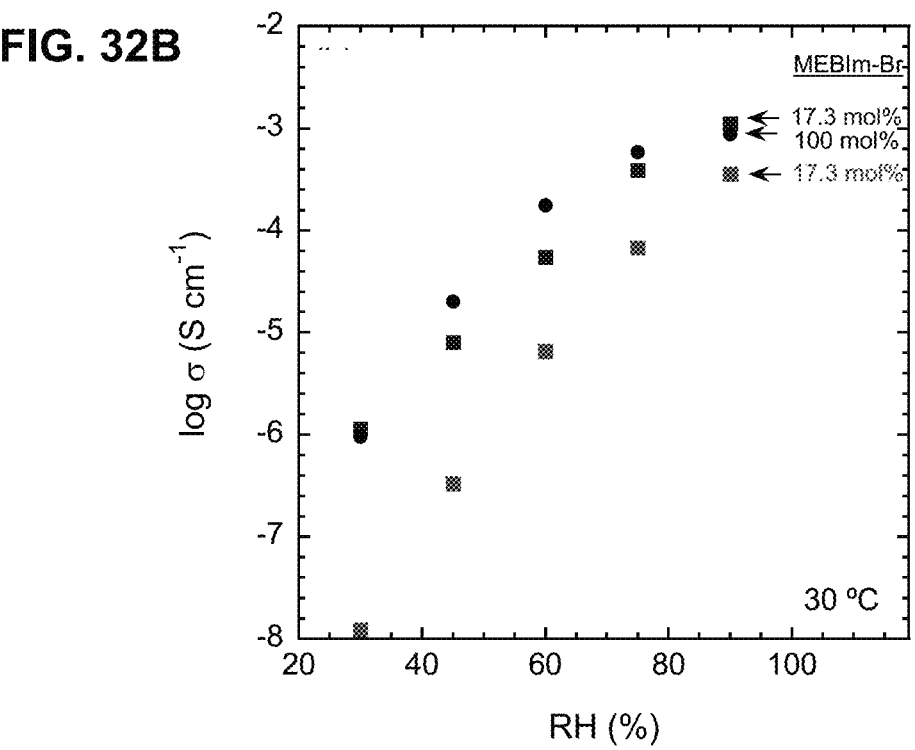

FIG. 32 shows the ionic conductivities of poly(MMA-b-MEBIm-OH-17.3), poly(MMA-r-MEBIm-OH-17.3) and poly(MEBIm-OH) (FIG. 32A) and their precursor PIL polymers (FIG. 32B) as a function of temperature at 30° C.

As shown in FIG. 32A and FIG. 32B, the ionic conductivities increase 3-5 orders of magnitude with increasing RH from 30% to 90%, indicating that the ionic conductivity of these hydrophilic PIL samples is strongly dependent on RH. This can be explained by a significant increase in water uptake (FIG. 29) and a corresponding enhanced hydration level, ion dissociation and hydrophilic PIL conducting channels to facilitate ion transport at a high RH. For example, the PIL domain size in poly(MMA-b-MEBIm-Br) enlarges from 11.5 to 16.7 nm (45% increase) with increasing RH from 30% to 90% (FIG. 4).

Figure 34A:
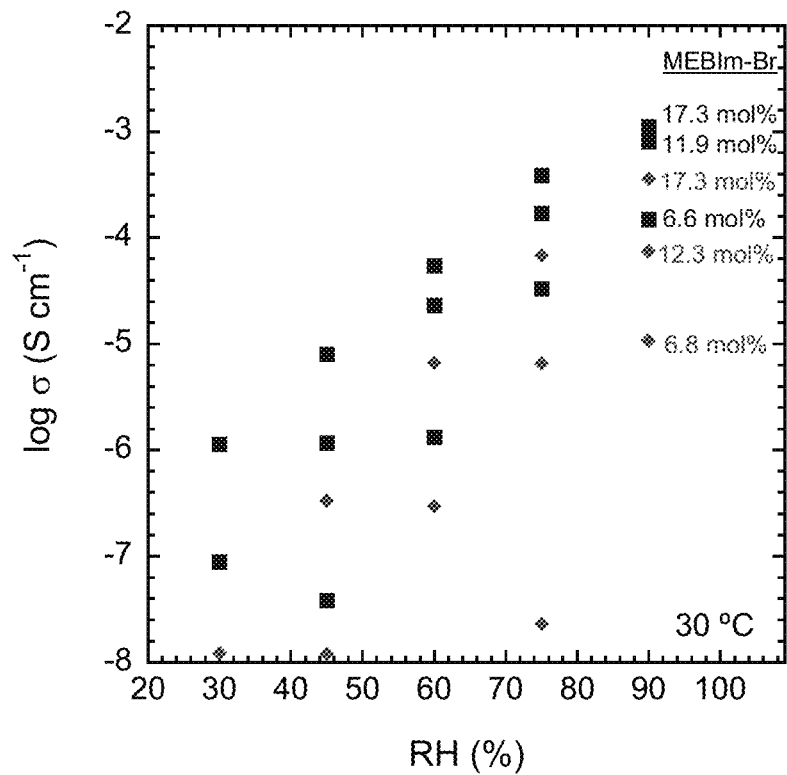
FIGS. 34A-B show ionic conductivity of PIL block (poly (MMA-b-MEBIm-Br)) (squares) and random (poly(MMA-r-MEBIm-Br)) (diamonds) copolymers as a function of (FIG. 34A) humidity at 30° C.
Figure 34B:
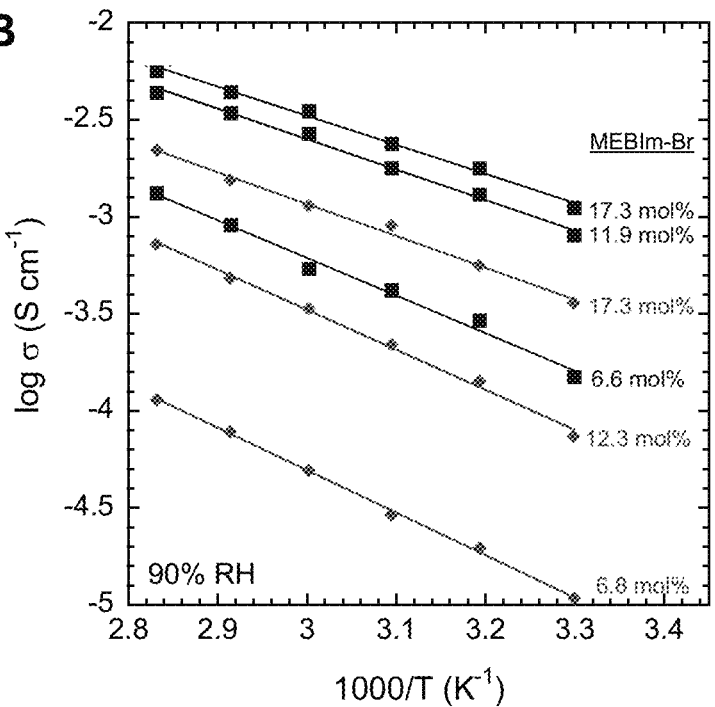

FIG. 32 also shows that the block copolymer containing either MEBIm-OH (FIG. 32A) or MEBIm-Br (FIG. 32B) has much higher ionic conductivity than its random counterpart despite the same PIL composition and water uptake. This is especially evident at a relatively low RH where at 30% RH the conductivity of the block copolymer is about two orders of magnitude higher than that of the random copolymer. With increasing RH, the difference becomes less pronounced. This trend is also seen at other lower PIL compositions (see FIG. 34).

To better understand the difference in ionic conductivity between block and random copolymers, it is important to compare the morphology difference. Note that in PIL block copolymers, the hydrophilic ILs (either MEBIm-OH or MEBIm-Br) are covalently tethered next to each other and conducting ions (either OH$^-$ or Br$^-$) are not only locally concentrated, but also self-assembled to form a periodic nanostructured lamellar morphology with connected ion-conducting domains due to the strong microphase separation of hydrophilic and hydrophobic blocks. In contrast, ionic sites are far separated by non-ionic MMA units in the PIL random counterparts. Specifically, on average, there are ca. 5 MMA units located between two ionic sites along the polymer backbone at the PIL composition of 17.3 mole %. Moreover, PIL random copolymers only exhibit a homogeneous morphology without microphase separated nanostructures and do not form distinct ion conducting domains. These result in a higher activation energy required for ion transport and a significant decrease in ionic conductivity compared to PIL block copolymers (Table 8). Therefore, the difference in ion transport between the PIL block and random copolymers is mainly driven by the morphological difference between the two.

Figure 33A:
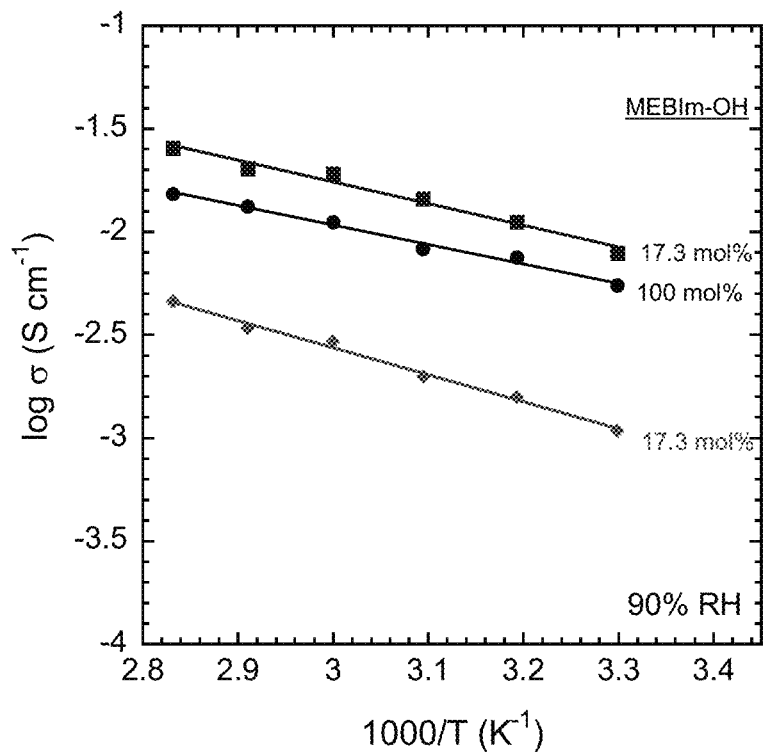
FIGS. 33A-B show shows ionic conductivity of (FIG. 33A) poly(MMA-b-MEBIm-OH-17.3) (squares), poly (MMA-r-MEBIm-OH-17.3) (diamonds) copolymers and PIL homopolymer (circles) and (FIG. 33B) their precursor PIL polymers as a function of relative humidity at 30° C., as described in Example 3.6.
Figure 33B:
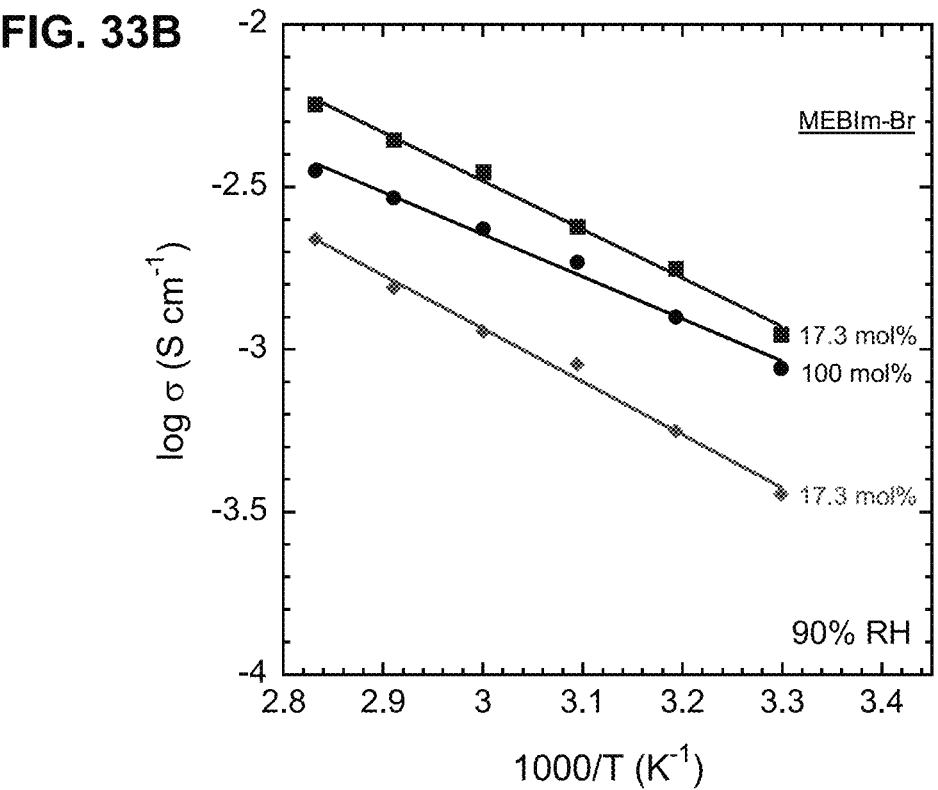

Interestingly, FIG. 32 also shows that the ionic conductivities of the PIL block copolymers are greater than their homopolymers at 90% RH and 30° C. The difference in ionic conductivity is further clearly illustrated in FIG. 33 where the ionic conductivities are plotted as a function of temperature at 90% RH. FIG. 33 shows that the ionic conductivities of the block copolymers are higher than their homopolymers over a wide temperature range. At 80° C., the ionic conductivities of poly(MMA-b-MEBIm-OH-17.3) (25.46 mS cm$^{-1}$) and poly(MMA-b-MEBIm-Br-17.3)) (5.67 mS cm$^{-1}$) are ca. 66% and 60% higher than their homopolymers, respectively. This indicates that factors other than ion content influence ion transport. Although the detailed mechanism of enhanced ion conduction was not fully understood, the nanostructured hydrophilic ion-conducting channels and reduced tortuosity of ion-conducting paths compared to homopolymers could be a reason.

FIG. 33 also shows that different from hydrophobic PILs where ion transport is significantly coupled with polymer segmental relaxation and exhibits the Vogel-Fulcher-Tammann (VFT) behavior, water-assisted ion transport of PIL block and random copolymers exhibited the Arrhenius behavior as a typical proton exchange membrane. The activation energies for the transport of OH$^-$ in PIL block and random copolymers and homopolymer are 20.2, 25.1 and 17.1 kJ mol$^{-1}$, respectively. As a comparison, the activation energies for the transport of Br$^-$ in PIL block and random copolymers and homopolymer are 28.7, 31.4, and 24.1 kJ mol$^{-1}$, respectively. A bigger anion size of Br$^-$ accounts for the higher activation energy for the transport of Br$^-$ as compared to OH$^-$. Notice that with decreasing PIL composition, the activation energy increases for precursor PIL block and random copolymers (Table 8), indicating a lager barrier of ion transport at a lower composition due to a low water uptake and reduced connectivity of ionic domains.

Example 3.7: General Remarks

This study revealed the influence of nanostructured morphology on water-assistant ion transport in hydroxide anion exchange polymerized ionic liquid (PIL) block copolymers (anion exchange membranes, AEMs) and their precursor PIL block copolymers by comparing to the random counterparts and homopolymers. The block copolymer AEMs consisted of an imidazolium-based ion-conducting component (1-[(2-methacryloyloxy)ethyl]-3-butylimidazolium hydroxide (MEBIm-OH)) and a non-ionic structural-supporting component (methyl methacrylate, MMA). The microphase-separated morphologies of these PIL block copolymers were monitored by small angle X-ray scattering under both dry and humidified conditions. These well-ordered periodic nanostructures were also confirmed by transmission electron microscopy. Combing further studies on water uptake and ionic conductivity, it was concluded that well-connected and confined hydrophilic PIL nanostructured conducting channels were the major factor that facilitates ion conduction and provided superior ionic conductivity of the PIL block copolymers compared to the random counterparts and homopolymers. These anion exchange PIL block copolymers are attractive for further exploration as a new type of AEMs in the use of alkaline fuel cells.

The solid-state alkaline fuel cell (AFC), utilizing a solid-state anion exchange membrane (AEM) rather than a liquid electrolyte to transport hydroxide anions ($OH^-$), has recently attracted increased attention due to inherent advantages over proton exchange membrane (PEM) fuel cells. The benefits include cost reduction (e.g., cheaper nickel or silver catalysts to replace expensive platinum catalysts), wider choices of fuels (e.g., methanol), and simplified water management. In addition, the utilization of AEMs in AFCs can resolve known issues encountered with liquid electrolytes such as device corrosion, electrolyte leakage and carbonate precipitation. However, one critical and challenging issue that limits the wide scale use of current AEMs for solid-state AFCs is the chemical stability of AEMs, especially at dehydrated conditions and elevated temperatures.

It is certain that ionic conductivity of AEMs is one of the key factors that determine the device performance of AFCs. Particularly, understanding in situ morphologies under humidified conditions is more important since water plays a crucial role in water-assistant ion transport.

The purpose of this work was to study the morphologies of imidazolium-based PIL block copolymers including hydroxide anion exchange PIL block copolymers (block copolymer AEMs) and their precursor PIL block copolymers, and the impact of morphology on ion transport. The model PIL block copolymers were composed of an IL component (either 1-[(2-methacryloyloxy)ethyl]-3-butyl-imidazolium hydroxide (MEBIm-OH) or 1-[(2-methacryloyloxy)ethyl]-3-butylimidazolium bromide (MEBIm-Br)) and a non-ionic component (methyl methacrylate, MMA). In these PIL diblock copolymers, the PIL block was very hydrophilic, conducting either $OH^-$ or bromide anions ($Br^-$) under humidified conditions, while the PMMA block was hydrophobic, providing mechanical support for the membrane. To better understand the impact of nanostructured morphology on ionic conductivity, PIL random copolymers containing either $OH^-$ or $Br^-$ at similar PIL compositions were prepared and their PIL homopolymers were used for comparison. In this study, the in situ morphology of PIL block and random block copolymers was measured by X-ray scatting in an environmental chamber (EC), which allows us to monitor the change of domain sizes at a certain elevated temperature and relative humidity (RH). As expected, despite a similar PIL composition, the ionic conductivities of PIL block copolymers (either $OH^-$ or $Br^-$) were significantly higher than their random counterparts although both had similar water uptake values at a same humidified condition. More interestingly, they have higher ionic conductivities than homopolymers. This superior ionic conductivity was mainly attributed microphase-separated morphology with well-ordered nanostructures and good connectivity of nanostructured conductive domains.

It is to be understood that while the invention has been described in conjunction with the preferred specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. In addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document are hereby incorporated herein by reference, each in its entirety, for all purposes.

What is claimed:

1. A block copolymer comprising a first and second block, said first block comprising an acrylate or methacrylate derivative; said second block comprising (a) polymerized ionic liquid, said polymerized ionic liquid comprising a tethered ionic liquid cation and a mobile anion, and (b) a lithium ion salt of said mobile anion, wherein said block copolymer exhibits at least one region of nanophase separation.

2. The block copolymer of claim 1, wherein at least one region of nanophase separation comprises a region of a periodic nanostructured lamellar morphology with connected ion-conducting domains:
   (a) which optionally extend in three-dimensions throughout the block copolymer;
   (b) whose periodicity optionally comprises ordered domains having lattice parameter dimensions in the range of about 5 to about 50 nm, as measured by small angle X-ray scattering;
   (c) which optionally allow for the conduction of lithium ions through the block copolymer; or
   (d) which are a combination of two or more of (a), (b), and (c).

3. The block copolymer of claim 1, wherein the first block comprises a repeating unit:

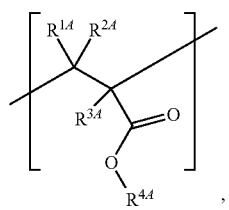

where $R^{1A}$, $R^{2A}$, $R^{3A}$, and $R^{4A}$ are independently H or $C_{1-12}$ alkyl.

4. The block copolymer of claim 1, wherein the first block has an average molecular weight in the range of about 1000 to about 50000 Daltons.

5. The block copolymer of claim 1, wherein the tethered ionic liquid cation comprises an optionally alkyl-substituted imidazolium, pyridinium, or pyrrolidinum cation, or combination thereof.

6. The block copolymer of claim 1, wherein the polymerized ionic liquid comprises a $C_{3-6}$ alkyl-substituted imidazolium cation.

7. The block copolymer of claim 1, wherein the cation of the polymerized is tethered by a carboalkoxy, carboalkoxy, carboxylato, carboxyamino, or ether linking group.

8. The block copolymer of claim 1, wherein the second block comprising a polymerized ionic liquid comprises a repeating unit:

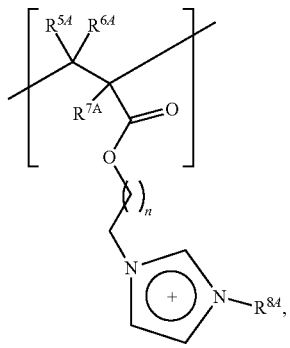

where $R^{5A}$, $R^{6A}$, $R^{7A}$, and $R^{8A}$ are independently H or $C_{1-6}$ alkyl; and n is in a range of 0 to 20.

9. The block copolymer of claim 8, wherein n is about 10.

10. The block copolymer of claim 1, wherein the block copolymer is substantially anhydrous.

11. The block copolymer of claim 1, wherein the second block further comprises a solvent comprising ethylene carbonate, ethylene glycol, polyethylene glycol, propylene glycol, propylene carbonate, butylene carbonate, dimethyl carbonate, diethyl carbonate, methylethyl carbonate, dipropyl carbonate, γ-butyrolactone, dimethoxyethane, diethoxyethane, or a mixture thereof.

12. The block copolymer of claim 1, wherein the mobile anion is an alkyl phosphate, biscarbonate, bistriflimide, $N(SO_2C_2F_5)_2^-$, $N(SO_2CF_3)(SO_2C_4F_9)^-$, carbonate, chlorate, formate, glycolate, perchlorate, hexasubstituted phosphate; tetra-substituted borate, tosylate, or triflate or combination thereof.

13. The block copolymer of claim 1, further comprising a mobile ionic liquid comprising at least one optionally substituted imidazolium, pyridinium, or pyrrolidinum cation and at least one alkyl phosphate, biscarbonate, bistriflimide, $N(SO_2C_2F_5)_2^-$, $N(SO_2CF_3)(SO_2C_4F_9)^-$, carbonate, chlorate, formate, glycolate, perchlorate, hexasubstituted phosphate; tetra-substituted borate), tosylate, or triflate anion.

14. The block copolymer of claim 1, wherein the polymerized ionic liquid block has a number average molecular weight in the range of about 1000 to about 50000 Daltons.

15. The block copolymer of claim 1, wherein the block copolymer has a number average molecular weight in a range of about 5000 to about 25,000 Daltons, as measured by size exclusion chromatography.

16. The block copolymer of claim 1, wherein the block copolymer has a number average molecular weight exhibits a polydispersity in the range of about 1 to about 1.5, as measured by size exclusion chromatography.

17. The block copolymer of claim 1, wherein the polymerized ionic liquid block is present in a range of about 5 mole % to about 95 mole % of the total block copolymer.

18. A lithium ion battery membrane comprising a block copolymer of claim 1.

19. A membrane electrode assembly comprising a lithium ion battery membrane of claim 18.

20. A lithium ion battery comprising a lithium ion battery membrane of claim 18.

* * * * *